(12) United States Patent
Wei et al.

(10) Patent No.: US 12,552,793 B2
(45) Date of Patent: Feb. 17, 2026

(54) PURINE DERIVATIVE AND MEDICAL USE THEREOF

(71) Applicant: KANGBAIDA (SICHUAN) BIOTECHNOLOGY CO., LTD., Chengdu (CN)

(72) Inventors: Yonggang Wei, Sichuan (CN); Xuezhen Xu, Sichuan (CN); Hongzhu Chu, Sichuan (CN); Lvxue He, Sichuan (CN); Xiangyu Meng, Sichuan (CN); Meiwei Wang, Sichuan (CN); Guizhuan Su, Sichuan (CN); Bing Liu, Sichuan (CN); Yi Sun, Sichuan (CN)

(73) Assignee: KANGBAIDA (SICHUAN) BIOTECHNOLOGY CO., LTD., Chengdu (CN)

( * ) Notice: Subject to any disclaimer, the term of this patent is extended or adjusted under 35 U.S.C. 154(b) by 851 days.

(21) Appl. No.: 17/758,155

(22) PCT Filed: Dec. 30, 2020

(86) PCT No.: PCT/CN2020/141862
§ 371 (c)(1),
(2) Date: Jun. 29, 2022

(87) PCT Pub. No.: WO2021/136463
PCT Pub. Date: Jul. 8, 2021

(65) Prior Publication Data
US 2022/0402920 A1    Dec. 22, 2022

(30) Foreign Application Priority Data

Dec. 31, 2019 (CN) .......................... 201911408681.4
Mar. 11, 2020 (CN) .......................... 202010155797.8
Jul. 15, 2020 (CN) .......................... 202010667388.6

(51) Int. Cl.
C07D 473/32 (2006.01)
A61P 35/00 (2006.01)
C07D 519/00 (2006.01)

(52) U.S. Cl.
CPC ............ C07D 473/32 (2013.01); A61P 35/00 (2018.01); C07D 519/00 (2013.01)

(58) Field of Classification Search
CPC .................................................. C07D 473/32
See application file for complete search history.

(56) References Cited

U.S. PATENT DOCUMENTS 10,407,446 B2    9/2019   Verschoyle et al.

FOREIGN PATENT DOCUMENTS

| CN | 10407446 B2 | 8/2019 |
| WO | 2006091737 A1 | 8/2006 |
| WO | 2018114999 A1 | 6/2018 |
| WO | 2019238929 A1 | 12/2019 |

OTHER PUBLICATIONS

Jo, Seong-Min, Frederik R. Wurm, and Katharina Landfester. "Jo, Seong-Min, Frederik R. Wurm, and Katharina Landfester. "Oncolytic nanoreactors producing hydrogen peroxide for oxidative cancer therapy." Nano letters 20.1 (2019): 526-533.." Nano letters 20.1 (2019): 526-533. (Year: 2019).*
Kelley, Eric E., et al. "Hydrogen peroxide is the major oxidant product of xanthine oxidase." Free Radical Biology and Medicine 48.4 (2010): 493-498. (Year: 2010).*
Subbaiah, Murugaiah AM, et al. "Prodrugs as empowering tools in drug discovery and development: Recent strategic applications of drug delivery solutions to mitigate challenges associated with lead compounds and drug candidates." Chemical Society Reviews 53.4 (2024): 2099-2210. (Year: 2024).*
Wong, Way Wua et al. "Hypoxia-selective radiosensitisation by SN38023, a bioreductive prodrug of DNA-dependent protein kinase inhibitor IC87361." Biochemical pharmacology vol. 169 (2019): 113641. doi:10.1016/j.bcp.2019.113641 (Year: 2019).*
Mishra R, Yuan L, et al. Phosphoinositide 3-Kinase (PI3K) Reactive Oxygen Species (ROS)-Activated Prodrug in Combination with Anthracycline Impairs PI3K Signaling, Increases DNA Damage Response and Reduces Breast Cancer Cell Growth. Int J Mol Sci. Feb. 19, 2021;22(4):2088. doi: 10.3390/ijms22042088. (Year: 2021).*
"Cancer Risk and Prevention: Cancer Causes: Stay Healthy." Cancer Causes | Stay Healthy | American Cancer Society, www.cancer.org/cancer/risk-prevention.html. (Year: 2025).*
Anne Esguerra, Z et al. "DNA-PKcs chemical inhibition versus genetic mutation: Impact on the junctional repair steps of V(D)J recombination." Molecular immunology vol. 120 (2020): 93-100. doi:10.1016/j.molimm.2020.01.018 (Year: 2020).*

(Continued)

Primary Examiner — Andrew D Kosar
Assistant Examiner — Connor K English
(74) Attorney, Agent, or Firm — LATHROP GPM LLP; Brian C. Trinque; Nicole Sassu

(57) ABSTRACT

The present invention relates to a purine derivative and use thereof in medicine, and in particular to a pyrimidine derivative shown as general formula (I) or a stereoisomer, solvate, metabolite, prodrug, deuteride, pharmaceutically acceptable salt or cocrystal thereof, a pharmaceutical composition comprising the same, and use of the compound or composition of the present invention in the field of preparation of a DNA-PK inhibitor, wherein the substituents in general formula (I) are defined in the same way as in the specification

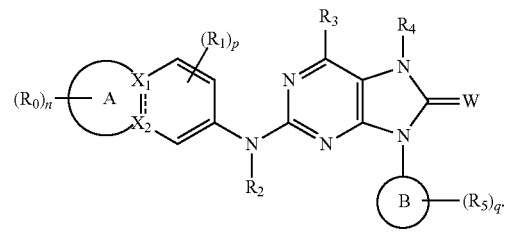

formula (I)

10 Claims, No Drawings

(56) References Cited

OTHER PUBLICATIONS

Christner, Susan M et al. "Quantitation of the DNA-dependent protein kinase inhibitor peposertib (M3814) and metabolite in human plasma by LC-MS/MS." Biomedical chromatography : BMC vol. 38,12 (2024): e6024. doi:10.1002/bmc.6024 (Year: 2024).*

Nutley, B., Smith, N., Hayes, A. et al. Preclinical pharmacokinetics and metabolism of a novel prototype DNA-PK inhibitor NU7026. Br J Cancer 93, 1011-1018 (2005). https://doi.org/10.1038/sj.bjc.6602823 (Year: 2005).*

Testa, Bernard, and Stefanie D Krämer. "The biochemistry of drug metabolism—an introduction: part 1. Principles and overview." Chemistry & biodiversity vol. 3, 10 (2006): 1053-101. doi:10.1002/cbdv.200690111 (Year: 2006).*

Testa, Bernard, and Stefanie D Krämer. "The biochemistry of drug metabolism—an introduction: Part 2. Redox reactions and their enzymes." Chemistry & biodiversity vol. 4,3 (2007): 257-405. doi:10.1002/cbdv.200790032 (Year: 2007).*

Testa, Bernard, and Stefanie D Krämer. "The biochemistry of drug metabolism—an introduction: part 3. Reactions of hydrolysis and their enzymes." Chemistry & biodiversity vol. 4,9 (2007): 2031-122. doi:10.1002/cbdv.200790169 (Year: 2007).*

Testa, Bernard, and Stefanie D Krämer. "The biochemistry of drug metabolism—an introduction: part 4. reactions of conjugation and their enzymes." Chemistry & biodiversity vol. 5,11 (2008): 2171-336. doi:10.1002/cbdv.200890199 (Year: 2008).*

Testa, Bernard, and Stefanie D Krämer. "The biochemistry of drug metabolism—an introduction: part 5. Metabolism and bioactivity." Chemistry & biodiversity vol. 6,5 (2009): 591-684. doi:10.1002/cbdv.200900022 (Year: 2009).*

Krämer, Stefanie D, and Bernard Testa. "The biochemistry of drug metabolism—an introduction: part 6. Inter-individual factors affecting drug metabolism." Chemistry & biodiversity vol. 5, 12 (2008): 2465-578. doi:10.1002/cbdv.200890214 (Year: 2008).*

Krämer, Stefanie D, and Bernard Testa. "The biochemistry of drug metabolism—an introduction: part 7. Intra-individual factors affecting drug metabolism." Chemistry & biodiversity vol. 6,10 (2009): 1477-660, table of contents. doi:10.1002/cbdv.200900233 (Year: 2009).*

Wanka et al., "The Lipophilic Bullet Hits the Targets: Medicinal Chemistry of Adamantane Derivatives," Chem. Rev. 2013, 113, 3516-3604.

Cannan et al., Mechanisms and Consequences of Double-strand DNA Break Formation in Chromatin; Journal Cell Physiology, Jan. 2016, vol. 231, I, pp. 3-14.

George et al., Review; DNA-dependent protein kinase: Epigenetic Alterations and the role in genomic stability of cancer; Elsevier; Mutation Research/Reviews in Mutation Research, 2019, vol. 780, pp. 92-105.

Goldberg et al., The Discovery of 7-Methyl-2-[(7-methyl[1,2,4]triazolo[1,5-a]pyridin-6-yl)amino]-9-(tetrahydro-2H-pyran-4-yl)-7,9-dihydro-8H-purin-8-one (AZD7648), a Potent and Selective DNA-Dependent Protein Kinase (DNA-PK) Inhibitor; Journal Medicinal Chemistry, 2020, vol. 63, pp. 3461-3471.

Ihara et al., Expression of the DNA-dependent protein kinase catalytic subunit is associated with the radiosensitivity of human thyroid cancer cell lines; Journal of Radiation Research, vol. 60, No. 2, 2019, pp. 171-177.

Maira et al., PI3K inhibitors for cancer treatment: where do we stand?; mTOR signalling, Biochemical Society Transactions; 2009, vol. 37,. Nutrients and Disease, pp. 265-272.

Sarkaria et al., Inhibition of Phosphoinositide 3-Kinase Related Kinases by tthe Radiosensitizing Agent Wortmannin; Cancer Research; 1998, vol. 58, pp. 4375-4382 (Published online Oct. 1, 1998).

* cited by examiner

PURINE DERIVATIVE AND MEDICAL USE THEREOF

This application is a U.S. national phase application of PCT/CN2020/141862, filed Dec. 30, 2020, which claims priority to CN Patent Application Serial No. 201911408681.4, filed Dec. 31, 2019 and CN Patent Application Serial No. 202010155797.8, filed Mar. 11, 2020, and CN Patent Application Serial No. 202010667388.6, filed Jul. 15, 2020, all of which are hereby incorporated by reference in their entireties.

TECHNICAL FIELD

The present invention relates to a purine derivative shown as general formula (I) or a stereoisomer, solvate, prodrug, metabolite, deuteride, pharmaceutically acceptable salt or cocrystal thereof, a pharmaceutical composition thereof, and use thereof in preparing a DNA-PK inhibitor.

BACKGROUND

DNA-dependent protein kinase (DNA-PK) is a DNA-PK enzyme complex consisting of Ku70/Ku80 heterodimer and DNA-dependent protein kinase catalytic subunit (DNA-PKcs).

The enzyme complex needs to be activated in the presence of DNA to perform the corresponding function (George et al, 2019). As a serine/threonine protein kinase, DNA-PK is a member of the PIKK (phosphatidylinositol 3-kinase-related kinase) family. It plays an important role in repairing intracellular DNA double-strand breaks (DSBs) and in the process of cellular DNA recombination or antibody DNA rearrangement (V(D)J recombination). Besides, it is also involved in physiological processes such as chromosome modification, transcriptional regulation and telomere maintenance.

In normal physiological processes, a number of factors may contribute to DSBs of DNA: for example, DSBs often appear as intermediates during somatic DNA recombination, a physiological process that is very important for the development of the functional immune system in all vertebrates; encounters of replication forks with damaged bases in the process of DNA replication may also lead to single- or double-strand breaks; DSBs may also occur as a result of attacks by reactive oxygen species (ROS) against DNA in normal metabolic processes (Cannan & Pederson, 2016). Besides, there are a number of extrinsic factors that may also contribute to DSBs, such as ionizing radiation (IR) and chemotherapeutic agents (e.g., topoisomerase II inhibitors) (George et al, 2019). If DSBs are not repaired or are incorrectly repaired, mutations and/or chromosomal aberration will occur, eventually leading to cell death. In response to the hazards posed by DSBs, eukaryotic cells have evolved multiple mechanisms for repairing damaged DNA to maintain cell viability and genome stability. In eukaryotic cells, the predominant mode of DNA repair is non-homologous end-joining (NHEJ). This direct joining of broken DNA does not require the involvement of homologous DNA fragments and may occur at any stage of the cell cycle. NHEJ is a dynamic process that is mediated by DNA-PK and requires the involvement of a variety of proteins in conjunction with signaling pathways, basically as follows: (1) Ku70/Ku80 heterodimer recognizes and binds to the termini of a double-stranded DNA break; (2) proteins such as DNA-PKcs and XRCC4-DNA ligase IV complex are recruited to both sides of the two strands of the broken DNA; (3) DNA-PKcs autophosphorylates and activates its own kinase activity; (4) DNA-PKcs is used as an adhesive to ligate two ends of the broken DNA so as to prevent the DNA from being degraded by exonucleases; (5) the DNA is processed to remove non-ligatable termini and other forms of damage at the break; (6) XRCC4-DNA ligase IV complex repairs DNA termini (in some cases, DNA polymerase may be required to synthesize new termini prior to ligation). When DNA-PKcs is phosphorylated, a variety of proteins in the NHEJ process (such as Artemis, Ku70, Ku80 and DNA ligase) can be induced to change in conformation to regulate their activity, which is very important for the DNA repair process. Therefore, the phosphorylated DNA-PKcs (pDNA-PKcs) is often used as a marker for cellular DSBs.

It has been shown that the DNA-PK activity is associated with the development and progression of a variety of tumors: for example, DNA-PKcs in melanoma can promote angiogenesis and tumor metastasis; the expression level of DNA-PKcs in multiple myeloma is significantly up-regulated; the Ku protein content in radiotherapy-resistant thyroid tumors is significantly increased (Ihara, Ashizawa, Shichijo & Kudo, 2019). Therefore, it is contemplated that DNA-PK inhibitors may be used in combination with an anti-tumor therapy that causes DNA damage (e.g., IR or a chemotherapeutic agent) to improve the effects. The use of DNA-PK inhibitors may interfere to some extent with the DNA repair function of normal cells. However, there are many DNA repair pathways in normal cells as supplements, while tumor cells are under considerable DNA replication stress and lack efficient DNA repair modes. The killing effects of other anti-tumor drugs on tumor cells can be improved by inhibiting the DNA-PK activity of the tumor cells.

After years of research, a number of DNA-PK inhibitors have been found at present. The first compound found to have inhibitory activity against DNA-PK kinase is Wortmannin, a fungal metabolite with an IC50 (DNA-PK) of about 15 nM. This compound also plays an important role in both the processes of acetylation and phosphorylation of p53 protein (Sarkaria et al., 1998). The quercetin derivative LY294002 reported later also has inhibitory activity against DNA-PK (Maira, Stauffer, Schnell, & Garcia-Echeverria, 2009). Later, a new generation of DNA-PK inhibitors such as NU7026 and NU7441 are developed based on the structure of LY294002. Although these compounds have been proved to have good killing effects on tumor cells, they cannot be clinically developed due to the problems such as their high toxicity and poor selectivity (Maira et al, 2009). Other DNA-PK inhibitors, such as small molecule compounds OK1035, SU11752, PP121 and KU-0060648, have also been reported; however, these compounds also have disadvantages such as being less specific for DNA-PK (George et al, 2019). Therefore, there is still a need to develop DNA-PK inhibitors with high activity, high specificity and low toxicity so as to better meet clinical needs.

SUMMARY

One or more embodiments of the present invention provide a purine derivative or all stereoisomers, solvates, metabolites, deuterides, pharmaceutically acceptable salts, cocrystals or prodrugs thereof, a pharmaceutical composition thereof, and use thereof in preparing a DNA-PK inhibitor.

In one or more embodiments, the compounds have high inhibitory activity against and/or high selectivity for DNA-PK. They can overcome the disadvantages in the prior art and can be used as chemosensitizers and radiosensitizers effective in treating cancer, improving the efficacy of the prior art while reducing toxic side effects.

One or more embodiments of the present invention disclose a compound shown as general formula (I) or all stereoisomers, solvates, prodrugs, metabolites, deuterides, pharmaceutically acceptable salts or cocrystals thereof:

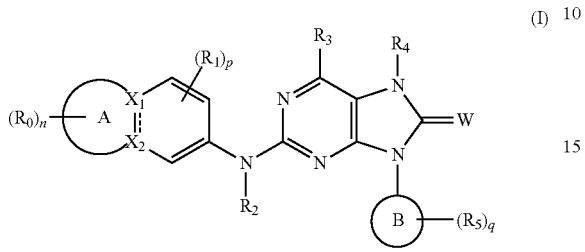

wherein,

A is absent or is selected from a 4-12 membered heterocycle containing 1 to 4 heteroatoms selected from N, O and S;

$X_1$ and $X_2$ are each independently selected from C, O, N and S, and when A is selected from a 4-12 membered heterocycle, $X_1$ and $X_2$ are part of ring A;

B is selected from adamantyl;

$R_0$ and $R_1$ are each independently selected from H, halogen, carboxyl, =O, —OH, cyano, —$NR^{a1}R^{a2}$, $C_{1-6}$ alkyl, —$C_{1-6}$ alkylene-OH, —$C_{1-6}$ alkylene-$NR^{a1}R^{a2}$, $C_{1-6}$ alkoxy, —C(=O)O$C_{1-6}$ alkyl, —C(=O)$NR^{a1}R^{a2}$, $C_{2-6}$ alkenyl and $C_{2-6}$ alkynyl, wherein the $C_{1-6}$ alkyl, $C_{1-6}$ alkylene and $C_{1-6}$ alkoxy are optionally further substituted with 1-3 substituents selected from D and halogen; or when n is selected from 2, 3 and 4, two $R_0$, together with atoms to which they are attached, may form a 3-8 membered ring, wherein the 3-8 membered ring optionally contains 1 to 3 heteroatoms selected from N, O and S, and is optionally further substituted with 1 or more substituents selected from —OH, carboxyl, halogen, cyano, =O, $C_{1-6}$ alkyl and amino;

$R_2$ is selected from H and $C_{1-6}$ alkyl;

$R_3$ is selected from H, halogen, $C_{1-6}$ alkyl and $C_{1-6}$ alkoxy;

$R_4$ is selected from H, $C_{1-6}$ alkyl, $C_{3-12}$ cycloalkyl, $C_3$ heterocycloalkyl and $C_{4-12}$ heterocycloalkyl, wherein the $C_3$ heterocycloalkyl or $C_{4-12}$ heterocycloalkyl contains 1 to 3 heteroatoms selected from N, O and S, and the $C_{1-6}$ alkyl, $C_{3-12}$ cycloalkyl, $C_3$ heterocycloalkyl or $C_{4-12}$ heterocycloalkyl is optionally substituted with 1 or more substituents selected from —OH, D, halogen, cyano, carboxyl, —$NH_2$, =O, —C(=O)$NH_2$, $C_{1-6}$ alkyl, —$C_{1-6}$ alkylene-OH, $C_{1-6}$ alkoxy, $C_{2-6}$ alkenyl, $C_{2-6}$ alkynyl, $C_{3-12}$ cycloalkyl, $C_3$ heterocycloalkyl, $C_{4-12}$ heterocycloalkyl, $C_{6-12}$ aryl and $C_{5-12}$ heteroaryl; or, $R_3$ and $R_4$, together with atoms to which they are attached, form a 4-12 membered heterocycle, wherein the heterocycle may contain 1 to 3 heteroatoms selected from N, O and S, and the 4-12 membered heterocycle is optionally substituted with 1 or more substituents selected from —OH, carboxyl, halogen, cyano, =O, $C_{1-6}$ alkyl, $C_{1-6}$ heteroalkyl, $C_{2-6}$ alkenyl, $C_{2-6}$ alkynyl, —$NR^{a1}R^{a2}$, —C(=O)O$C_{1-6}$ alkyl, —C(=O)$NR^{a1}R^{a2}$, $C_{3-12}$ cycloalkyl, $C_3$ heterocycloalkyl, $C_{4-12}$ heterocycloalkyl, $C_{6-12}$ aryl and $C_{5-12}$ heteroaryl, wherein the $C_{1-6}$ alkyl, $C_{1-6}$ heteroalkyl, $C_{1-6}$ alkenyl or $C_{1-6}$ alkynyl is optionally further substituted with 1 or more substituents selected from —OH, carboxyl, cyano, halogen, —O—$R^{a1}$, —$NR^{a1}R^{a2}$, $C_{3-12}$ cycloalkyl, $C_3$ heterocycloalkyl, $C_{4-12}$ heterocycloalkyl, $C_{6-12}$ aryl and $C_{5-12}$ heteroaryl;

$R_5$ is selected from —OH, D, halogen, cyano, carboxyl, =O, $C_{1-6}$ alkyl, $C_{1-6}$ alkoxy, $C_{2-6}$ alkenyl, $C_{2-6}$ alkynyl, —$NR^{a1}R^{a2}$, —C(=O)O$C_{1-6}$ alkyl, —OC(=O)$C_{1-6}$ alkyl, —C(=O)$NR^{a1}R^{a2}$, $C_{3-12}$ cycloalkyl, $C_3$ heterocycloalkyl, $C_{4-12}$ heterocycloalkyl, $C_{6-12}$ aryl and $C_{5-12}$ heteroaryl, wherein the $C_{1-6}$ alkyl, $C_{1-6}$ alkoxy, $C_{3-12}$ cycloalkyl, $C_{4-12}$ heterocycloalkyl, $C_{6-12}$ aryl and $C_{5-12}$ heteroaryl are optionally further substituted with 1 to 3 substituents selected from OH, carboxyl, halogen, $C_{1-6}$ alkyl, $C_{1-6}$ alkoxy, —$NR^{a1}R^{a2}$ and =O;

$R^{a1}$ and $R^{a2}$ are each independently selected from H, $C_{1-6}$ alkyl, —C(=O)$R^{a3}$ and —C(=O)$NR^{a4}R^{a5}$ wherein the $C_{1-6}$ alkyl is optionally further substituted with 1 or more substituents selected from OH, halogen, $C_{1-6}$ alkyl, $C_{1-6}$ alkoxy, $C_{6-12}$ aryl, $C_{5-12}$ heteroaryl, $C_{3-12}$ cycloalkyl, $C_3$ heterocycloalkyl and $C_{4-12}$ heterocycloalkyl; or $R^{a1}$ and $R^{a2}$, together with a N atom form a 3-12 membered heterocycle, which contains 1 to 4 heteroatoms selected from N, O and S;

$R^{a3}$ is selected from $C_{1-6}$ alkyl, $C_{1-6}$ alkoxy and $C_{6-12}$ aryl;

$R^{a4}$ and $R^{a5}$ are each independently selected from H and $C_{1-6}$ alkyl;

W is selected from O and S;

n, p and q are each independently selected from 0, 1, 2, 3 or 4;

===== is a single bond or a double bond.

One or more embodiments provide a compound shown as general formula (II) or a stereoisomer, solvate, metabolite, prodrug, deuteride, pharmaceutically acceptable salt or cocrystal thereof:

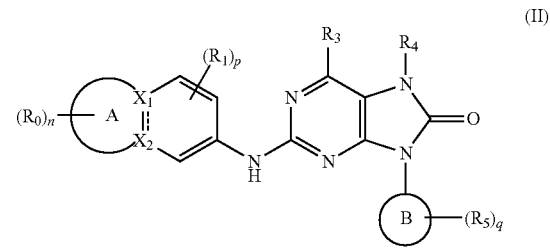

wherein,

A is absent or is selected from a 4-12 membered heterocycle containing 1 to 4 heteroatoms selected from N, O and S;

$X_1$ and $X_2$ are each independently selected from C and N, and when A is selected from a 4-12 membered heterocycle, $X_1$ and $X_2$ are part of ring A;

B is selected from adamantyl;

$R_0$ and $R_1$ are each independently selected from H, halogen, carboxyl, =O, —OH, cyano, —$NR^{a1}R^{a2}$, $C_{1-6}$ alkyl, —$C_{1-6}$ alkylene-OH, —$C_{1-6}$ alkylene-$NR^{a1}R^{a2}$, $C_{1-6}$ alkoxy, —C(=O)O$C_{1-6}$ alkyl, —C(=O)$NR^{a1}R^{a2}$, $C_{2-6}$ alkenyl and $C_{2-6}$ alkynyl, wherein the $C_{1-6}$ alkyl, $C_{1-6}$ alkylene and $C_{1-6}$ alkoxy are optionally further substituted with 1-3 substituents selected from D and halogen; or when n is selected from 2, 3 and 4, two $R_0$, together with atoms to which they are attached, may form a 3-8 membered ring, wherein the ring optionally contains 1 to 3 heteroatoms selected from N, O and S, and is optionally further substituted with 1 or more substituents selected from —OH, carboxyl, halogen, cyano, =O, $C_{1-6}$ alkyl and amino;

$R_3$ is selected from H, halogen, $C_{1-6}$ alkyl and $C_{1-6}$ alkoxy;

$R_4$ is selected from H, $C_{1-6}$ alkyl, $C_{3-12}$ cycloalkyl, $C_3$ heterocycloalkyl and $C_{4-12}$ heterocycloalkyl, wherein the $C_3$ heterocycloalkyl or $C_{4-12}$ heterocycloalkyl contains 1 to 3 heteroatoms selected from N, O and S, and the $C_{1-6}$ alkyl, $C_{3-12}$ cycloalkyl, $C_3$ heterocycloalkyl or $C_{4-12}$ heterocycloalkyl is optionally substituted with 1 or more substituents selected from —OH, D, halogen, cyano, carboxyl, —NH$_2$, =O, —C(=O)NH$_2$, $C_{1-6}$ alkyl, —$C_{1-6}$ alkylene-OH, $C_{1-6}$ alkoxy, $C_{2-6}$ alkenyl, $C_{2-6}$ alkynyl, $C_{3-12}$ cycloalkyl, $C_3$ heterocycloalkyl, $C_{4-12}$ heterocycloalkyl, $C_{6-12}$ aryl and $C_{5-12}$ heteroaryl;

$R_5$ is selected from —OH, D, halogen, cyano, carboxyl, =O, $C_{1-6}$ alkyl, $C_{1-6}$ alkoxy, $C_{2-6}$ alkenyl, $C_{2-6}$ alkynyl, —NR$^{a1}$R$^{a2}$, —C(=O)OC$_{1-6}$ alkyl, —OC(=O)C$_{1-6}$ alkyl, —C(=O)NR$^{a1}$R$^{a2}$, $C_{3-12}$ cycloalkyl, $C_3$ heterocycloalkyl, $C_{4-12}$ heterocycloalkyl, $C_{6-12}$ aryl and $C_{5-12}$ heteroaryl, wherein the $C_{1-6}$ alkyl, $C_{1-6}$ alkoxy, $C_{3-12}$ cycloalkyl, $C_{4-12}$ heterocycloalkyl, $C_{6-12}$ aryl and $C_{5-12}$ heteroaryl are optionally further substituted with 1 to 3 substituents selected from OH, carboxyl, halogen, $C_{1-6}$ alkyl, $C_{1-6}$ alkoxy, —NR$^{a1}$R$^{a2}$ and =O;

R$^{a1}$ and R$^{a2}$ are each independently selected from H, $C_{1-6}$ alkyl, —C(=O)R$^{a3}$ and —C(=O)NR$^{a4}$R$^{a5}$ wherein the $C_{1-6}$ alkyl is optionally further substituted with 1 or more substituents selected from OH, halogen, $C_{1-6}$ alkyl, $C_{1-6}$ alkoxy, $C_{6-12}$ aryl, $C_{5-12}$ heteroaryl, $C_{3-12}$ cycloalkyl, $C_3$ heterocycloalkyl and $C_{4-12}$ heterocycloalkyl; or R$^{a1}$ and R$^{a2}$, together with a N atom form a 3-12 membered heterocycle, which may contain 1 to 4 heteroatoms selected from N, O and S;

R$^{a3}$ is selected from $C_{1-6}$ alkyl, $C_{1-6}$ alkoxy and $C_{6-12}$ aryl;

R$^{a4}$ and R$^{a5}$ are each independently selected from H and $C_{1-6}$ alkyl; or R$^{a4}$ and R$^{a5}$, together with a N atom, form a 3-12 membered heterocycle, which contains 1 to 4 heteroatoms selected from N, O and S;

n, p and q are each independently selected from 0, 1, 2, 3 and 4;

===== is a single bond or a double bond.

One or more embodiments of the present application provide a compound shown as general formula (III), (IV), (V), (VI), (VII) or (VIII) or a stereoisomer, solvate, metabolite, prodrug, deuteride, pharmaceutically acceptable salt or cocrystal thereof:

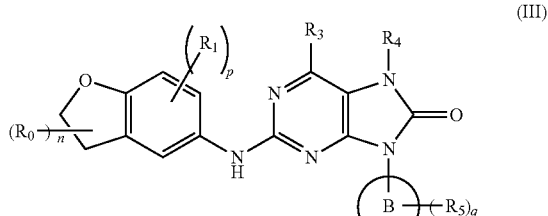

(III)

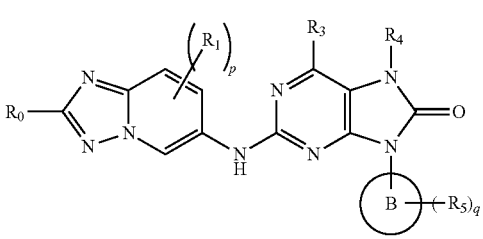

(IV)

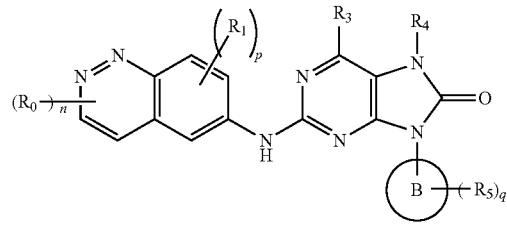

(V)

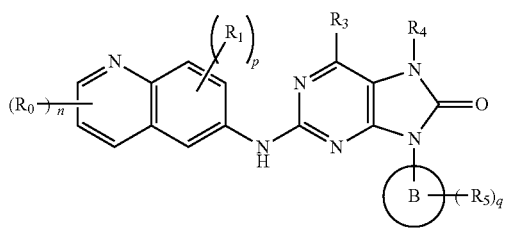

(VI)

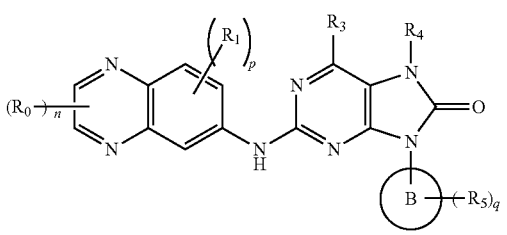

(VII)

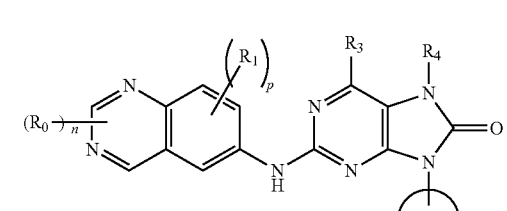

(VIII)

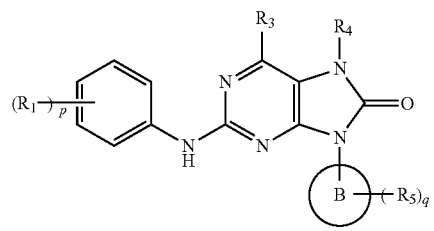

(VIX)

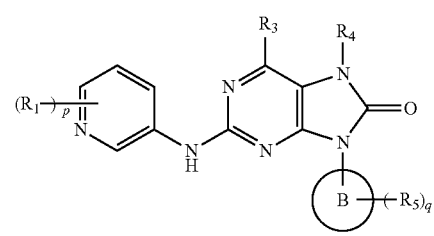

(VX)

$R_0$, $R_1$, $R_3$, $R_4$, $R_5$, B, n, p and q are defined in the same way as in general formula (II).

One or more embodiments of the present application provide a compound or a stereoisomer, solvate, metabolite, prodrug, deuteride, pharmaceutically acceptable salt or cocrystal thereof:

A is absent or is selected from a 5 membered heterocycle containing 1 to 3 heteroatoms selected from N and O;

$X_1$ and $X_2$ are each independently selected from C and N, and when A is selected from a 5 membered heterocycle, $X_1$ and $X_2$ are part of ring A;

B is selected from adamantyl;

$R_0$ is selected from H;

$R_1$ is selected from H, halogen, $C_{1-4}$ alkyl, cyano and —C(=O)NR$^{a1}$R$^{a2}$, wherein the $C_{1-4}$ alkyl is optionally further substituted with 1-3 substituents selected from D and halogen;

$R_3$ is selected from H;

$R_4$ is selected from H and $C_{1-4}$ alkyl;

$R_5$ is selected from —OH, D, cyano, —NR$^{a1}$R$^{a2}$, $C_{1-4}$ alkyl, $C_{1-4}$ alkoxy, —C(=O)OC$_{1-4}$ alkyl, carboxyl, halogen, =O and —C(=O)NR$^{a1}$R$^{a2}$, wherein the $C_{1-4}$ alkyl and $C_{1-4}$ alkoxy are optionally further substituted with 1 to 3 substituents selected from OH and halogen;

R$^{a1}$ and R$^{a2}$ are each independently selected from H and $C_{1-4}$ alkyl; or R$^{a1}$ and R$^{a2}$, together with a N atom, form a 6 membered heterocycle, which contains 1 to 2 heteroatoms selected from N and O;

n is selected from 0 and 1;

p is selected from 1, 2 and 3;

q is selected from 1 and 2;

===== is a single bond or a double bond.

One or more embodiments of the present application provide a compound or a stereoisomer, solvate, metabolite, prodrug, deuteride, pharmaceutically acceptable salt or cocrystal thereof, wherein the compound is selected from, but is not limited to:

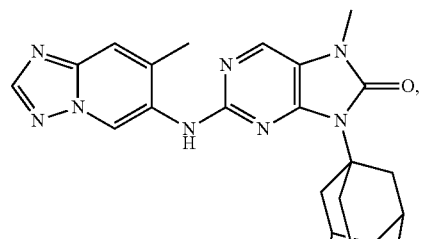

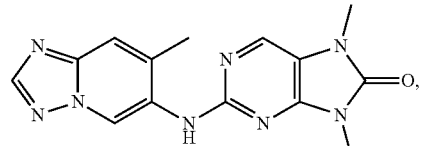

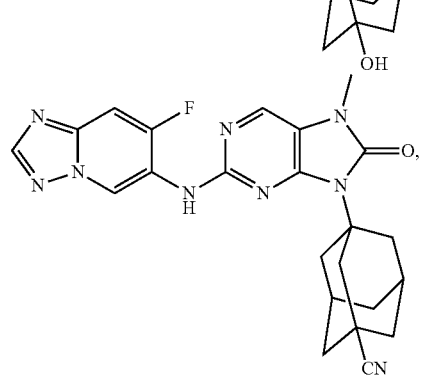

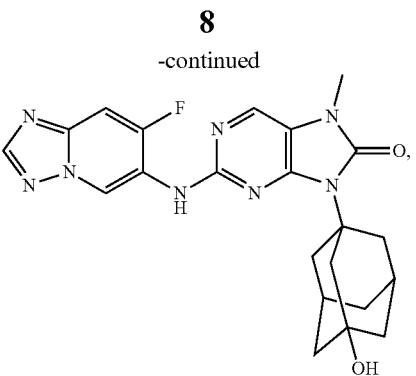

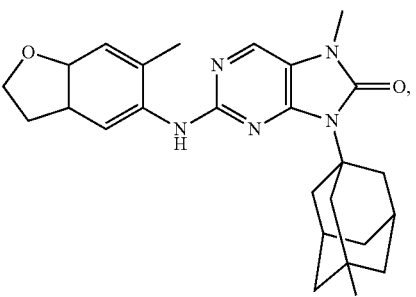

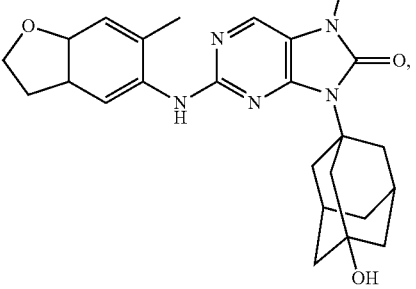

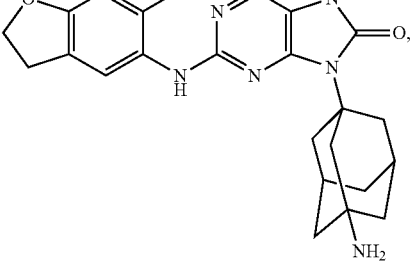

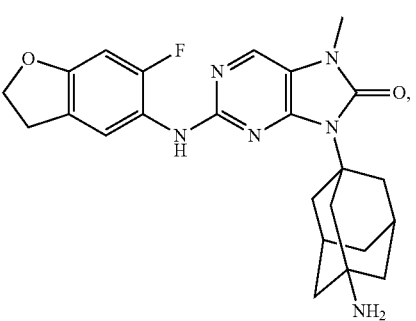

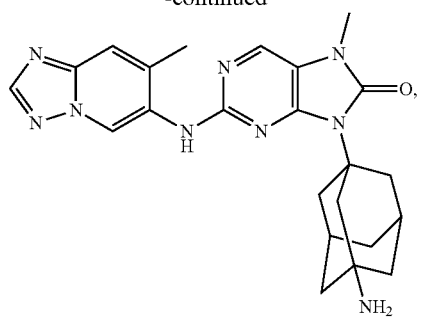
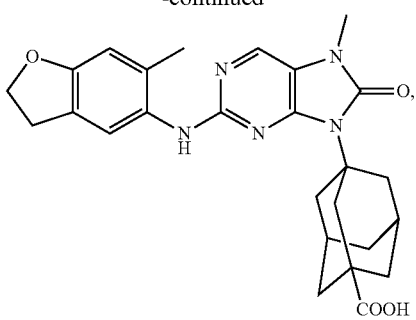
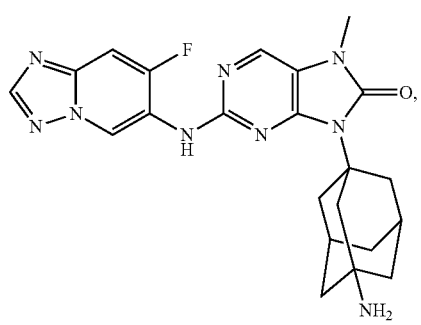
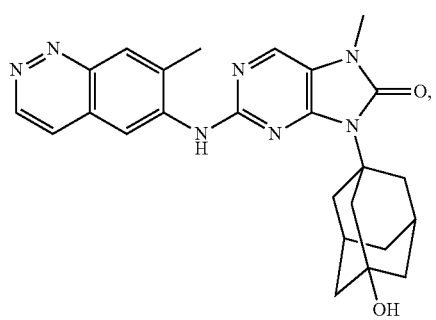
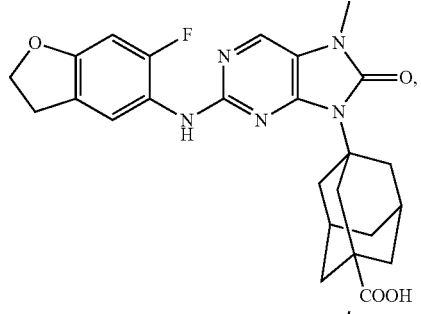
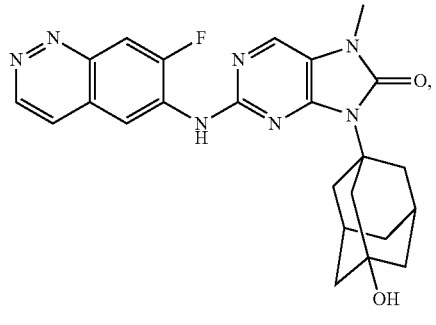
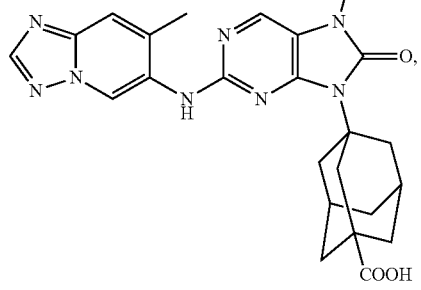
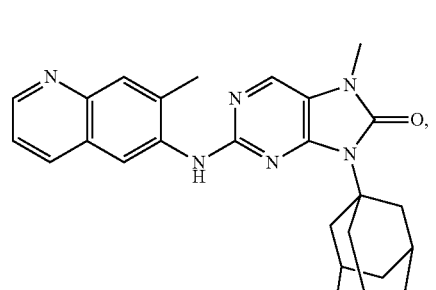
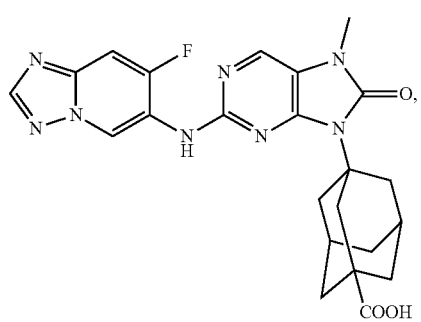
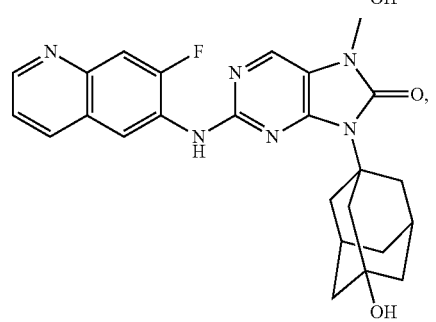

11
-continued
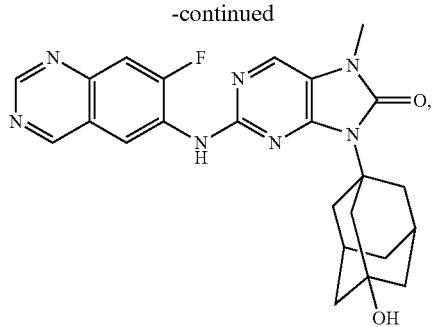
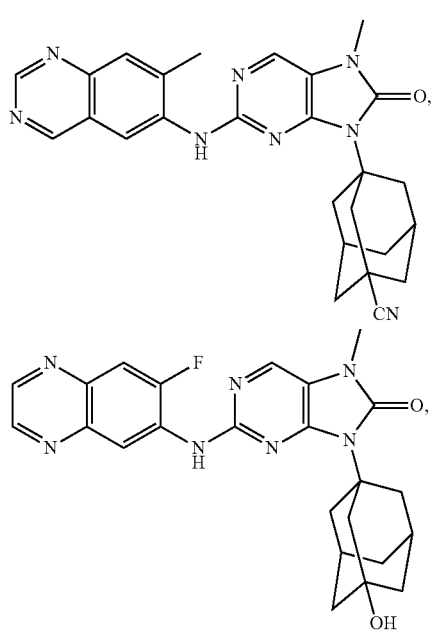
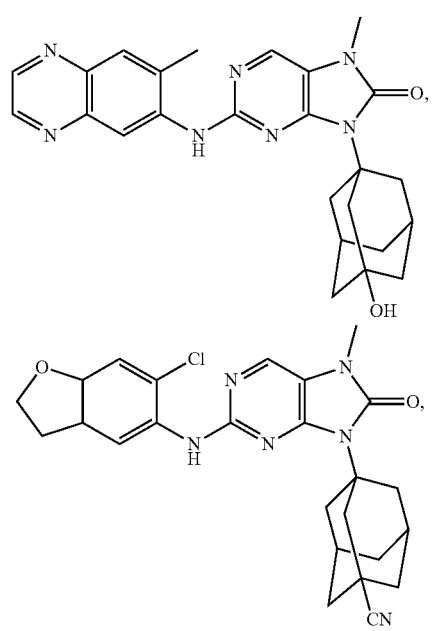
12
-continued
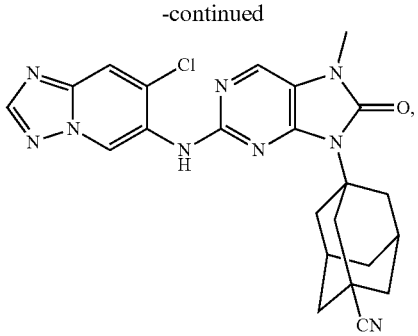
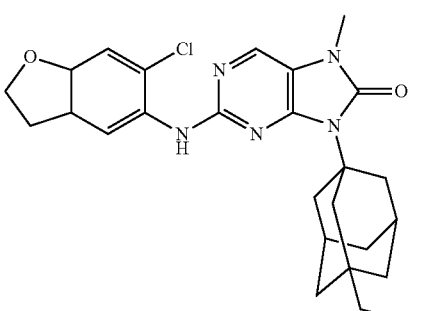
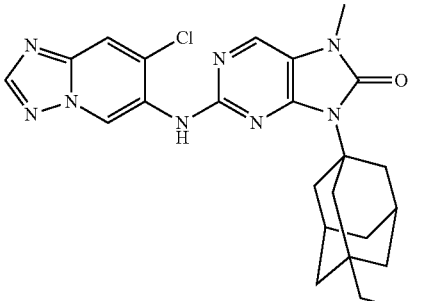
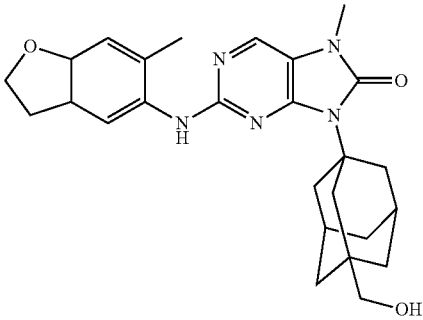
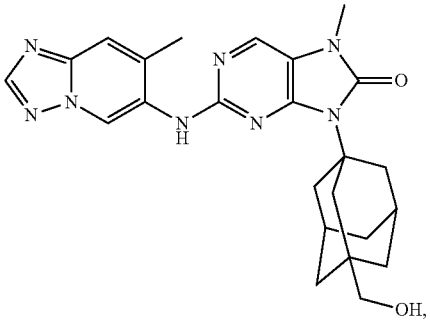

-continued
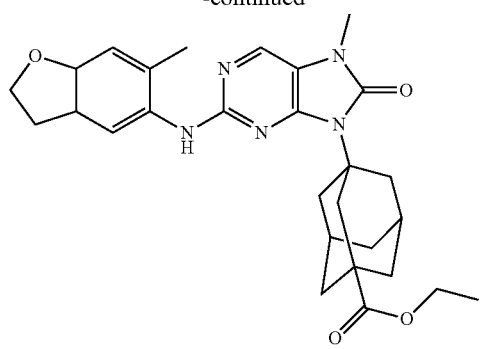
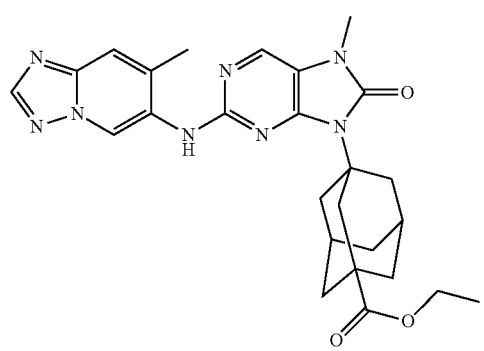
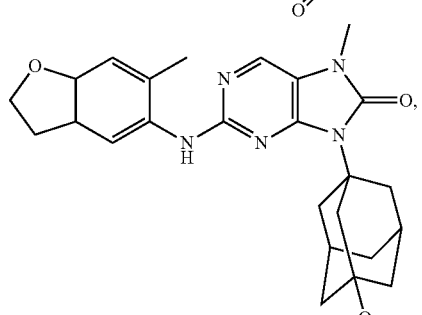
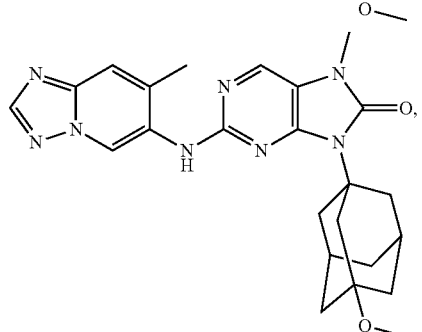
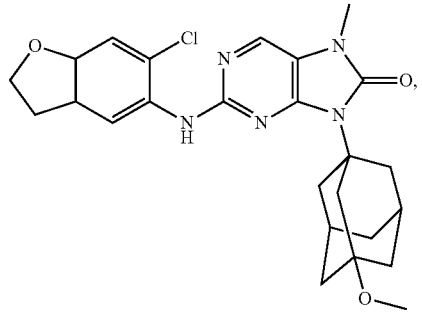
-continued
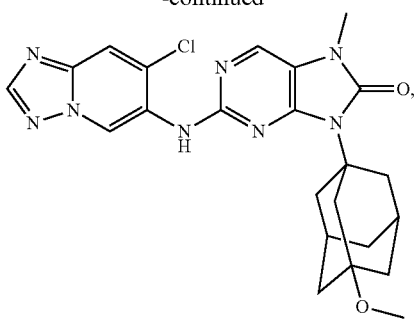
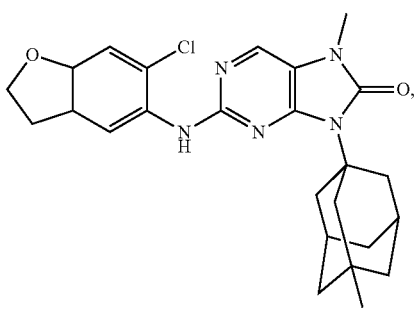
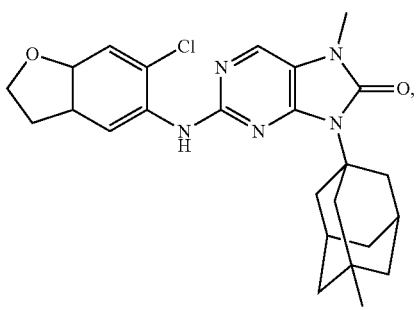
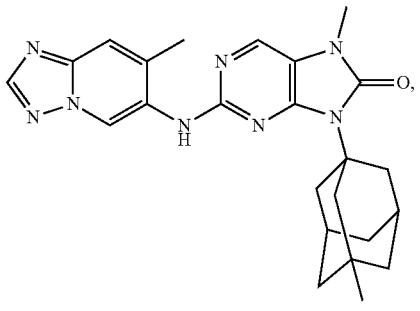

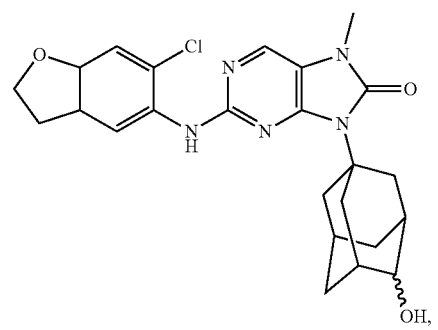
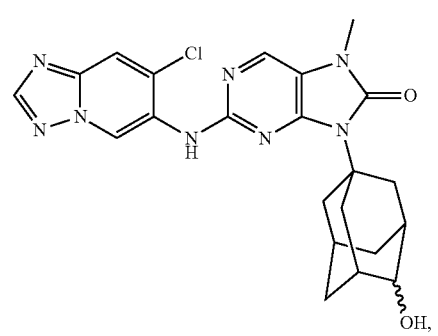
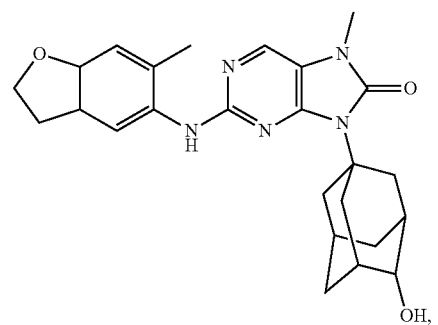
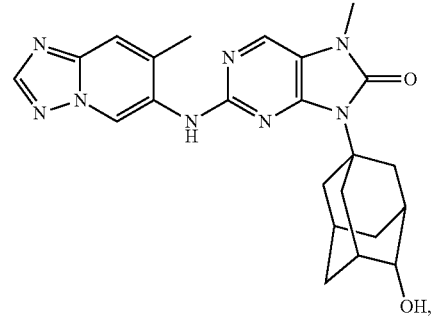
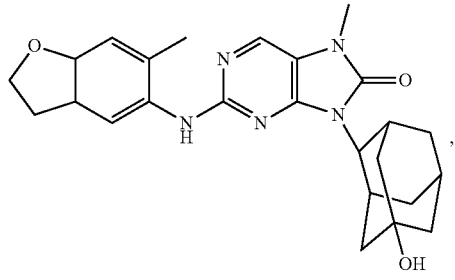
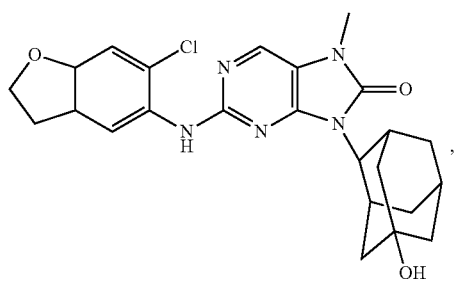
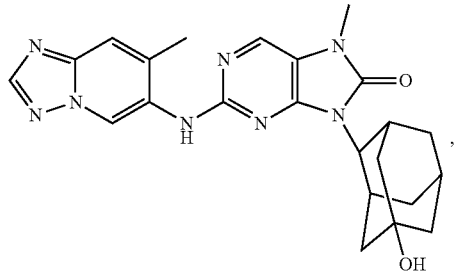
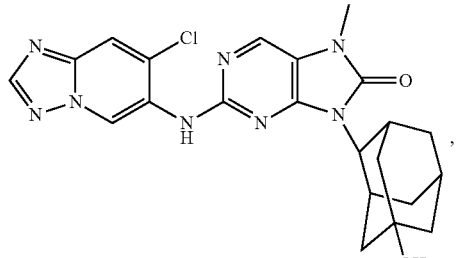
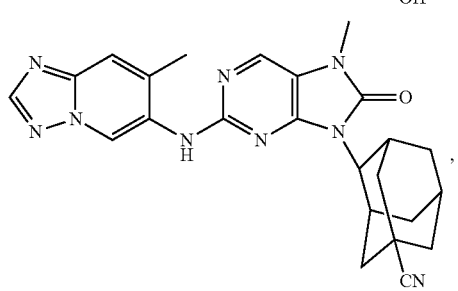
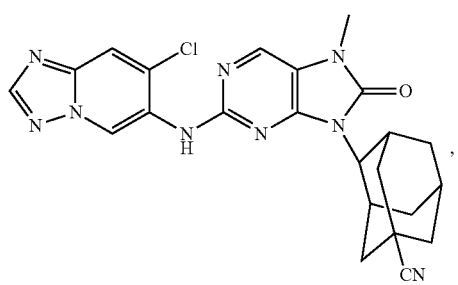
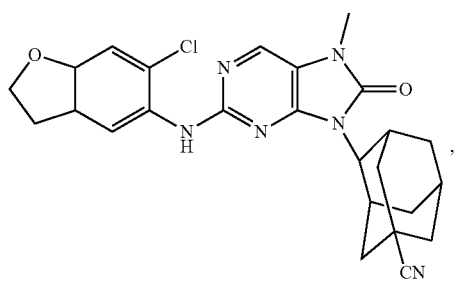

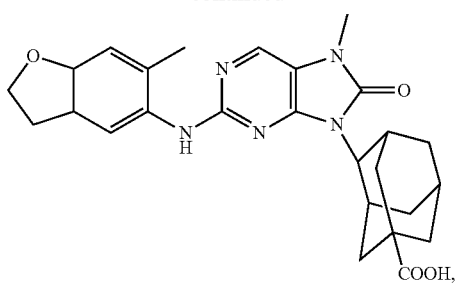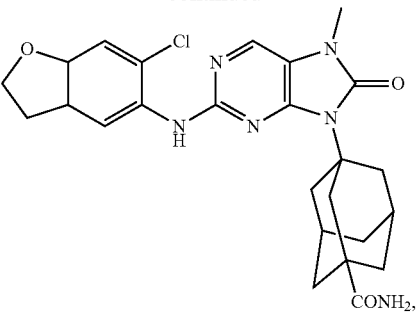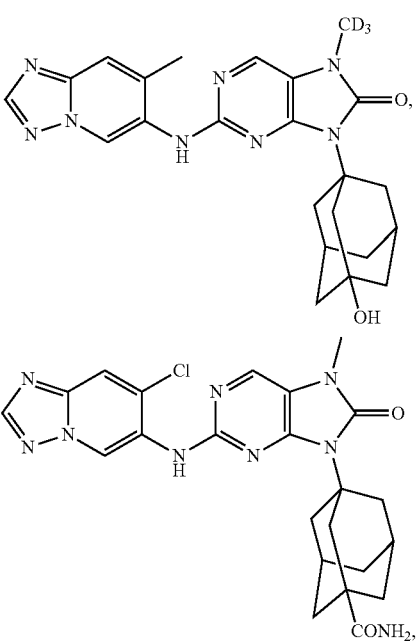

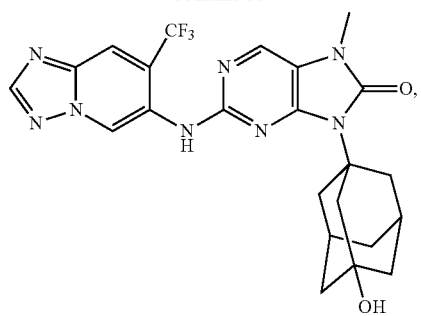
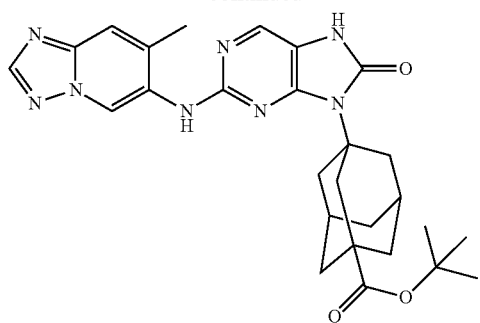
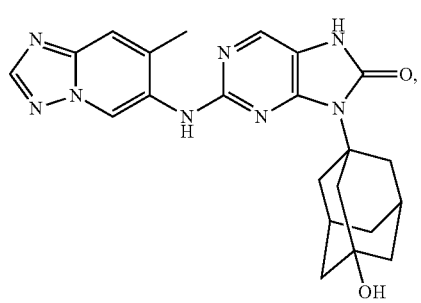
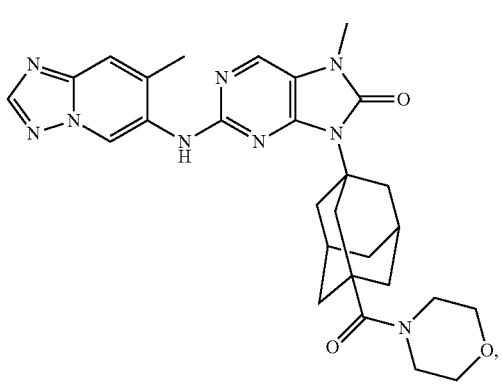
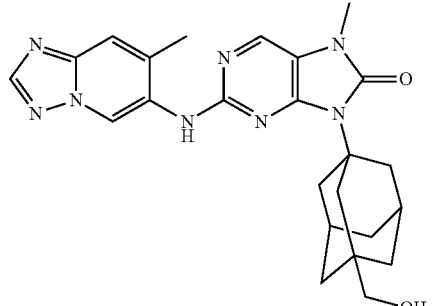
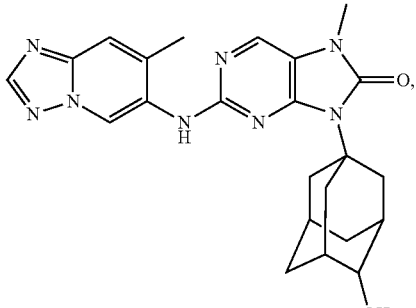
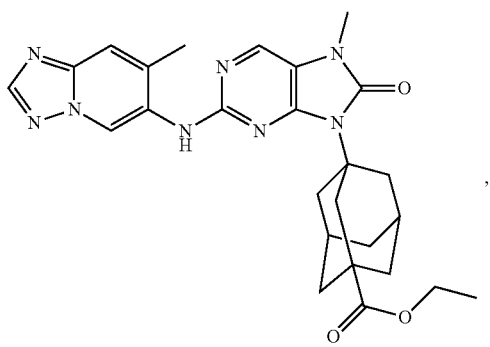
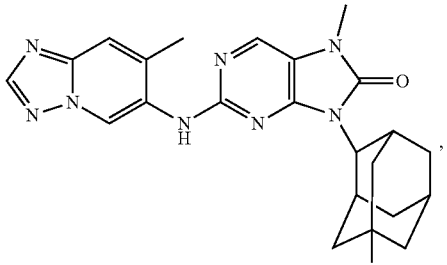
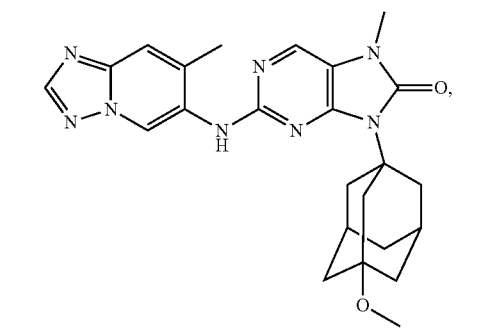
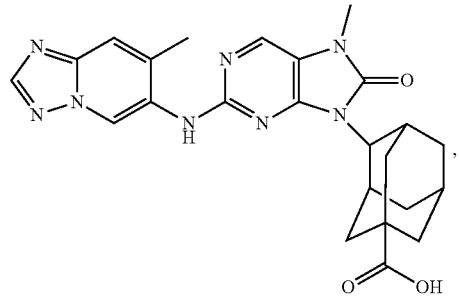

-continued
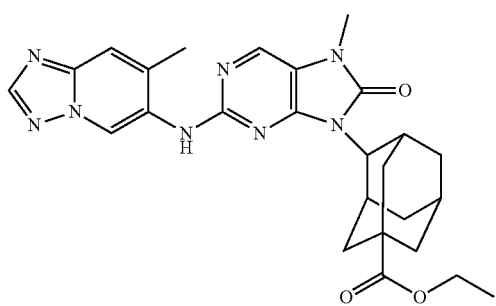
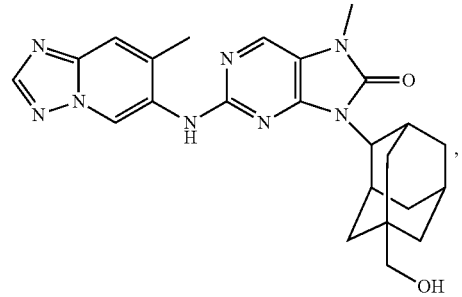
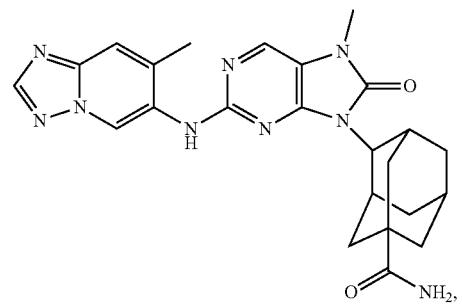
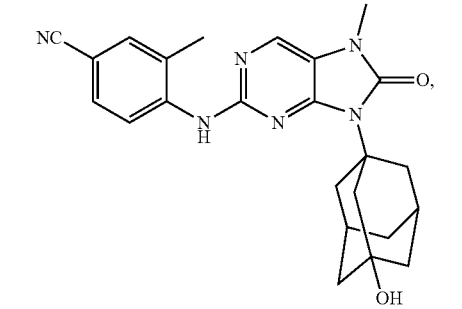
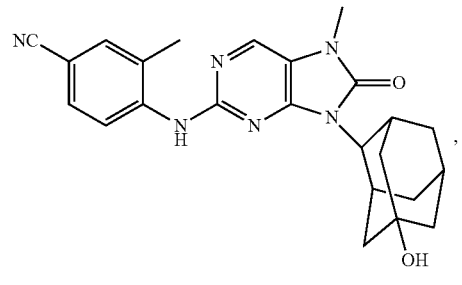
-continued
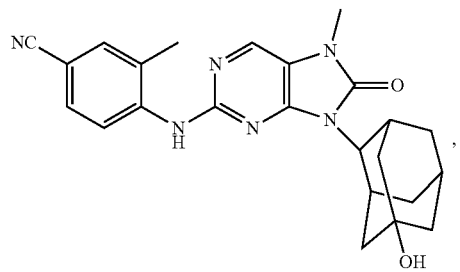
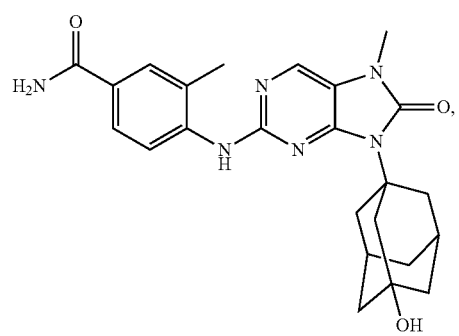
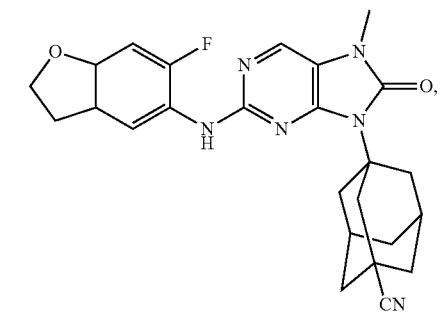
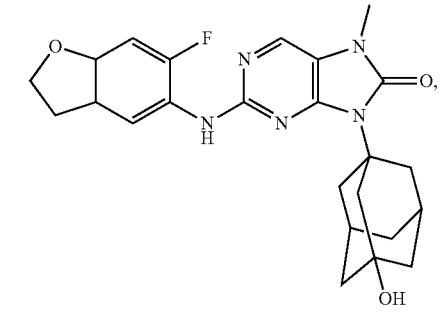
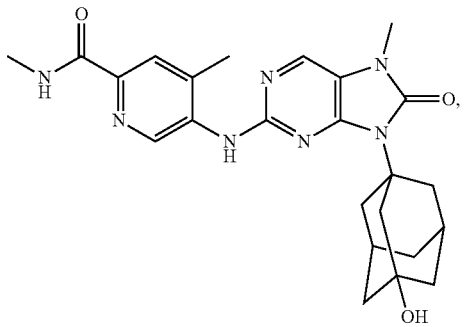

23
-continued
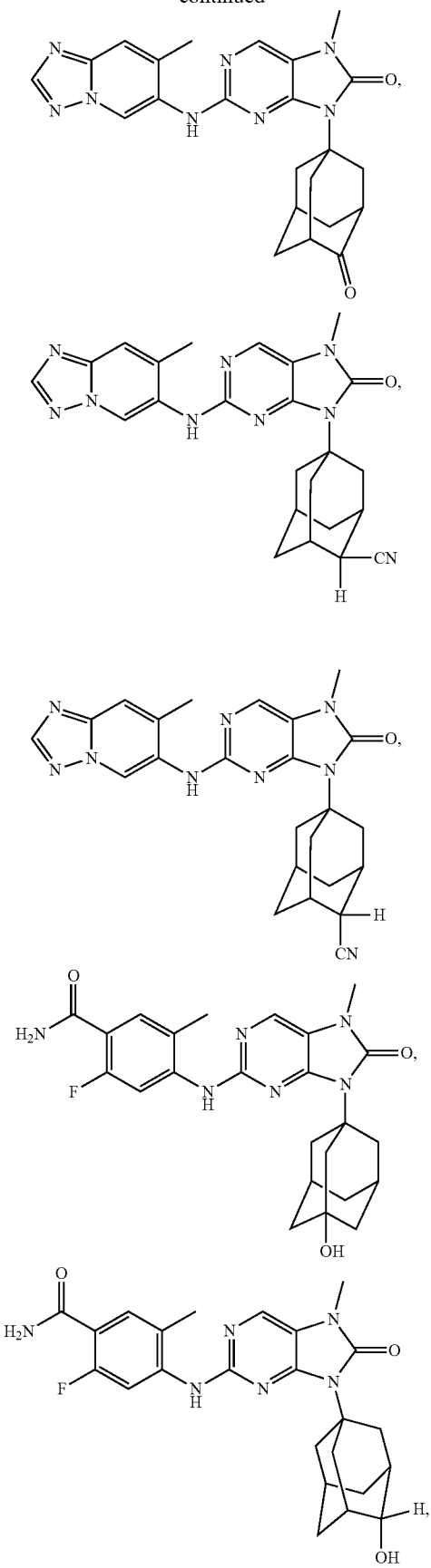
24
-continued
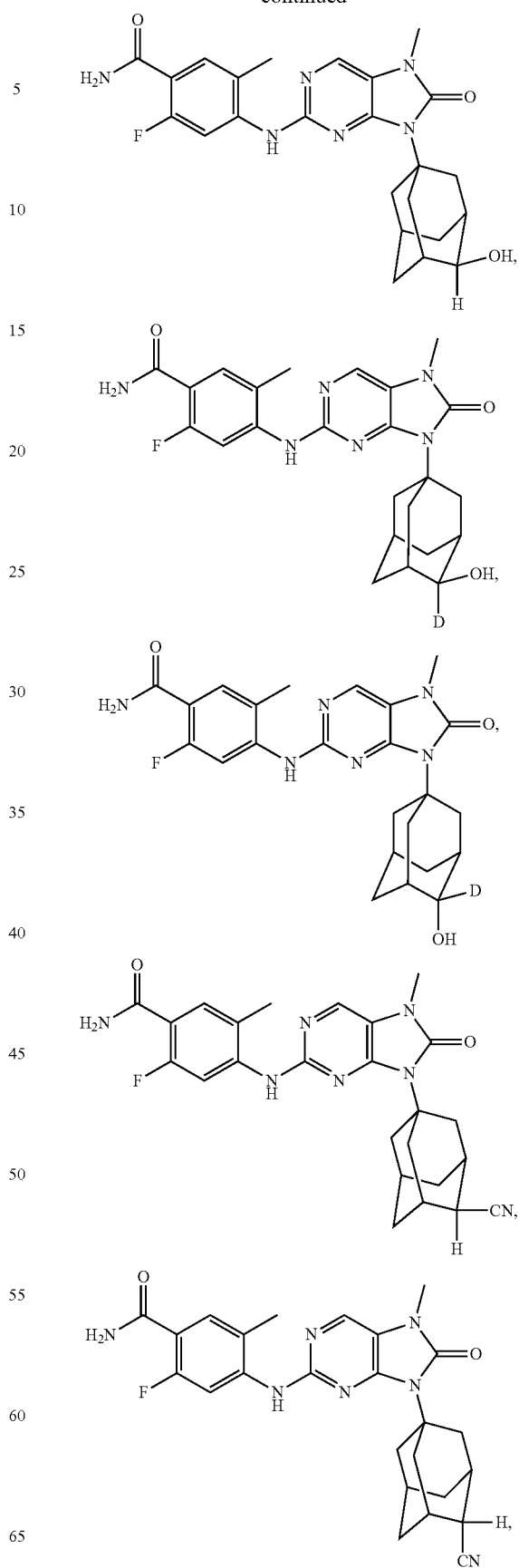

-continued
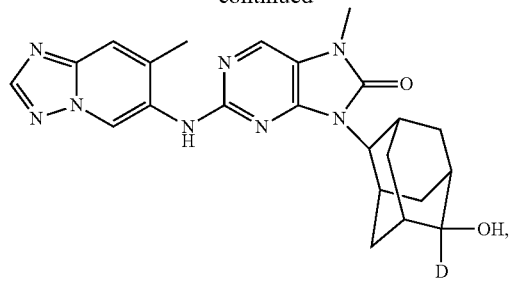
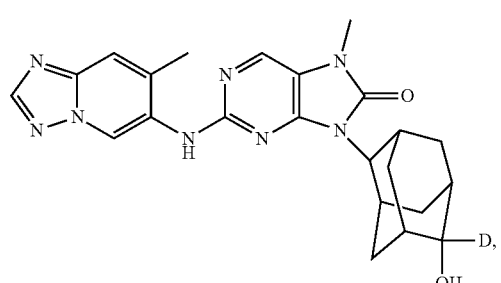
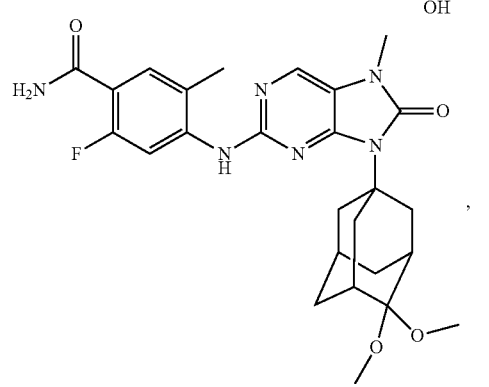
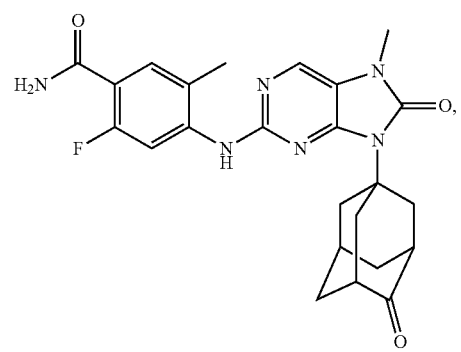
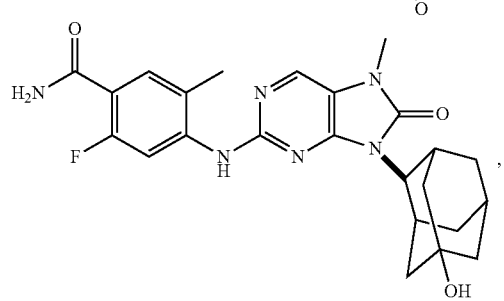
-continued
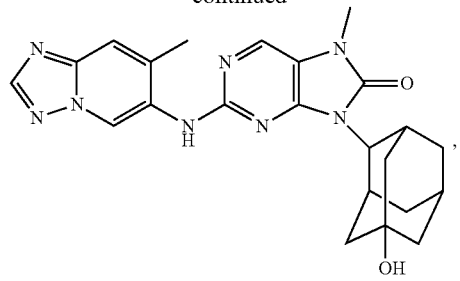
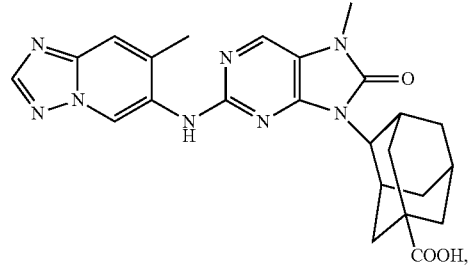
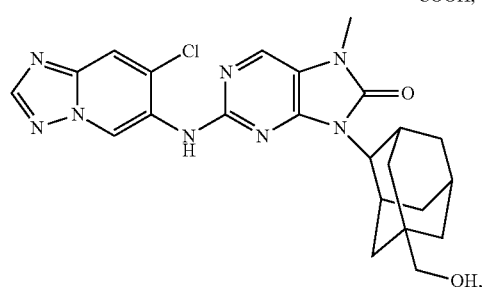
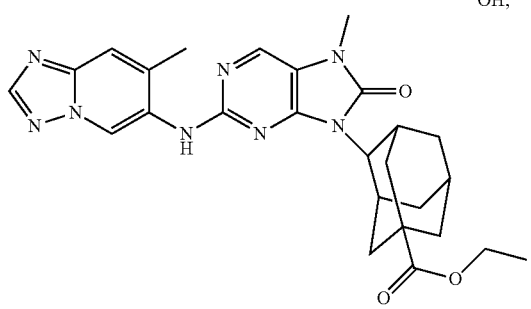
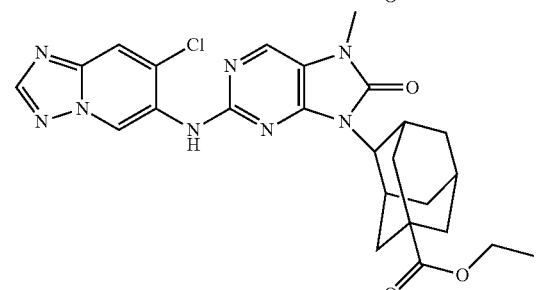
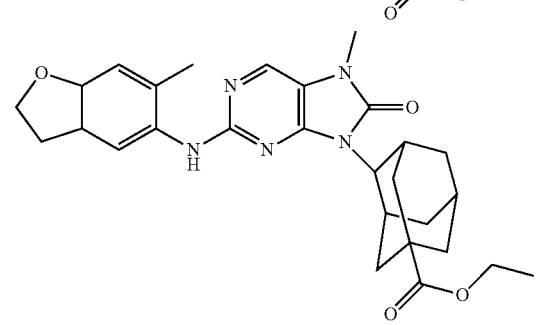

27
-continued
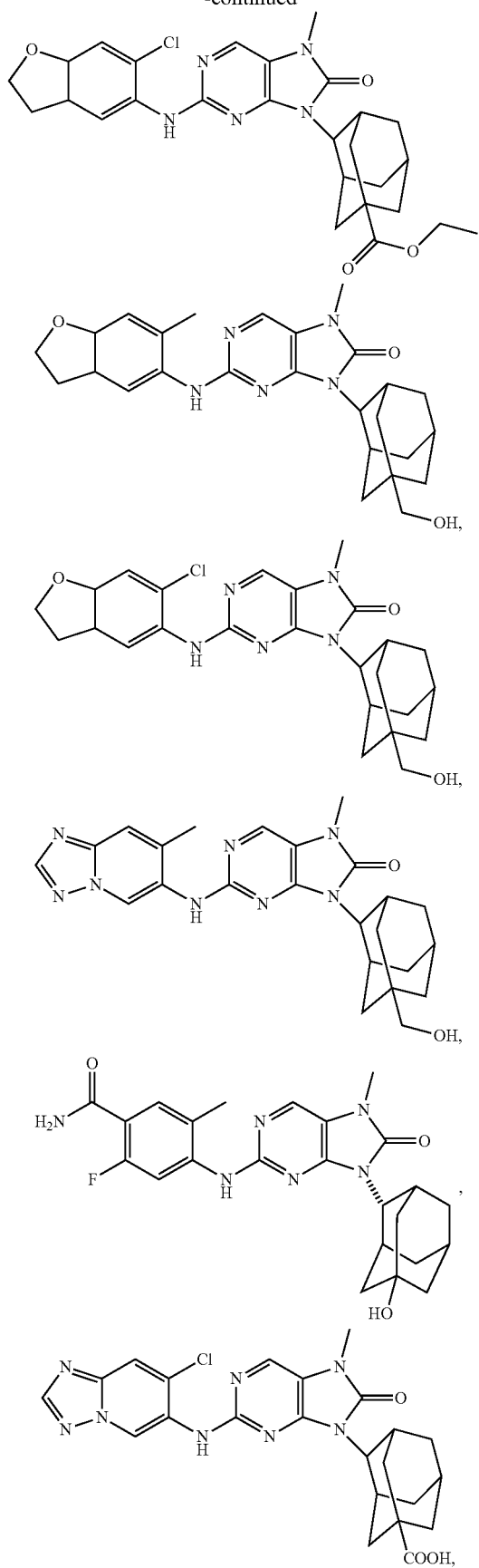
28
-continued
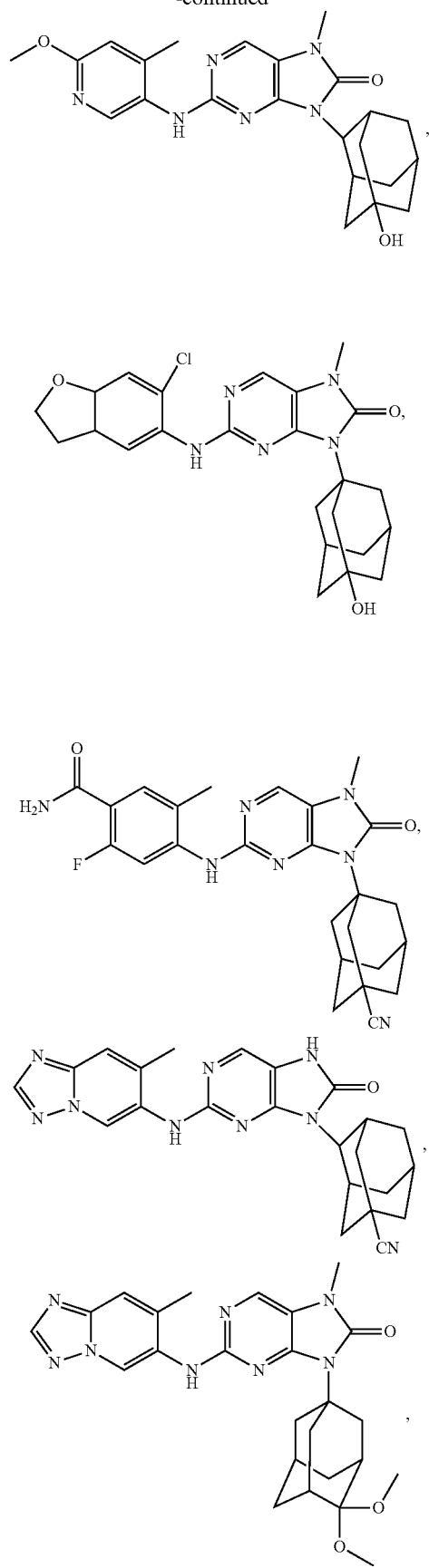

-continued

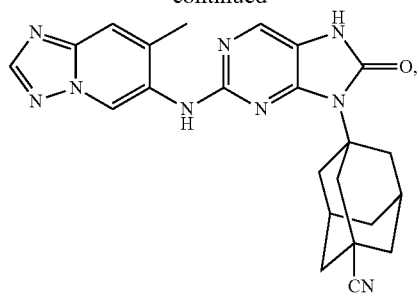

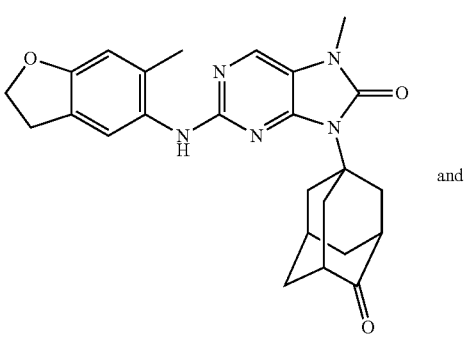

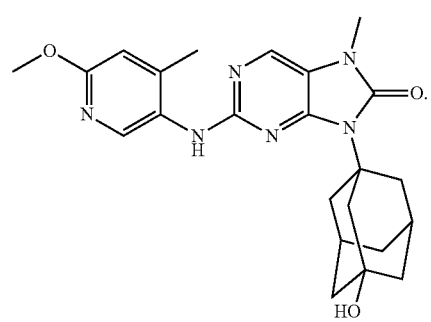

The present invention also provides an intermediate compound for preparing a compound of general formula (I), (II), (III), (IV), (V), (VI), (VII), (VIII), (VIX) or (VX), wherein the intermediate compound is selected from a compound shown as general formula (I-A) or (I-B):

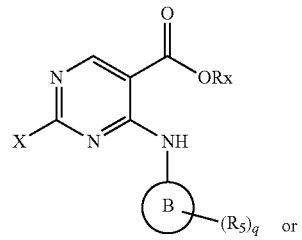 (I-A)

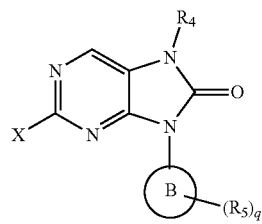 (I-B)

wherein,

X is selected from halogen;

B is selected from adamantyl;

$R_x$ is selected from H and $C_{1-6}$ alkyl;

$R_4$, $R_5$ and q are defined in the same way as for (I), (II), (III), (IV), (V), (VI), (VII), (VIII), (VIX) or (VX).

One or more embodiments of the present application provide an intermediate compound for preparing a compound of general formula (I), (II), (III), (IV), (V), (VI), (VII), (VIII), (VIX) or (VX), wherein the intermediate compound is selected from one of the following structures:

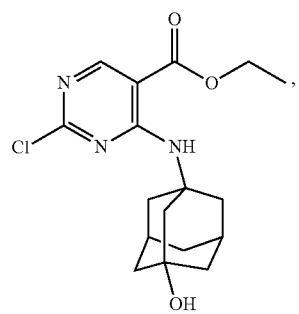

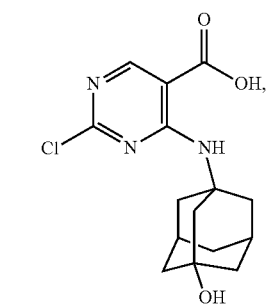

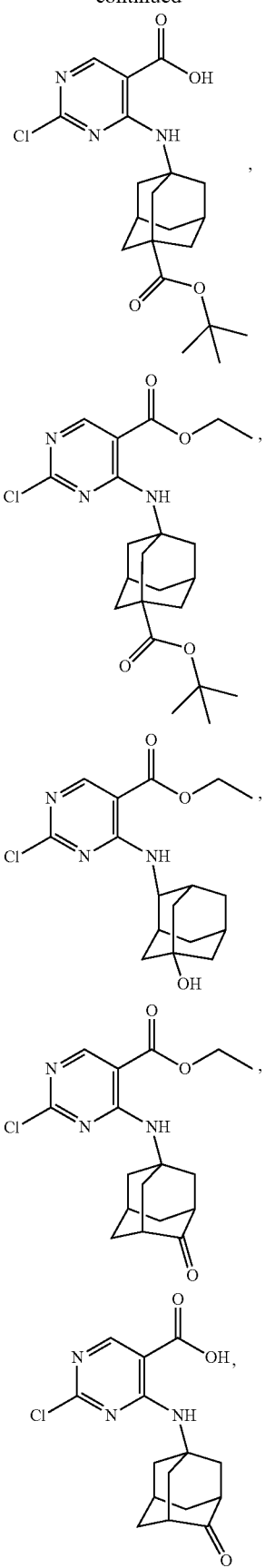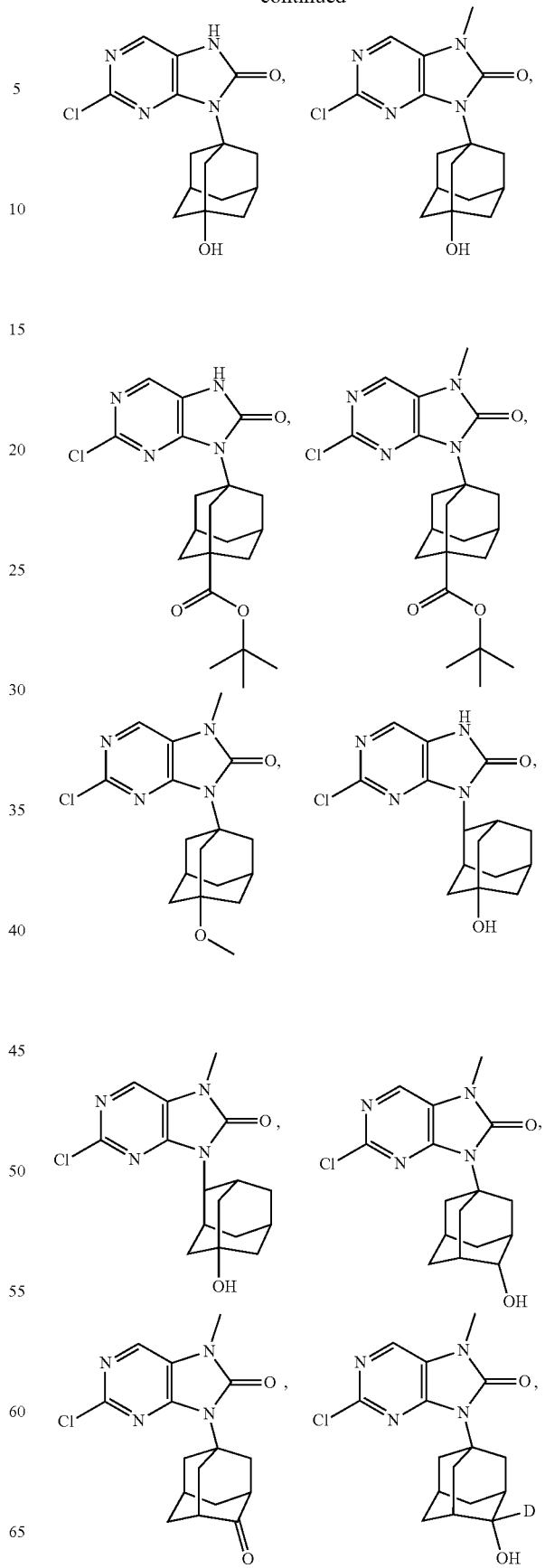

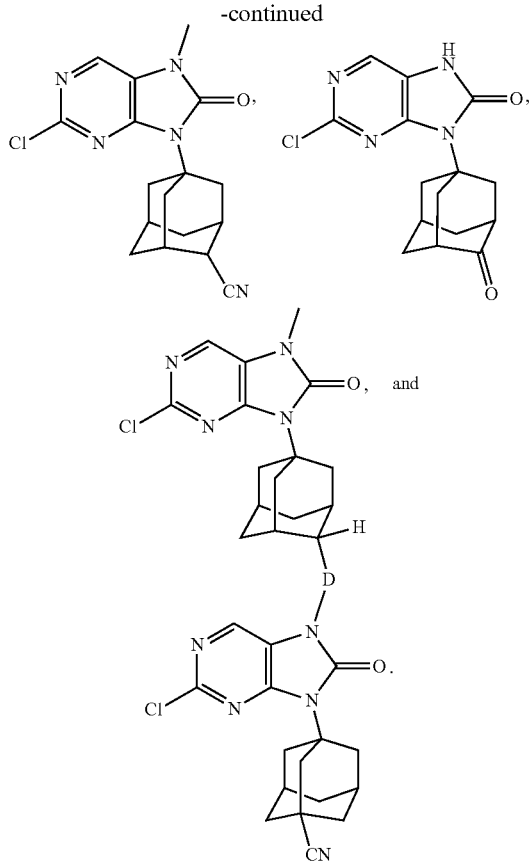

One or more embodiments of the present application provide a pharmaceutical composition comprising:

(1) the compound of the present application or the stereoisomer, solvate, metabolite, pharmaceutically acceptable salt, deuteride, cocrystal or prodrug thereof;

(2) optionally one or more other active ingredients; and (3) a pharmaceutically acceptable carrier and/or excipient.

One or more embodiments of the present application provide use of the pharmaceutical composition of the present application or the compound or the stereoisomer, solvate, metabolite, deuteride, pharmaceutically acceptable salt, cocrystal or prodrug thereof in preparing a DNA-PK inhibitor medicament.

In one or more embodiments of the present application, the DNA-PK inhibitor is used for treating cancer.

One or more embodiments of the present application provide the compound of the present application for use as a medicament.

One or more embodiments of the present application provide the compound of the present application for use as a DNA-PK inhibitor.

One or more embodiments of the present application provide the compound of the present application for use in a method for treating, preventing or inhibiting cancer.

One or more embodiments of the present application provide the compound of the present application for use in a method for inhibiting DNA-PK.

One or more embodiments of the present application provide a method for treating, preventing or inhibiting cancer, which comprises administering to a subject in need thereof the compound of the present application.

One or more embodiments of the present application provide a method for inhibiting DNA-PK, which comprises administering to a subject in need thereof the compound of the present application.

Unless stated to the contrary, the terms used in the specification and claims have the following meanings.

Carbon, hydrogen, oxygen, sulfur, nitrogen, F, Cl, Br and I involved in the groups and compounds described herein are each inclusive of isotopes thereof, and carbon, hydrogen, oxygen, sulfur or nitrogen involved in the groups and compounds described herein is optionally further replaced by one or more isotopes thereof corresponding thereto, wherein isotopes of carbon include $^{12}C$, $^{13}C$ and $^{14}C$, isotopes of hydrogen include protium (H), deuterium (D, also called heavy hydrogen) and tritium (T, also called superheavy hydrogen), isotopes of oxygen include $^{16}O$, $^{17}O$ and $^{18}O$, isotopes of sulfur include $^{32}S$, $^{33}S$, $^{34}S$ and $^{36}S$, isotopes of nitrogen include $^{14}N$ and $^{15}N$, isotopes of fluorine include $^{17}F$ and $^{19}F$, isotopes of chlorine include $^{35}Cl$ and $^{37}Cl$, and isotopes of bromine include $^{79}Br$ and $^{81}Br$.

"Alkyl" refers to a linear or branched saturated aliphatic hydrocarbon group consisting of 1 to 20 carbon atoms, preferably an alkyl group consisting of 1 to 8 (e.g., 1, 2, 3, 4, 5, 6, 7 or 8) carbon atoms, more preferably an alkyl group consisting of 1 to 6 carbon atoms, and further preferably an alkyl group consisting of 1 to 4 carbon atoms. Non-limiting examples include methyl, ethyl, n-propyl, isopropyl, n-butyl, sec-butyl, neobutyl, tert-butyl, n-pentyl, isopentyl, neopentyl, n-hexyl and various branched chain isomers thereof; when the alkyl is substituted, it may be optionally further substituted with 1 or more substituents.

"Alkoxy" refers to a group formed by substitution of at least 1 carbon atom of an alkyl group with an oxygen atom. Non-limiting examples include methoxy, ethoxy, n-propoxy, isopropoxy, n-butoxy, sec-butoxy, tert-butoxy, n-pentoxy, n-hexoxy, cyclopropoxy and cyclobutoxy. The alkyl is defined in the same way as for the "alkyl" described above.

"Alkenyl" refers to a linear or branched unsaturated aliphatic hydrocarbon group containing 1 to 10 (e.g., 1, 2, 3, 4, 5, 6, 7, 8, 9 or 10) carbon-carbon double bonds and consisting of 2 to 20 carbon atoms, preferably an alkenyl group consisting of 2 to 12 (e.g., 2, 3, 4, 5, 6, 7, 8, 9, 10, 11 or 12) carbon atoms, more preferably an alkenyl group consisting of 2 to 8 carbon atoms, and further preferably an alkenyl group consisting of 2 to 6 carbon atoms. Non-limiting examples include vinyl, propen-2-yl, buten-2-yl, penten-2-yl, penten-4-yl, hexen-2-yl, hexen-3-yl, hepten-2-yl, hepten-3-yl, hepten-4-yl, octen-3-yl, nonen-3-yl, decen-4-yl, and undecen-3-yl. The alkenyl may be optionally further substituted with 1 or more substituents.

"Alkynyl" refers to a linear or branched unsaturated aliphatic hydrocarbon group containing 1 to 10 (e.g., 1, 2, 3, 4, 5, 6, 7, 8, 9 or 10) carbon-carbon triple bonds and consisting of 2 to 20 carbon atoms, preferably an alkynyl group consisting of 2 to 12 (e.g., 2, 3, 4, 5, 6, 7, 8, 9, 10, 11 or 12) carbon atoms, more preferably an alkynyl group consisting of 2 to 8 carbon atoms, and further preferably an alkynyl group consisting of 2 to 6 carbon atoms. Non-limiting examples include ethynyl, propyn-1-yl, propyn-2-yl, butyn-1-yl, butyn-2-yl, butyn-3-yl, 3,3-dimethylbutyn-2-yl, pentyn-1-yl, pentyn-2-yl, hexyn-1-yl, 1-heptyn-1-yl, heptyn-3-yl, heptyn-4-yl, octyn-3-yl, nonyn-3-yl, decyn-4-yl, undec-3-yl, and dodecyn-4-yl. The alkynyl may be optionally further substituted with one or more substituents.

"Aryl" refers to a substituted or unsubstituted aromatic ring. It may be a 5-8 membered (e.g., 5, 6, 7 or 8 membered) monocyclic ring system, a 5-12 membered (e.g., 5, 6, 7, 8, 9, 10, 11 or 12 membered) bicyclic ring system or a 10-15 membered (e.g., 10, 11, 12, 13, 14 or 15 membered) tricyclic ring system, and may be a bridged ring or a spiro ring. Non-limiting examples include phenyl and naphthyl. The aryl may be optionally further substituted with 1 or more substituents. "Heteroaryl" refers to a substituted or unsubstituted aromatic ring. It may be a 3-8 membered (e.g., 3, 4, 5, 6, 7 or 8 membered) monocyclic ring system, a 5-12 membered (e.g., 5, 6, 7, 8, 9, 10, 11 or 12 membered) bicyclic ring system or a 10-15 membered (e.g., 10, 11, 12, 13, 14 or 15 membered) tricyclic ring system, and it contains 1 to 6 (e.g., 1, 2, 3, 4, 5 or 6) heteroatoms selected from N, O and S, and is preferably 5-8 membered heteroaryl. 1 to 4 (e.g., 1, 2, 3 or 4) N and S optionally substituted in the ring of the heteroaryl can be oxidized to various oxidation states. Heteroaryl may be attached to a heteroatom or carbon atom and it may be a bridged ring or a spiro ring. Non-limiting examples include cyclic pyridinyl, furanyl, thienyl, pyranyl, pyrrolyl, pyrimidinyl, pyrazinyl, pyridazinyl, imidazolyl, piperidinyl, benzimidazolyl, benzopyridinyl and pyrrolopyridinyl. Heteroaryl is optionally further substituted with 1 or more substituents.

"Carbocyclyl" or "carbocycle" refers to a saturated or unsaturated, aromatic or non-aromatic ring. When being an aromatic ring, it is defined in the same way as for the "aryl" described above; when being an non-aromatic ring, it may be a 3-10 membered (e.g., 3, 4, 5, 6, 7, 8, 9 or 10 membered) monocyclic ring system, a 4-12 membered (e.g., 4, 5, 6, 7, 8, 9, 10, 11 or 12-membered) bicyclic ring system or a 10-15 membered (e.g., 10, 11, 12, 13, 14 or 15 membered) tricyclic ring system, and it may be abridged ring or a spiro ring. Non-limiting examples include cyclopropyl, cyclobutyl, cyclopentyl, 1-cyclopentyl-1-alkenyl, 1-cyclopentyl-2-alkenyl, 1-cyclopentyl-3-alkenyl, cyclohexyl, 1-cyclohexyl-2-alkenyl, 1-cyclohexyl-3-alkenyl, cyclohexenyl, cyclohexadienyl, cycloheptyl, cyclooctyl, cyclononyl, cyclodecyl, cycloundecyl, cyclododecyl,

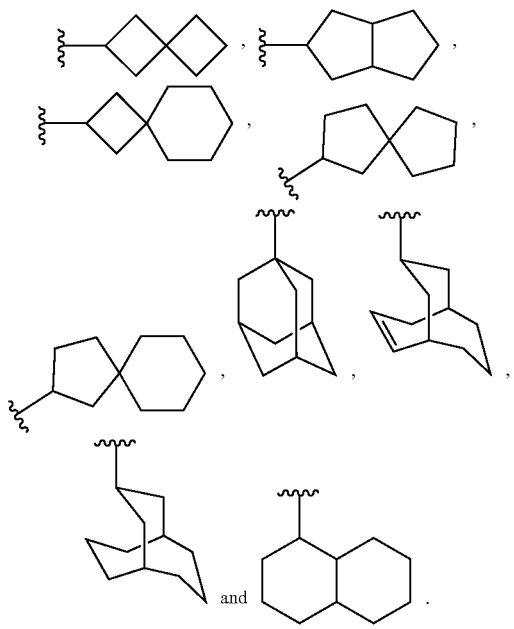

The "carbocyclyl" or "carbocycle" is optionally further substituted with 1 or more substituents.

"Heterocyclyl" or "heterocycle" refers to a saturated or unsaturated, aromatic or non-aromatic heterocycle. When being an aromatic heterocycle, it is defined in the same way as for the "heteroaryl" described above; when being a non-aromatic heterocycle, it may be a 3-10 membered (e.g., 3, 4, 5, 6, 7, 8, 9 or 10 membered) monocyclic ring system, a 4-12 membered (e.g., 4, 5, 6, 7, 8, 9, 10, 11 or 12 membered) bicyclic ring system or a 10-15 membered (e.g., 10, 11, 12, 13, 14 or 15 membered) tricyclic ring system, and it contains 1 to 4 (e.g., 1, 2, 3 or 4) heteroatoms selected from N, O and S, and is preferably 3-8 membered heterocyclyl. 1 to 4 (e.g., 1, 2, 3 or 4) N and S optionally substituted in the ring of the "heterocyclyl" or "heterocycle" can be oxidized to various oxidation states; "heterocyclyl" or "heterocycle" may be attached to a heteroatom or a carbon atom, and may be a bridged ring or a spiro ring. Non-limiting examples of "heterocyclyl" or "heterocycle" include epoxyethyl, epoxypropyl, aziridinyl, oxetanyl, azetidinyl, thietanyl, 1,3-dioxolanyl, 1,4-dioxolanyl, 1,3-dioxanyl, azepanyl, oxepanyl, thiepanyl, oxoazepinyl, diazepinyl, thiazepinyl, pyridinyl, piperidinyl, homopiperidinyl, furanyl, thienyl, pyranyl, N-alkylpyrrolyl, pyrimidinyl, pyrazinyl, pyridazinyl, piperazinyl, homopiperazinyl, imidazolyl, piperidinyl, morpholinyl, thiomorpholinyl, oxathianyl, 1,3-dithianyl, dihydrofuranyl, dithiacyclopentyl, tetrahydrofuranyl, tetrahydrothienyl, tetrahydropyranyl, tetrahydrothiopyranyl, tetrahydropyrrolyl, tetrahydroimidazolyl, tetrahydrothiazolyl, tetrahydropyranyl, benzimidazolyl, benzopyridinyl, pyrrolopyridinyl, benzodihydrofuranyl, 2-pyrrolinyl, 3-pyrrolinyl, indolinyl, 2H-pyranyl, 4H-pyranyl, dioxacyclohexyl, 1,3-dioxolanyl, pyrazolinyl, dithianyl, dithiolanyl, dihydrothienyl, pyrazolidinyl, imidazolinyl, imidazolidinyl, 1,2,3,4-tetrahydroisoquinolinyl, 3-azabicyclo[3.1.0]hexyl, 3-azabicyclo[4.1.0]heptyl, azabicyclo[2.2.2]hexyl, 3H-indolylquinolizinyl, N-pyridylurea, 1,1-dioxothiomorpholinyl, azabicyclo[3.2.1]octyl, azabicyclo[5.2.0]nonyl, oxatricyclo[5.3.1.1]dodecyl, aza-adamantyl and oxaspiro[3.3]heptyl. The "heterocyclyl" or "heterocycle" may be optionally further substituted with 1 or more substituents.

"Cycloalkyl" refers to a saturated cyclic hydrocarbon group, the ring of which may be a 3-10 membered (e.g., 3, 4, 5, 6, 7, 8, 9 or 10 membered) monocyclic ring system, a 4-12 membered (e.g., 4, 5, 6, 7, 8, 9, 10, 11 or 12 membered) bicyclic ring system or a 10-20 membered (e.g., 10, 11, 12, 13, 14, 15, 16, 17, 18, 19 or 20 membered) polycyclic ring system. The ring carbon atoms are preferably 3 to 10 carbon atoms, further preferably 3 to 8 carbon atoms. Non-limiting examples of "cycloalkyl" include cyclopropyl, cyclobutyl, cyclopentyl, cyclohexyl, cycloheptyl, cyclooctyl, cyclopropenyl, cyclobutenyl, cyclopentenyl, cyclohexenyl, cycloheptenyl, 1,5-cyclooctadienyl, 1,4-cyclohexadienyl, cycloheptatrienyl, and the like. When the cycloalkyl is substituted, it may be optionally further substituted with 1 or more substituents. "Heterocycloalkyl" refers to a substituted or unsubstituted saturated non-aromatic cyclic group.

It may be a 3-8 membered (e.g., 3, 4, 5, 6, 7 or 8 membered) monocyclic ring system, a 4-12 membered (e.g., 4, 5, 6, 7, 8, 9, 10, 11 or 12 membered) bicyclic ring system or a 10-15 membered (e.g., 10, 11, 12, 13, 14 or 15 membered) tricyclic ring system, and it contains 1, 2 or 3 heteroatoms selected from N, O and S, and is preferably 3-8 membered heterocyclyl. 1, 2 or 3 N and S optionally substituted in the ring of "heterocycloalkyl" can be oxidized to various oxidation states; "heterocycloalkyl" may be attached to a heteroatom or a carbon atom and may be a bridged ring or a spiro ring. Non-limiting examples of "heterocycloalkyl" include epoxyethyl, aziridinyl, oxetanyl, azetidinyl, 1,3-dioxolanyl, 1,4-dioxolanyl, 1,3-dioxanyl, azepanyl, piperidinyl, morpholinyl, thiomorpholinyl, 1,3-dithianyl, tetrahydrofuranyl, tetrahydropyrrolyl, tetrahydroimidazolyl, tetrahydrothiazolyl, tetrahydropyranyl, azabicyclo[3.2.1]octyl, azabicyclo[5.2.0]nonyl, oxatricyclo[5.3.1.1] dodecyl, aza-adamantyl and oxaspiro[3.3]heptyl.

When the "alkyl", "alkoxy", "alkenyl", "alkynyl", "aryl", "heteroaryl", "carbocyclyl", "carbocycle", "heterocyclyl", "heterocycle", "cycloalkyl", "heterocycloalkyl" or "heterocyclyl" described above is substituted, it may be optionally further substituted with 0, 1, 2, 3, 4, 5, 6, 7, 8, 9 or 10 substituents selected from F, Cl, Br, I, hydroxy, mercapto, nitro, cyano, amino, $C_{1-6}$ alkylamino, =O, $C_{1-6}$ alkyl, $C_{1-6}$ alkoxy, $C_{2-6}$ alkenyl, $C_{2-6}$ alkynyl, —$NR^{q4}R^{q5}$, =$NR^{q6}$, —C(=O)$OC_{1-6}$ alkyl, —OC(=O)$C_{1-6}$ alkyl, —C(=O)$NR^{q4}R^{q5}$, $C_{3-8}$ cycloalkyl, $C_{3-8}$ heterocycloalkyl, $C_{6-10}$ aryl, $C_{5-10}$ heteroaryl, —C(=O)$OC_{6-10}$ aryl, —OC(=O)$C_{6-10}$ aryl, —OC(=O)$C_{5-10}$ heteroaryl, —C(=O)$OC_{5-10}$ heteroaryl, —OC(=O)$C_{3-8}$ heterocycloalkyl, —C(=O)$OC_{3-8}$ heterocycloalkyl, —OC(=O)$C_{3-8}$ cycloalkyl, —C(=O)$OC_{3-8}$ cycloalkyl, —NHC(=O)$C_{3-8}$ heterocycloalkyl, —NHC(=O)$C_{6-10}$ aryl, —NHC(=O)$C_{5-10}$ heteroaryl, —NHC(=O)$C_{3-8}$ cycloalkyl, —NHC(=O)$C_{3-8}$ heterocycloalkyl, —NHC(=O)$C_{2-6}$ alkenyl and —NHC(=O)$C_{2-6}$ alkynyl, wherein the substituent $C_{1-6}$ alkyl, $C_{1-6}$ alkoxy, $C_{2-6}$ alkenyl, $C_{2-6}$ alkynyl, $C_{3-8}$ cycloalkyl, $C_{3-8}$ heterocycloalkyl, $C_{6-10}$ aryl, $C_{5-10}$ heteroaryl, —NHC(=O)$C_{6-10}$ aryl, —NHC(=O)$C_{5-10}$ heteroaryl, —NHC(=O)$C_{3-8}$ heterocycloalkyl or —NHC(=O)$C_{3-8}$ cycloalkyl is optionally further substituted with 1 to 3 substituents selected from OH, F, Cl, Br, I, $C_{1-6}$ alkyl, $C_{1-6}$ alkoxy, —$NR^{q4}R^{q5}$ and =O, $R^{q1}$ is selected from $C_{1-6}$ alkyl, $C_{1-6}$ alkoxy and $C_{6-10}$ aryl, and $R^{q2}$ and $R^{q3}$ are selected from H and $C_{1-6}$ alkyl, wherein $R^{q4}$ and $R^{q5}$ are selected from H, $C_{1-6}$ alkyl, —NH(C=$NR^{q1}$)$NR^{q2}R^{q3}$, —S(=O)$_2NR^{q2}R^{q3}$, —C(=O)$R^{q1}$ and —C(=O)$NR^{q2}R^{q3}$, wherein the $C_{1-6}$ alkyl is optionally further substituted with 1 or more substituents selected from OH, F, Cl, Br, I, $C_{1-6}$ alkyl, $C_{1-6}$ alkoxy, $C_{6-10}$ aryl, $C_{5-10}$ heteroaryl, $C_{3-8}$ cycloalkyl and $C_{3-8}$ heterocycloalkyl; or $R^{q4}$ and $R^{q5}$, together with an N atom, form a 3-8 membered heterocycle, which may contain 1 or more heteroatoms selected from N, O and S.

"Pharmaceutically acceptable salt" or "pharmaceutically acceptable salt thereof" refers to a salt obtained by reaction of a compound disclosed herein in a free acid form with a nontoxic inorganic or organic base or by reaction of a compound disclosed herein in a free base form with a nontoxic inorganic or organic acid, and in this salt, the bioavailability and characteristics of the compound disclosed herein in the free acid or free base form is retained.

"Pharmaceutical composition" refers to a mixture of one or more compounds described herein or pharmaceutically acceptable salts or prodrugs thereof and other chemical components, wherein the "other chemical components" refer to pharmaceutically acceptable carriers, excipients and/or one or more other therapeutic agents.

"Carrier" refers to a material that does not cause significant irritation to an organism and does not eliminate the biological activity and characteristics of the administered compound.

"Excipient" refers to an inert substance added to a pharmaceutical composition to facilitate administration of a compound. Non-limiting examples include calcium carbonate, calcium phosphate, sugars, starches, cellulose derivatives (including microcrystalline cellulose), gelatin, vegetable oils, polyethylene glycols, diluents, granulating agents, lubricants, binders and disintegrants.

"Prodrug" refers to a compound disclosed herein that can be metabolized in vivo to become biologically active. A prodrug disclosed herein is prepared by modifying amino or carboxyl in a compound disclosed herein, and the modification can be removed by conventional operation or be removed in vivo to obtain the parent compound. When a prodrug disclosed herein is administered to a mammalian subject, the prodrug is cleaved to form free amino or carboxyl.

"Cocrystal" refers to a crystal formed by binding of an active pharmaceutical ingredient (API) and a cocrystal former (CCF) via a hydrogen bond or other non-covalent bonds, wherein the API and CCF are both solid in their pure state at room temperature, and the components are present in a fixed stoichiometric ratio. A cocrystal is a multi-component crystal, including both a binary cocrystal formed by two neutral solids and a multiple cocrystal formed by a neutral solid and a salt or solvate.

"Stereoisomer" refers to isomers resulting from different spatial arrangements of atoms in a molecule, including cis-trans isomers, enantiomers and conformers.

"Optional", "optionally", "selective" or "selectively" means that the subsequently described event or circumstance may, but does not necessarily, occur, and the description includes cases where the event or circumstance occurs and cases where it does not. For example, "heterocyclyl optionally substituted with alkyl" means that the alkyl may, but does not necessarily, be present, and the description includes the case where the heterocyclyl is substituted with alkyl and the case where the heterocyclyl is not substituted with alkyl.

DETAILED DESCRIPTION

The following examples illustrate the technical schemes of the present invention in detail, but the protection scope of the present invention includes but is not limited thereto.

The structure of a compound is determined by nuclear magnetic resonance (NMR) and/or mass spectrometry (MS). NMR shifts (δ) are expressed in $10^{-6}$ (ppm). NMR determination is performed using NMR spectrometers (Bruker Avance III 400 and Bruker Avance 300), with deuterated dimethyl sulfoxide (DMSO-$d_6$), deuterated chloroform (CDCl$_3$) and deuterated methanol (CD$_3$OD) as solvents and tetramethylsilane (TMS) as an internal standard;

MS determination is performed using Agilent 6120B (ESI) and Agilent 6120B (APCI);

HPLC determination is performed using Agilent 1260DAD high pressure liquid chromatograph (Zorbax SB-C18 100×4.6 mm, 3.5 µM);

Yantai Yellow Sea HSGF254 or Qingdao GF254 silica gel plate is used as a thin layer chromatography (TLC) silica gel plate. The specification of the silica gel plate for TLC is 0.15-0.20 mm, and that for TLC separation and purification of products is 0.4-0.5 mm;

Yantai Yellow Sea silica gel of 200-300 mesh is generally used as a carrier in column chromatography;

known starting materials of the present invention can be synthesized by methods known in the art or can be purchased from companies such as Shanghai Titan Scientific, Energy Chemical, Shanghai DEMO Medical, Chengdu Kelong Chemical, Accela ChemBio, and J&K Scientific; nitrogen atmosphere means that a reaction flask is connected with a nitrogen balloon with a volume of about 1 L;

hydrogen atmosphere means that a reaction flask is connected with a nitrogen balloon with a volume of about 1 L;

in hydrogenation reaction, the operation of vacuumizing and introducing hydrogen is usually performed, and repeated 3 times;

reactions are performed under nitrogen atmosphere if not otherwise specified in examples;

a solution is an aqueous solution if not otherwise specified in examples; reaction temperature is room temperature and the optimum reaction temperature of room temperature is 20-30° C. if not otherwise specified in examples;

DCM: dichloromethane;
EA: ethyl acetate;
HCl: hydrochloric acid;
THF: tetrahydrofuran;
DMF: N,N-dimethylformamide;
PE: petroleum ether;
TLC: thin layer chromatography;
SFC: supercritical fluid chromatography;
NCS: N-chlorosuccinimide;
Pd(dppf)Cl$_2$: [1,1'-bis(diphenylphosphino)ferrocene]palladium dichloride;
DMSO: dimethyl sulfoxide;
DTT: dithiothreitol;
ATP: adenosine triphosphate;
DNA: deoxyribonucleic acid.
IC$_{50}$: refers to the concentration of a compound at which the activity of DNA-PK kinase is 50% inhibited.

EXAMPLES

Example 1

9-(3-hydroxyadamantan-1-yl)-7-methyl-2-((7-methyl-[1,2,4]triazolo[1,5-a]pyridin-6-yl)amino)-7,9-dihydro-8H-purin-8-one (Compound 1)

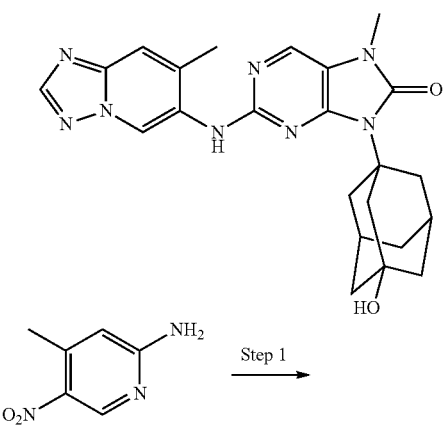

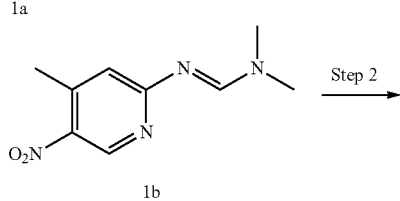

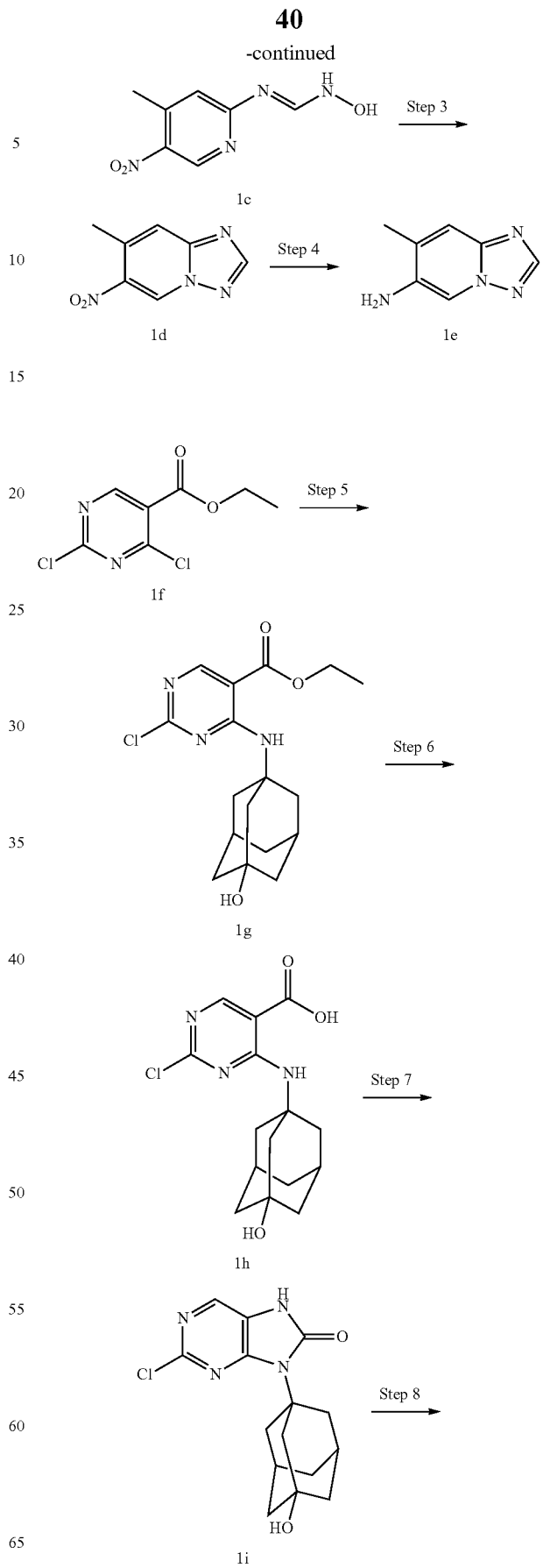

-continued

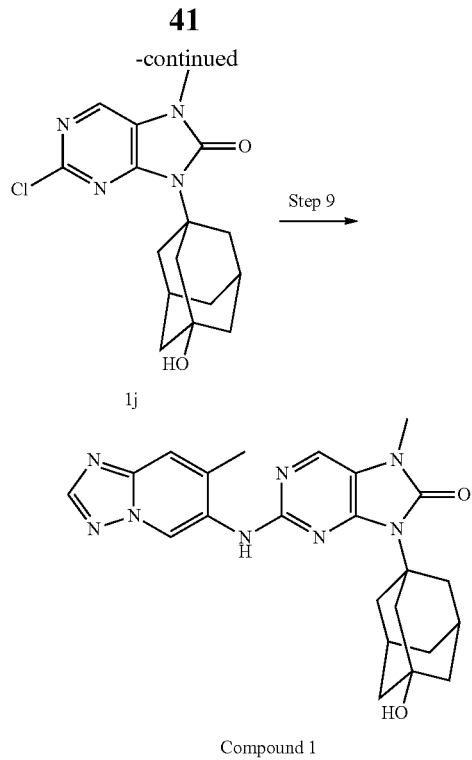

1j

Compound 1

Step 1:

(E)-N,N-dimethyl-N-(4-methyl-5-nitropyridin-2-yl)formimidamide (1b)

Compound 1a (30 g, 195.9 mmol) was dissolved in toluene (300 mL), and N,N-dimethylformamide dimethyl acetal (90 mL, 587.7 mmol) was added at room temperature. The reaction mixture was allowed to react at 100° C. for 2 h. After the reaction was completed, the reaction mixture was directly concentrated to give the title compound 1b (yellow solid, 40.79 g, 100% yield).
$^1$H NMR (400 MHz DMSO) δ 8.85 (s, 1H), 8.66 (s, 1H), 6.78 (s, 1H), 3.32 (s, 1H), 3.15 (s, 3H), 3.04 (s, 3H), 2.45 (s, 3H).

Step 2:

(E)-N-hydroxy-N-(4-methyl-5-nitropyridin-2-yl)formimidamide (1c)

Compound 1b (40.79 g, 195.90 mmol) was dissolved in methanol (300 mL), and hydroxylamine hydrochloride (27.22 g, 391.80 mmol) was added at room temperature. The reaction mixture was allowed to react at 65° C. for 1 h. The reaction mixture was cooled to room temperature and directly concentrated to give the title compound 1c (yellow solid, 38 g, 100% yield).
$^1$H NMR (400 MHz DMSO) δ 10.56 (s, 1H), 10.13 (d, 1H), 8.87 (s, 1H), 7.88 (d, 1H), 7.03 (s, 1H), 2.50 (s, 3H).

Step 3:

7-Methyl-6-nitro-[1,2,4]triazolo[1,5-a]pyridine (1d)

2,2,2-trifluoroacetic anhydride (41 mL, 290.56 mmol) was added to a solution of compound 1c (38 g, 193.71 mmol) in tetrahydrofuran (400 mL) at 0° C. The reaction mixture was allowed to react at 80° C. for 1 h and concentrated. The resulting solid was slurried with a saturated solution of sodium bicarbonate (100 mL×3), followed by filtration and drying to give the title compound 1d (red solid, 30 g, 100% yield).
$^1$H NMR (400 MHz DMSO) δ 9.98 (s, 1H), 8.73 (s, 1H), 7.95 (s, 1H), 2.66 (s, 3H).

Step 4:

7-Methyl-[1,2,4]triazolo[1,5-a]pyridin-6-amine (1e)

Pd/C (10%, wet support) (0.8 g) was added to a solution of compound 1d (8 g, 44.91 mmol) in methanol (100 mL). The reaction mixture was allowed to react overnight at room temperature under hydrogen atmosphere. The catalyst was removed by filtration, followed by concentration to give a crude product, which was then recrystallized from methanol to give the title compound 1e (pale yellow pure product, 4 g, 60% yield).
$^1$H NMR (400 MHz DMSO) δ 8.11 (s, 1H), 8.07 (s, 1H), 5.01 (s, 2H), 2.25 (s, 3H).

Step 5:

Ethyl 2-chloro-4-((3-hydroxyadamantan-1-yl)amino)pyrimidine-5-carboxylate (1g)

Compound 1f (5 g, 22.6 mmol) and potassium carbonate (6.2 g, 44.8 mmol) were dissolved in acetonitrile (20 mL), and 3-aminoadamantan-1-ol (3.7 g, 22.1 mmol) was added at 0° C. The reaction mixture was stirred at room temperature for 20 h. 30 mL of water was added, and the solid that precipitated was isolated by filtration and washed with water 3 times at the time of filtration. The filtrate was concentrated to give the title compound 1g (white solid, 6.2 g, 78% yield).
$^1$H NMR (400 MHz DMSO) δ 8.62 (s, 1H), 8.37 (s, 1H), 4.66 (s, 1H), 4.30 (s, 2H), 2.20 (s, 2H), 1.98 (s, 6H), 1.58-1.29 (m, 7H).

Step 6:

2-Chloro-4-((3-hydroxyadamantan-1-yl)amino)pyrimidine-5-carboxylic acid (1h)

Compound 1g (6.2 g, 17.6 mmol) was dissolved in 10 mL of tetrahydrofuran and 5 mL of water, and lithium hydroxide (915 mg, 38.1 mmol) was added. The reaction mixture was stirred at room temperature for 1 h. Tetrahydrofuran was removed by rotary evaporation. The pH was adjusted to 4-5, and a white solid precipitated. The reaction mixture was filtered, and the filter cake was washed twice with petroleum ether/ethyl acetate (v/v=10/1) and dried after filtration to give the title compound 1h (white solid, 5 g, 81.9% yield).

Step 7:

2-Chloro-9-(3-hydroxyadamantan-1-yl)-7,9-dihydro-8H-purin-8-one (1i)

Compound 1h (2 g, 6.2 mmol) was dissolved in dimethylacetamide (20 mL), and triethylamine (750 mg, 7.4 mmol) and diphenylphosphoryl azide (1.87 g, 6.8 mmol) were added. The reaction mixture was then gradually warmed to 120° C. and stirred for 1.5 h. The reaction mixture was concentrated, and the residue was purified by silica gel column chromatography (petroleum ether/ethyl acetate (v/v)= 5:1-1:10) to give the title compound 1i (white solid, 780 mg, 35% yield).
$^1$H NMR (400 MHz DMSO) δ 8.08 (s, 1H), 4.71 (s, 1H), 2.40 (s, 4H), 2.43 (d, 2H), 2.25 (s, 2H), 1.66-1.46 (m, 7H).

Step 8:

2-Chloro-9-(3-hydroxyadamantan-1-yl)-7-methyl-7,9-dihydro-8H-purin-8-one (1j)

Compound 1i (780 mg, 2.4 mmol) was dissolved in dimethylformamide (10 mL), and dimethyl sulfate (307 mg, 2.4 mmol) and cesium carbonate (1.5 g, 4.8 mmol) were added at 0° C. The reaction mixture was stirred at 0° C. for 1 h. 20 mL of water was then added, followed by extraction with ethyl acetate (50 mL×3). The organic phase was dried over anhydrous sodium sulfate and concentrated, and a solid precipitated. The solid was collected by filtration to give the title compound 1j (white solid, 397 mg, 49% yield).

$^1$H NMR (400 MHz DMSO) δ 8.30 (s, 1H), 3.29 (s, 3H), 2.40 (s, 4H), 2.43 (d, 2H), 2.25 (s, 2H), 1.65-1.46 (m, 7H).

Step 9:

9-(3-Hydroxyadamantan-1-yl)-7-methyl-2-((7-methyl-[1,2,4]triazolo[1,5-a]pyridin-6-yl)amino)-7,9-dihydro-8H-purin-8-one (Compound 1)

Compound 1j (372 mg, 0.14 mmol), compound 1e (132 mg, 0.1 mmol), cesium carbonate (130 mg, 0.4 mmol), tris(dibenzylideneacetone)dipalladium (40 mg, 0.04 mmol) and 2,2'-bis(diphenylphosphino)-1,1'-binaphthyl (50 mg, 0.08 mmol) were dissolved in dioxane, followed by nitrogen purging. The reaction mixture was stirred at 100° C. for 4 h. The reaction mixture was concentrated, and the residue was purified by silica gel column chromatography (dichloromethane/methanol (v/v)=30/1) to give compound 1 (white solid, 12.6 mg, 2.5% yield).

$^1$H NMR (400 MHz DMSO) δ 9.09 (s, 1H), 8.56 (s, 1H), 8.36 (s, 1H), 8.08 (s, 1H), 7.70 (s, 1H), 4.56 (s, 1H), 3.24 (s, 3H), 2.39 (d, 9H), 2.17 (s, 2H), 1.58-1.23 (m, 6H).

Example 2

9-(3-Hydroxyadamantan-1-yl)-7-methyl-2-((7-methylquinolin-6-yl)amino)-7,9-dihydro-8H-purin-8-one (Compound 2)

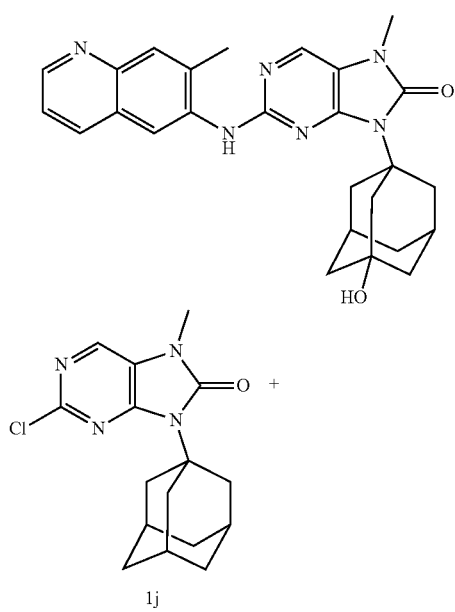

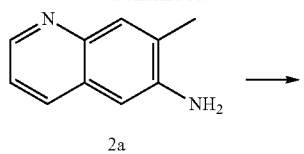

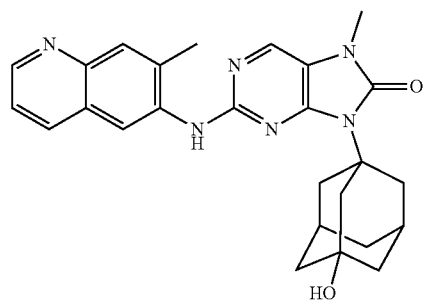

Compound 2

Compound 1j (200 mg, 0.6 mmol), 7-methylquinolin-6-amine 2a (94.6 mg, 0.6 mmol), cesium carbonate (384.4 mg, 1.2 mmol) and methanesulfonato(2-dicyclohexylphosphino-3,6-dimethoxy-2',4',6'-tri-i-propyl-1,1'-biphenyl)(2'-amino-1,1'-biphenyl-2-yl)palladium(II) (55 mg, 0.06 mmol) were dissolved in 2 mL of dioxane, followed by nitrogen purging. The reaction mixture was stirred at 110° C. for 4 h. The reaction mixture was concentrated, and the residue was purified by silica gel column chromatography (dichloromethane/methanol (v/v)=35/1) followed by preparative HPLC to give compound 2 (yellow solid, 45 mg, 35% yield).

$^1$H NMR (400 MHz DMSO) δ 9.04 (d, 1H), 9.03 (s, 1H), 8.92 (t, 1H), 8.60 (s, 1H), 8.04 (s, 1H), 7.88 (q, 1H), 3.29 (s, 3H), 2.63 (s, 3H), 2.37-2.51 (m, 6H), 2.18 (s, 2H), 1.56 (q, 4H), 1.44 (q, 2H).

LC-MS m/z (ESI)=457.20 [M+1].

Example 3 tert-Butyl-3-(7-methyl-2-[(7-methyl-[1,2,4]triazolo[1,5-a]pyridin-6-yl)amino]-8-oxo-8,9-dihydro-7H-purin-9-yl)adamantane-1-carboxylate (Compound 3)

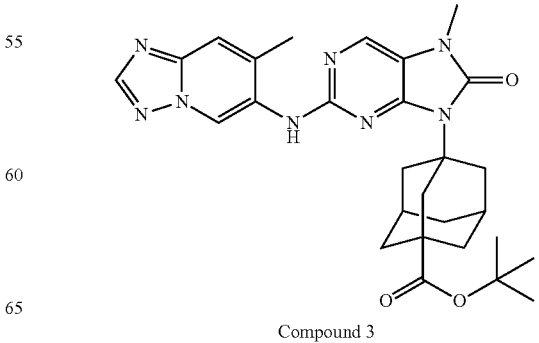

Compound 3

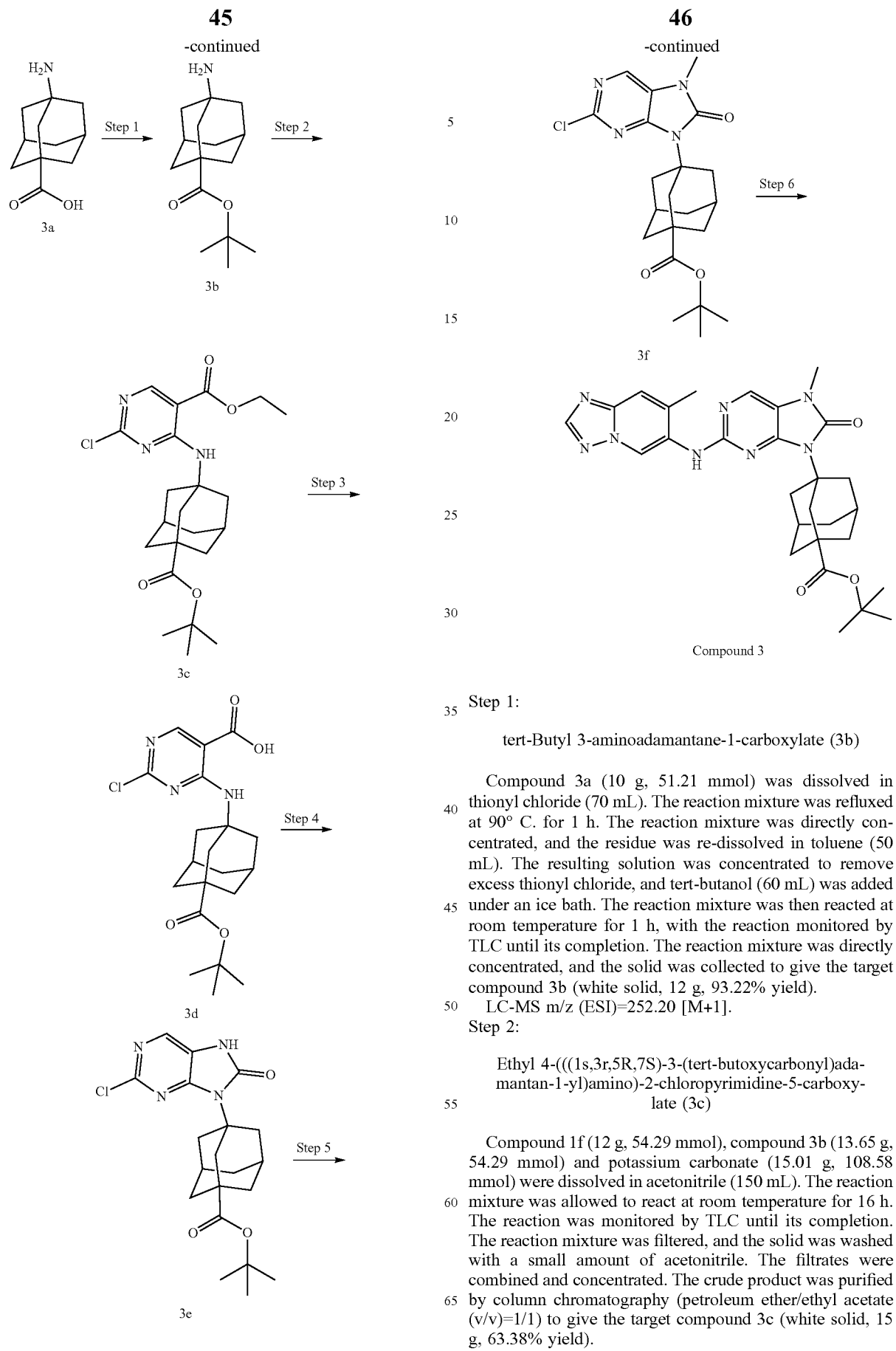

Compound 3

Step 1:

tert-Butyl 3-aminoadamantane-1-carboxylate (3b)

Compound 3a (10 g, 51.21 mmol) was dissolved in thionyl chloride (70 mL). The reaction mixture was refluxed at 90° C. for 1 h. The reaction mixture was directly concentrated, and the residue was re-dissolved in toluene (50 mL). The resulting solution was concentrated to remove excess thionyl chloride, and tert-butanol (60 mL) was added under an ice bath. The reaction mixture was then reacted at room temperature for 1 h, with the reaction monitored by TLC until its completion. The reaction mixture was directly concentrated, and the solid was collected to give the target compound 3b (white solid, 12 g, 93.22% yield).

LC-MS m/z (ESI)=252.20 [M+1].

Step 2:

Ethyl 4-(((1s,3r,5R,7S)-3-(tert-butoxycarbonyl)adamantan-1-yl)amino)-2-chloropyrimidine-5-carboxylate (3c)

Compound 1f (12 g, 54.29 mmol), compound 3b (13.65 g, 54.29 mmol) and potassium carbonate (15.01 g, 108.58 mmol) were dissolved in acetonitrile (150 mL). The reaction mixture was allowed to react at room temperature for 16 h. The reaction was monitored by TLC until its completion. The reaction mixture was filtered, and the solid was washed with a small amount of acetonitrile. The filtrates were combined and concentrated. The crude product was purified by column chromatography (petroleum ether/ethyl acetate (v/v)=1/1) to give the target compound 3c (white solid, 15 g, 63.38% yield).

¹H NMR (400 MHz, DMSO-d₆) δ 8.63 (s, 1H), 8.36 (s, 1H), 4.30 (q, 2H), 2.00-2.18 (m, 8H), 1.61-1.73 (m, 6H), 1.38 (s, 9H), 1.31 (t, 3H).

Step 3:

4-((3-(tert-Butoxycarbonyl)adamantan-1-yl)amino)-2-chloropyrimidine-5-carboxylic acid (3d)

Compound 3c (15 g, 34.41 mmol) was dissolved in 200 mL of tetrahydrofuran and 200 mL of water, and lithium hydroxide (1.65 g, 68.82 mmol) was added. The reaction mixture was stirred at room temperature for 1 h. The reaction was monitored by TLC until its completion. The reaction mixture was concentrated to remove tetrahydrofuran and adjusted to pH 5 with 6 N hydrochloric acid, and a white solid precipitated. The reaction mixture was filtered, and the filter cake was washed twice with petroleum ether and collected to give the title compound 3d (white solid, 14 g, 99.75% yield).

¹H NMR (400 MHz, DMSO-d₆) δ 8.65 (s, 1H), 8.58 (s, 1H), 2.01-2.17 (m, 8H), 1.57-1.77 (m, 6H), 1.38 (s, 9H).

LC-MS m/z (ESI)=408.10 [M+1].

Step 4:

tert-Butyl-3-(2-chloro-8-oxo-8,9-dihydro-7H-purin-9-yl)adamantane-1-carboxylate (3e)

Compound 3d (15 g, 36.77 mmol) was dissolved in N,N-dimethylacetamide (150 mL), and diphenylphosphoryl azide (7.91 mL, 36.77 mmol) and triethylamine (5.11 mL, 36.77 mmol) were added under an ice bath. The reaction mixture was stirred at room temperature for 1 h, then warmed to 120° C., and allowed to react for another 3 h. The reaction was monitored by TLC (dichloromethane/methanol (v/v)=4/1) until its completion. The reaction mixture was allowed to naturally cool to room temperature and poured slowly into 600 mL of ice water, and a large amount of solid appeared. The solid was collected by filtration, triturated with ethyl acetate (150 mL), and dried in vacuo to give the target compound 3e (white solid, 7.0 g, 47.02% yield).

¹H NMR (400 MHz, DMSO-d₆) δ 11.56 (s, 1H), 8.07 (s, 1H), 2.44-2.57 (m, 6H), 2.23 (s, 2H), 1.58-1.80 (m, 6H), 1.39 (s, 9H).

Step 5:

tert-Butyl 3-(2-chloro-7-methyl-8-oxo-8,9-dihydro-7H-purin-9-yl)adamantane-1-carboxylate (3f)

Compound 3e (5 g, 12.35 mmol) was dissolved in dimethylformamide (40 mL), and cesium carbonate (6.04 g, 18.52 mL) and dimethyl sulfate (1.4 mL, 14.82 mmol) were added at 0° C. The reaction mixture was allowed to react at room temperature for 2 h. The reaction was monitored by TLC until its completion. 100 mL of water was added, and a solid precipitated. The solid was collected by filtration and dried to give the target compound 3f (white solid, 5.0 g, 96.64% yield).

¹H NMR (400 MHz, DMSO-d₆) δ 8.31 (s, 1H), 3.29 (s, 3H), 2.43-2.56 (m, 6H), 2.24 (s, 2H), 1.54-1.80 (m, 6H), 1.38 (s, 9H).

Step 6:

tert-Butyl 3-(7-methyl-2-[(7-methyl-[1,2,4]triazolo[1,5-a]pyridin-6-yl)amino]-8-oxo-8,9-dihydro-7H-purin-9-yl)adamantane-1-carboxylate (Compound 3)

Compound 1e (500 mg, 3.37 mmol), compound 3f (1.41 g, 3.37 mmol), cesium carbonate (2.31 g, 7.08 mmol) and methanesulfonato(2-dicyclohexylphosphino-3,6-dimethoxy-2',4',6'-tri-i-propyl-1,1'-biphenyl)(2'-amino-1,1'-biphenyl-2-yl)palladium(II) (310 mg, 0.34 mmol) were dissolved in dioxane (10 mL), followed by nitrogen purging. The reaction mixture was stirred at 100° C. for 4 h. The reaction was monitored by TLC until its completion. The reaction mixture was poured into ice water, and the solid was collected and purified by silica gel column chromatography (dichloromethane/methanol (v/v)=100/1) to give compound 3 (white solid, 1.4 g, 78.29% yield).

¹H NMR (400 MHz, DMSO-d₆) δ 9.08 (s, 1H), 8.58 (s, 1H), 8.36 (s, 1H), 8.10 (s, 1H), 7.68 (s, 1H), 3.24 (s, 3H), 2.33-2.61 (m, 6H), 2.14 (s, 2H), 1.51-1.67 (m, 6H), 1.32 (s, 9H).

LC-MS m/z (ESI)=531.3 [M+1].

Example 4

3-(7-Methyl-2-((7-methyl-[1,2,4]triazolo[1,5-a]pyridin-6-yl)amino)-8-oxo-7,8-dihydro-9H-purin-9-yl)adamantane-1-carboxylic acid (Compound 4)

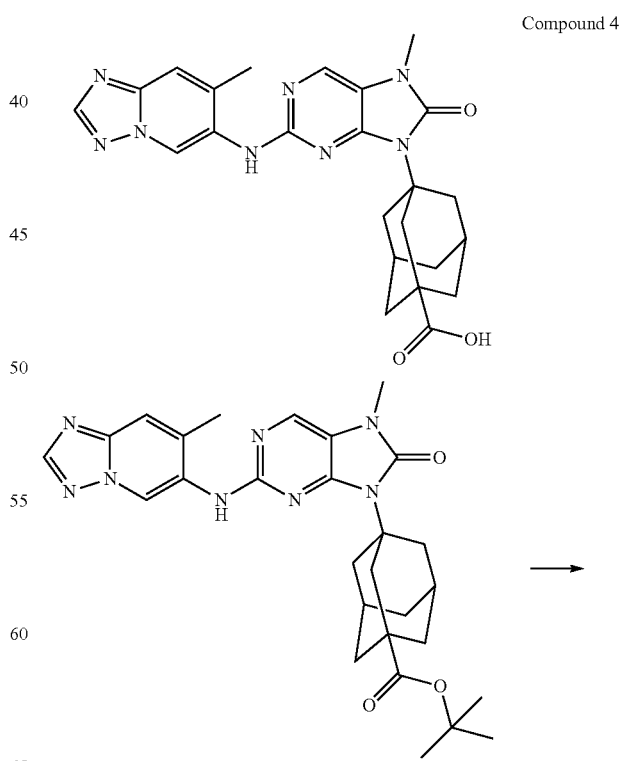

Compound 4

Compound 3

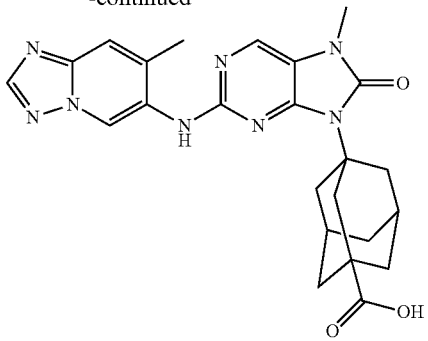

Compound 4

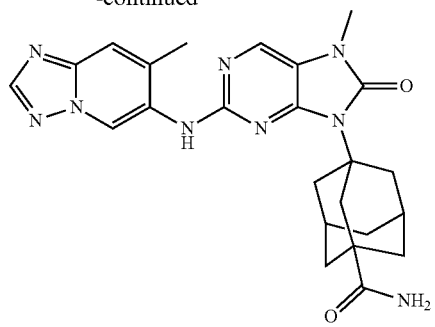

Compound 5

Compound 3 (1.4 g, 2.64 mmol) was dissolved in 4 N dioxane hydrochloride solution (100 mL). The mixture was allowed to react at room temperature for 16 h and concentrated, and the residue was purified by preparative medium pressure liquid chromatography to give compound 4 (pale yellow solid, 1.4 g, 99% yield).

$^1$H NMR (400 MHz, DMSO-$d_6$) δ 12.15 (s, 1H), 9.07 (s, 1H), 8.57 (s, 1H), 8.36 (s, 1H), 8.09 (s, 1H), 7.68 (s, 1H), 3.24 (s, 3H), 2.41-2.58 (m, 6H), 2.38 (s, 3H), 2.14 (s, 2H), 1.56-1.71 (m, 6H).

LC-MS m/z (ESI)=475.20 [M+1].

Example 5

3-(7-Methyl-2-[(7-methyl-[1,2,4]triazolo[1,5-a]pyridin-6-yl)amino]-8-oxo-8,9-dihydro-7H-purin-9-yl) adamantane-1-carboxamide (Compound 5)

Compound 4 (0.5 g, 1.05 mmol), ammonium chloride (0.56 g, 10.50 mmol) and triethylamine (0.73 mL, 5.25 mmol) were dissolved in N,N-dimethylformamide (15 mL), and HATU (0.6 g, 1.58 mmol) was added under an ice bath. The mixture was allowed to react at room temperature for 1 h, quenched with water (30 mL), and extracted with ethyl acetate (30 mL×3). The organic phase was dried and concentrated to give compound 5 (white solid, 0.14 g, 28.16% yield).

$^1$H NMR (400 MHz, DMSO-$d_6$) δ 9.08 (s, 1H), 8.56 (s, 1H), 8.36 (s, 1H), 8.08 (s, 1H), 7.68 (s, 1H), 6.97 (s, 1H), 6.74 (s, 1H), 3.24 (s, 3H), 2.33-2.62 (m, 9H), 2.15 (s, 2H), 1.51-1.73 (m, 4H).

LC-MS m/z (ESI)=474.3 [M+1].

Example 6

3-(7-Methyl-2-[(7-methyl-[1,2,4]triazolo[1,5-a]pyridin-6-yl)amino]-8-oxo-8,9-dihydro-7H-purin-9-yl) adamantane-1-carbonitrile (Compound 6)

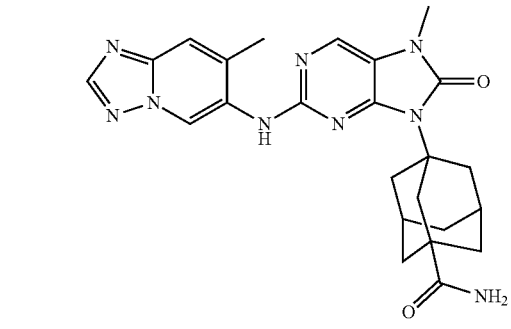

Compound 5

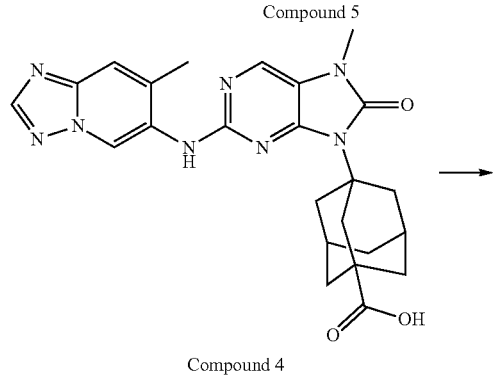

Compound 4

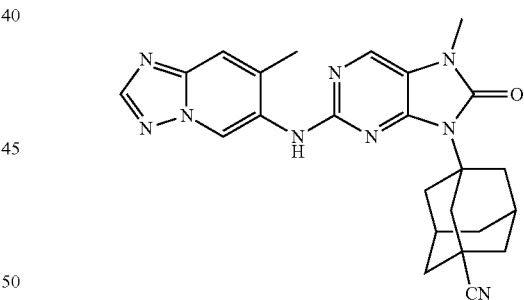

Compound 6

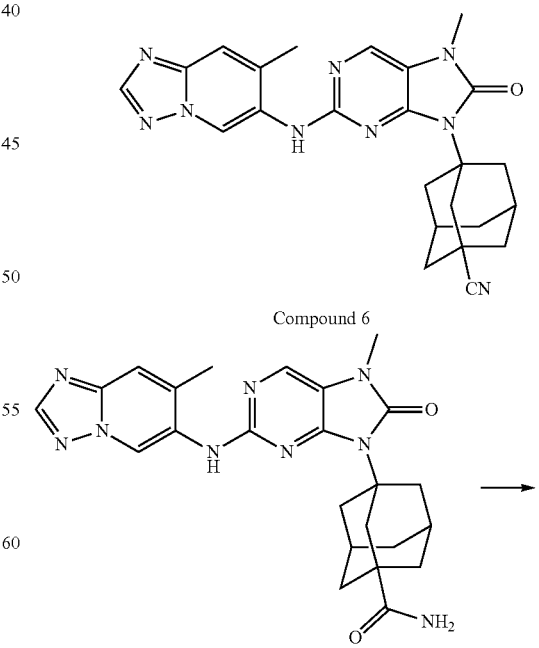

化合物5
Compound 5

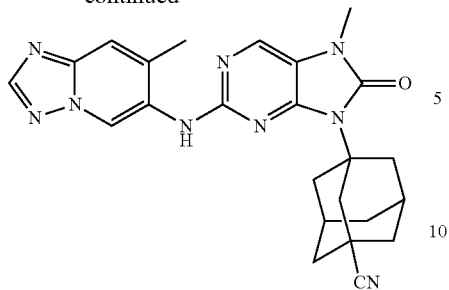

Compound 6

Compound 5 (130 mg, 0.27 mmol) was dissolved in dichloromethane (20 mL), and pyridine (90 mg, 1.08 mmol) and trifluoroacetic anhydride (170 mg, 0.81 mmol) were added under an ice bath. The reaction mixture was allowed to react for another hour with the temperature maintained. Methanol (20 mL) was added, and the crude product was concentrated. The crude product was re-dissolved in ethyl acetate (50 mL), and the resulting solution was washed successively with 15% NaHCO$_3$ (50 mL) and saturated brine (50 mL), dried, and concentrated to give Compound 6 (pale yellow solid, 60 mg, 48.78% yield).

$^1$H NMR (400 MHz, DMSO-d$_6$) δ 9.07 (s, 1H), 8.65 (s, 1H), 8.37 (s, 1H), 8.11 (s, 1H), 7.70 (s, 1H), 3.25 (s, 3H), 2.75 (s, 2H), 2.44-2.51 (m, 4H), 2.38 (s, 3H), 2.15 (s, 2H), 1.91-1.94 (m, 4H), 1.53-1.62 (m, 2H).

LC-MS m/z (ESI)=456.2 [M+1].

Example 7

Ethyl-3-(7-methyl-2-[(7-methyl-[1,2,4]triazolo[1,5-a]pyridin-6-yl)amino]-8-oxo-8,9-dihydro-7H-purin-9-yl)adamantane-1-carboxylate (Compound 7)

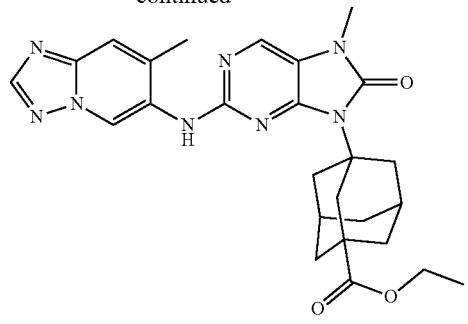

Compound 7

Compound 4 (0.5 g, 1.05 mmol) was dissolved in ethanol (20 mL), and 2 drops of concentrated sulfuric acid were added. The reaction mixture was directly heated to 90° C. and refluxed for 2 h. The reaction was monitored by LCMS until its completion. The reaction mixture was brought back to room temperature, and solid sodium carbonate was added until no bubble produced.

The reaction mixture was filtered, and the filtrate was concentrated to give a crude product. The crude product was purified by preparative medium pressure liquid chromatography (100% acetonitrile) to give compound 7 (white solid, 0.3 g, 56.85% yield).

$^1$H NMR (400 MHz, DMSO-d$_6$) δ 9.06 (s, 1H), 8.59 (s, 1H), 8.36 (s, 1H), 8.10 (s, 1H), 7.68 (s, 1H), 3.98 (q, 2H), 3.24 (s, 3H), 2.41-2.57 (m, 4H), 2.38 (s, 3H), 2.15 (s, 2H), 1.57-1.71 (m, 6H), 1.10 (t, 3H).

LC-MS m/z (ESI)=503.3 [M+1].

Example 8

7-Methyl-2-[(7-methyl-[1,2,4]triazolo[1,5-a]pyridin-6-yl)amino]-9-[3-(hydroxymethyl)adamantan-1-yl]-8,9-dihydro-7H-purin-8-one (Compound 8)

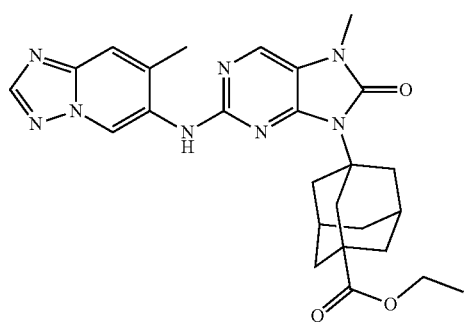

Compound 7

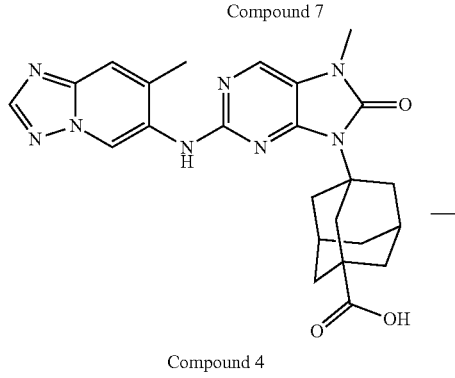

Compound 4

→

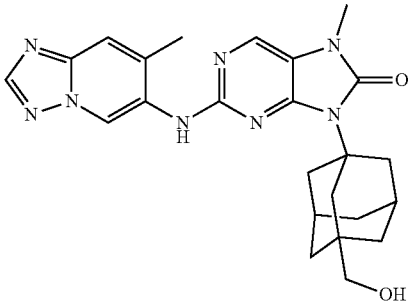

Compound 8

53

-continued

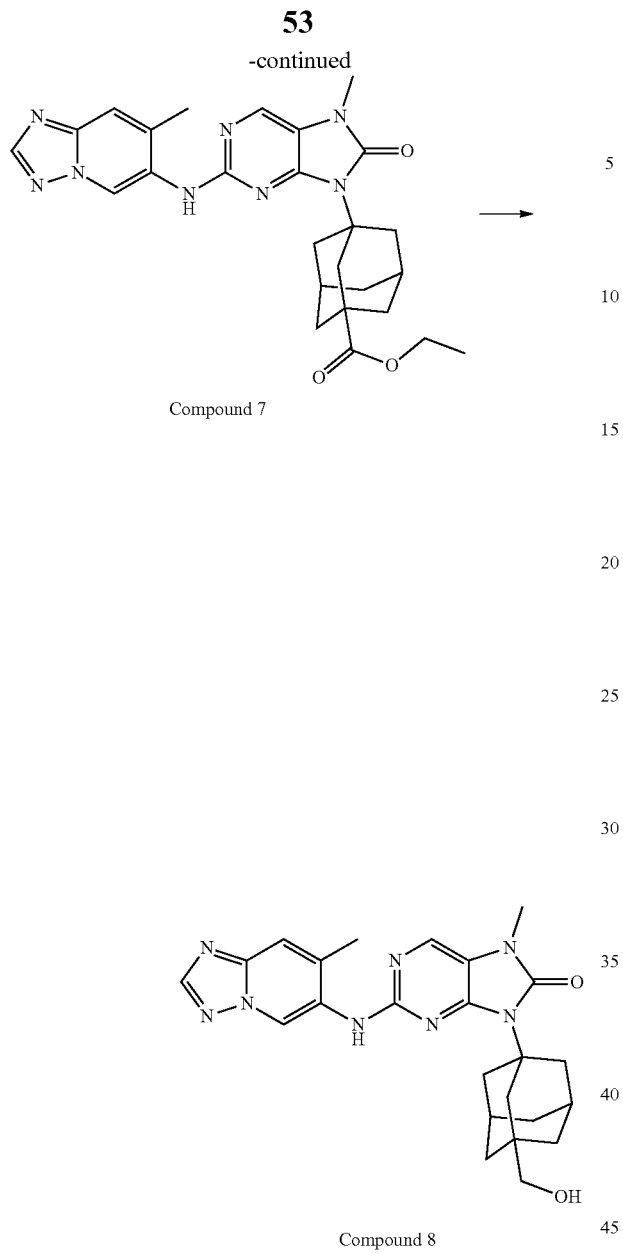

Compound 7

Compound 8

Compound 7 (200 mg, 0.4 mmol) was dissolved in tetrahydrofuran (10 mL), and lithium aluminum hydride (0.8 mL, 0.8 mmol, 1 M) was added under an ice bath. The reaction mixture was allowed to react under the ice bath for 30 min. 30 μL of deionized water, 15% sodium hydroxide solution, 90 μL of deionized water and 1 g of anhydrous magnesium sulfate were successively added. The reaction mixture was stirred at room temperature for another 30 min and filtered, and the filtrate was concentrated to give a crude product, which was then purified by column chromatography to give compound 8 (white solid, 60 mg, 32.01% yield).

$^1$H NMR (400 MHz, DMSO-$d_6$) δ 9.06 (s, 1H), 8.54 (s, 1H), 8.36 (s, 1H), 8.08 (s, 1H), 7.70 (s, 1H), 4.36 (t, 1H), 3.24 (s, 3H), 2.95 (d, 2H), 2.46 (s, 2H), 2.41 (s, 2H), 2.38 (s, 3H), 2.15 (s, 2H), 2.10 (s, 2H) 1.36-1.58 (m, 6H).

LC-MS m/z (ESI)=461.2 [M+1].

54

Example 9

7-Methyl-2-[(7-methyl-[1,2,4]triazolo[1,5-a]pyridin-6-yl)amino]-9-[3-(morpholine-4-carbonyl)adamantan-1-yl]-8,9-dihydro-7H-purin-8-one (Compound 9)

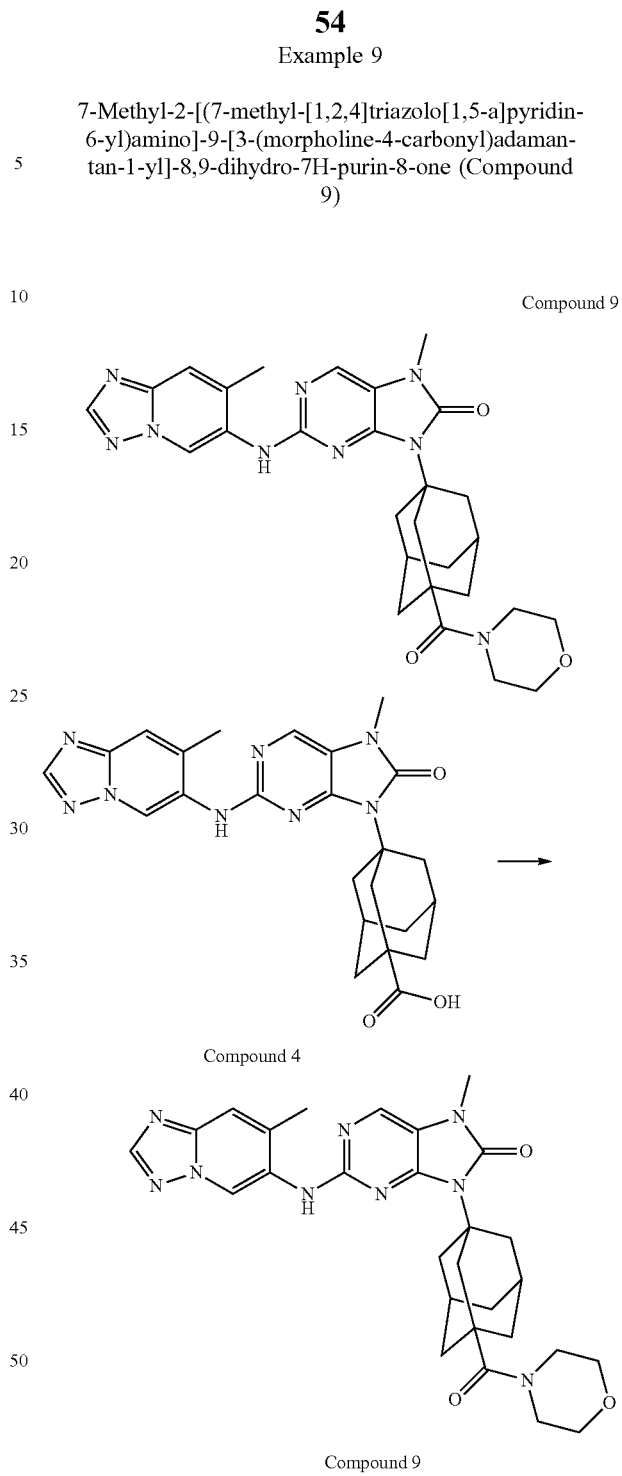

Compound 9

Compound 4

Compound 9

Compound 4 (50 mg, 0.11 mmol), morpholine (28.75 mg, 0.33 mmol) and triethylamine (55.65 mg, 0.55 mmol) were dissolved in N,N-dimethylformamide (10 mL), and 2-(7-azabenzotriazole)-N,N,N',N'-tetramethyluroniumhexafluorophosphate (209.13 mg, 0.55 mmol) was added under an ice bath. The reaction mixture was allowed to react at room temperature for another hour. The reaction was monitored by TLC until its completion. The reaction mixture was diluted with water (30 mL) and then extracted with ethyl acetate (50 mL×3). The organic phases were combined, dried, and concentrated to give a crude product. The crude product was purified by preparative medium pressure liquid chromatography to give compound 9 (white solid, 22 mg, 35.73% yield).

$^1$H NMR (400 MHz, DMSO-d$_6$) δ 9.09 (s, 1H), 8.56 (s, 1H), 8.36 (s, 1H), 8.09 (s, 1H), 7.68 (s, 1H), 3.51 (d, 7H), 3.24 (s, 3H), 2.67 (d, 2H), 2.60 (s, 2H), 2.38 (s, 3H), 2.34 (d, 2H), 2.17 (s, 2H), 1.79-1.85 (m, 4H), 1.56-1.63 (m, 2H).

LC-MS m/z (ESI)=544.30 [M+1].

Example 10

7-Methyl-2-[(7-methyl-[1,2,4]triazolo[1,5-a]pyridin-6-yl)amino]-9-[3-aminoadamantan-1-yl]-8,9-dihydro-7H-purin-8-one (Compound 10)

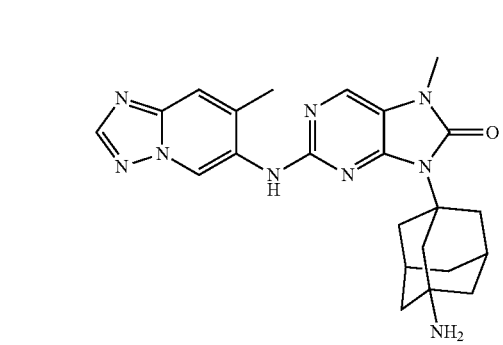

Compound 10

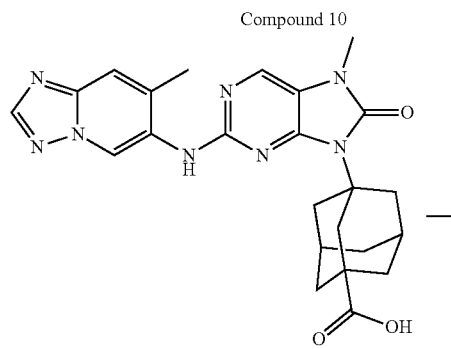

Compound 4

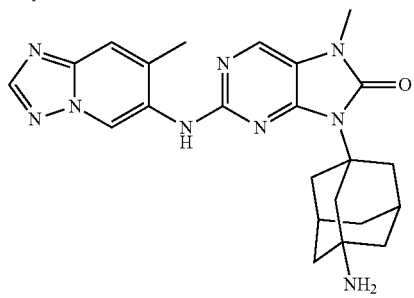

Compound 10

Compound 4 (50 mg, 0.11 mmol) was dissolved in tert-butanol (10 mL), and diphenylphosphoryl azide (42.39 mg, 0.11 mmol) and triethylamine (11.13 mg, 0.11 mmol) were added under an ice bath. The reaction mixture was allowed to react at room temperature for 1 h and then refluxed at 90° C. for 1 h. The reaction mixture was allowed to naturally cool to room temperature and slowly added to 2 mL of concentrated sulfuric acid. The resulting liquid was added dropwise to 50 mL of ice water, and the resulting liquid was concentrated to dryness. The residue was purified by preparative medium pressure liquid chromatography to give compound 10 (white solid, 4 mg, 7.92% yield).

$^1$H NMR (400 MHz, DMSO-d$_6$) δ 9.12 (s, 1H), 8.57 (s, 1H), 8.36 (s, 1H), 8.11 (s, 1H), 7.71 (s, 1H), 3.25 (s, 3H), 2.32-2.44 (m, 9H), 2.15 (s, 2H), 1.86 (s, 2H), 1.41-1.53 (m, 6H).

LC-MS m/z (ESI)=446.20 [M+1].

Example 11

9-(3-Methoxyadamantan-1-yl)-7-methyl-2-((7-methyl-[1,2,4]triazolo[1,5-a]pyridin-6-yl)amino)-7,9-dihydro-8H-purin-8-one (Compound 11)

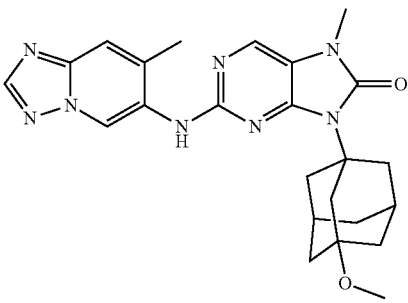

Compound 11

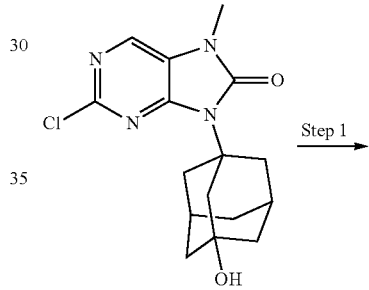

1j

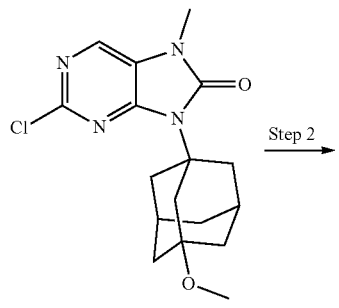

11a

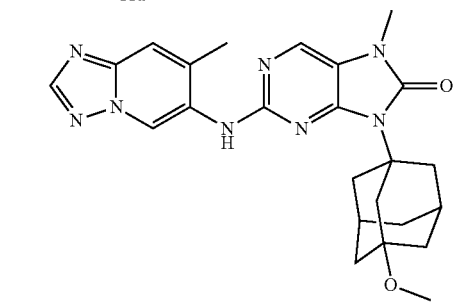

Compound 11

Step 1:

2-Chloro-9-(3-methoxyadamantan-1-yl)-7-methyl-7, 9-dihydro-8H-purin-8-one (11a)

Compound 1j (160 mg, 0.48 mmol) and sodium hydride (38.23 mg, 0.96 mmol) were dissolved in N,N-dimethylformamide (10 mL), followed by nitrogen purging, and iodomethane (101.75 mg, 0.72 mmol) was added dropwise under an ice bath. The reaction mixture was stirred at room temperature for 1 h. The reaction was monitored by TLC until its completion. The reaction mixture was poured into ice water, and the solid was collected and purified by silica gel column chromatography (dichloromethane/methanol (v/v)=30/1) to give compound 11a (white solid, 100 mg, 59.72% yield).

$^1$H NMR (400 MHz, DMSO-d$_6$) δ 8.32 (s, 1H), 3.30 (s, 3H), 3.15 (s, 3H), 2.38-2.46 (m, 6H), 2.33 (s, 2H), 1.50-1.72 (m, 6H).

LC-MS m/z (ESI)=349.10 [M+1].

Step 2:

9-(3-Methoxyadamantan-1-yl)-7-methyl-2-((7-methyl-[1,2,4]triazolo[1,5-a]pyridin-6-yl)amino)-7, 9-dihydro-8H-purin-8-one (Compound 11)

Compound 11a (120 mg, 0.34 mmol), cesium carbonate (220 mg, 0.68 mmol) and methanesulfonato(2-dicyclohexylphosphino-3,6-dimethoxy-2',4',6'-tri-i-propyl-1,1'-biphenyl)(2'-amino-1,1'-biphenyl-2-yl)palladium(II) (30 mg, 0.03 mmol) were dissolved in dioxane (5 mL), followed by nitrogen purging. The reaction mixture was stirred at 100° C. for 4 h. The reaction was monitored by TLC until its completion. The reaction mixture was poured into ice water, and the solid was collected and purified by silica gel column chromatography (dichloromethane/methanol (v/v)=100/1) to give compound 11 (white solid, 12 mg, 7.66% yield).

$^1$H NMR (400 MHz, DMSO-d$_6$) δ 9.04 (s, 1H), 8.60 (s, 1H), 8.37 (s, 1H), 8.10 (s, 1H), 7.70 (s, 1H), 3.24 (s, 3H), 2.92 (s, 3H), 2.36-2.38 (m, 9H), 2.22 (s, 2H), 1.60-1.42 (m, 6H).

LC-MS m/z (ESI)=461.2 [M+1].

Example 12

4-((9-3-Hydroxyadamantan-1-yl)-7-methyl-8-oxo-8, 9-dihydro-7H-purin-2-yl)amino)-3-methylbenzonitrile (Compound 12)

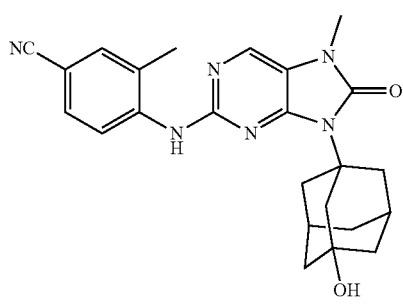

Compound 12

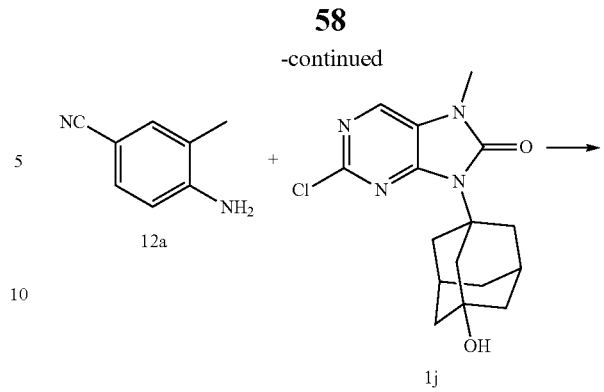

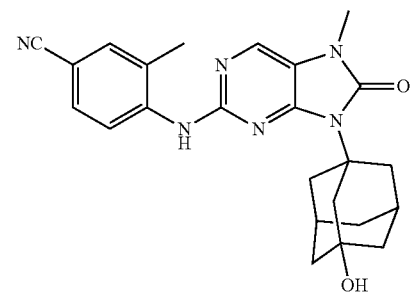

Compound 12

Compound 12a (100 mg, 0.76 mmol), compound 1j (250 mg, 0.76 mmol), cesium carbonate (500 mg, 1.52 mmol) and methanesulfonato(2-dicyclohexylphosphino-3,6-dimethoxy-2',4',6'-tri-i-propyl-1,1'-biphenyl)(2'-amino-1,1'-biphenyl-2-yl)palladium(II) (70 mg, 0.08 mmol) were dissolved in dioxane (10 mL), followed by nitrogen purging. The reaction mixture was stirred at 100° C. for 4 h. The reaction was monitored by TLC until its completion. The reaction mixture was poured into ice water, and the solid was collected and purified by silica gel column chromatography (dichloromethane/methanol (v/v)=30/1) to give compound 12 (white solid, 60 mg, 17.61% yield).

$^1$H NMR (400 MHz, DMSO-d$_6$) δ 8.54 (s, 1H), 8.16 (s, 1H), 8.07 (d, 1H), 7.62 (s, 1H), 7.58 (d, 1H), 4.66 (s, 1H), 3.26 (s, 3H), 2.37 (m, 9H), 2.24 (s, 2H), 1.46-1.66 (m, 6H).

LC-MS m/z (ESI)=431.20 [M+1].

Example 13
4-((9-(5-Hydroxyadamantan-2-yl)-7-methyl-8-oxo-8,9-dihydro-7H-purin-2-yl)amino)-3-methylbenzonitrile (Compound 13)
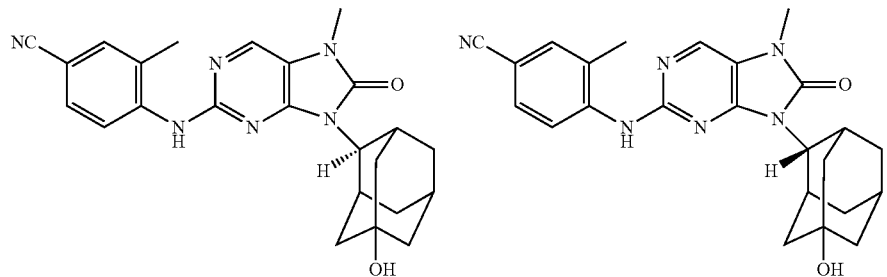
Compound 13-1 and Compound 13-2
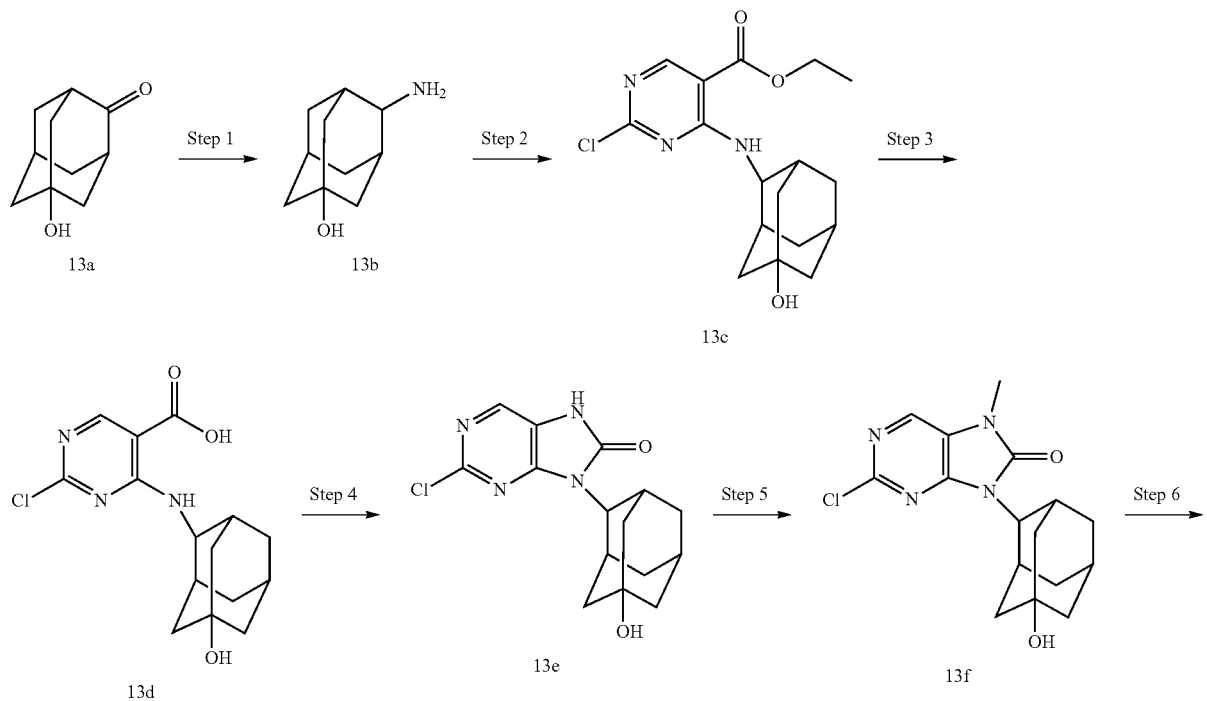
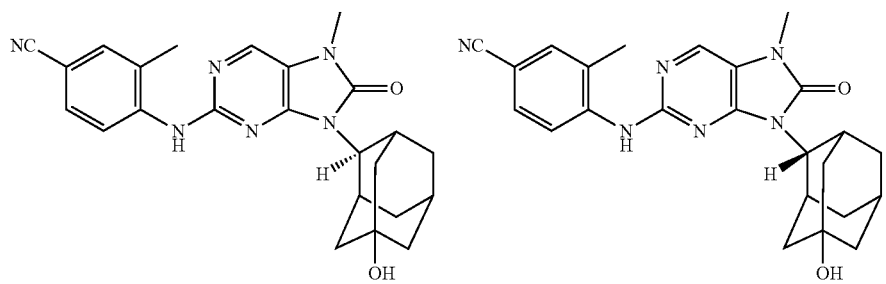
Compound 13-1 and Compound 13-2

Step 1:

4-Aminoadamantan-1-ol (13b)

Compound 13a (9 g, 54.2 mmol) was dissolved in methanol (50 mL), and 910 mg of 4 A molecular sieve was added, followed by 10 mL of aminomethanol solution. The reaction mixture was stirred at room temperature for 20 h. The reaction was monitored by TLC until its completion. The reaction mixture was filtered, and the filtrate was concentrated to give compound 13b (white solid, 7.8 g, 85% yield).

$^1$H NMR (400 MHz DMSO) δ 4.256 (m, 1H), 2.735 (d, 1H), 1.936 (m, 4H), 1.792 (m, 1H), 1.698 (s, 1H), 1.578 (m, 8H), 1.216 (m, 2H).

LC-MS m/z (ESI)=168.2 [M+1].

Step 2:

Ethyl 2-chloro-4-((5-hydroxyadamantan-2-yl)amino)pyrimidine-5-carboxylate (13c)

Compound 1f (7.8 g, 46.7 mmol) and potassium carbonate (6.2 g, 44.8 mmol) were dissolved in acetonitrile (20 mL), and compound 13b (10.3 g, 46.7 mmol) was added at 0° C. The reaction mixture was stirred at room temperature for 20 h. 30 mL of water was added, and a white solid precipitated. The solid was collected by filtration to give compound 13c (white solid, 10 g, 92% yield).

$^1$H NMR (400 MHz DMSO) δ 8.79 (t, 1H), 8.640 (d, 1H), 4.345 (m, 2H), 4.123 (m, 1H), 2.086 (s, 2H), 1.767 (m, 1H), 1.607 (m, 2H), 1.353 (m, 9H), 1.212 (m, 3H).

LC-MS m/z (ESI)=353.2 [M+1].

Step 3:

2-Chloro-4-((5-hydroxyadamantan-2-yl)amino)pyrimidine-5-carboxylic acid (13d)

Compound 13c (10 g, 28.4 mmol) was dissolved in 50 mL of tetrahydrofuran and 30 mL of water, and lithium hydroxide (2.4 g, 56.8 mmol) was added. The reaction mixture was stirred at room temperature for 1 h. The reaction was monitored by TLC until its completion. Tetrahydrofuran was removed by rotary evaporation. The pH was adjusted to 4-5, and a white solid precipitated. The reaction mixture was filtered, and the filter cake was washed twice with petroleum ether/ethyl acetate (v/v=10/1). The filtrate was concentrated to give compound 13d (white solid, 8.6 g, 83% yield), which was directly used in the next step.

$^1$H NMR (400 MHz DMSO) δ 13.903 (S, 1H), 9.034 (d, 1H), 8.583 (d, 1H), 4.038 (m, 1H), 2.089 (m, 3H), 1.686 (m, 9H), 1.521 (m, 2H).

LC-MS m/z (ESI)=325.2 [M+1].

Step 4:

2-Chloro-9-(5-hydroxyadamantan-2-yl)-7,9-dihydro-8H-purin-8-one (13e)

Compound 13d (4 g, 12.3 mmol) was dissolved in dimethylacetamide (10 mL), and triethylamine (1.2 g, 12.3 mmol) and diphenylphosphoryl azide (3.4 g, 12.3 mmol) were added. The reaction mixture was then gradually warmed to 120° C. and stirred for 1.5 h. The reaction was monitored by TLC until its completion. 30 mL of water was added, and a white solid precipitated. The solid was collected by filtration to give compound 13e (white solid, 1.36 g, 36% yield).

$^1$H NMR (400 MHz DMSO) δ 11.606 (s, 1H), 8.098 (d, 1H), 4.446 (m, 1H), 4.223 (d, 1H), 2.999 (m, 2H), 2.128 (m, 3H), 1.780 (m, 6H), 1.460 (m, 2H).

LC-MS m/z (ESI)=321.2 [M+1].

Step 5:

2-Chloro-9-(5-hydroxyadamantan-2-yl)-7-methyl-7,9-dihydro-8H-purin-8-one (13f)

Compound 13e (1.36 g, 4.25 mmol) was dissolved in dimethylformamide (10 mL), and dimethyl sulfate (535.5 mg, 4.25 mmol) and cesium carbonate (923 mg, 7.8 mmol) were added at 0° C. The reaction mixture was stirred at 0° C. for 1 h. The reaction was monitored by TLC until its completion. 10 mL of water was then added, followed by three extractions with ethyl acetate. The organic phase was dried over anhydrous sodium sulfate and concentrated, and a solid precipitated. The solid was collected by filtration to give compound 13f (white solid, 423 mg, 63% yield).

$^1$H NMR (400 MHz DMSO) δ 8.327 (s, 1H), 4.489 (d, 1H), 4.203 (d, 1H), 3.330 (s, 3H), 2.989 (s, 2H), 20.79 (m, 3H), 1.730 (m, 6H), 1.455 (m, 2H).

LC-MS m/z (ESI)=335.2 [M+1].

Step 6:

4-((9-(5-Hydroxyadamantan-2-yl)-7-methyl-8-oxo-8,9-dihydro-7H-purin-2-yl)amino)-3-methylbenzonitrile (Compound 13)

Compound 13f (314 mg, 1.0 mmol), compound 12a (132 mg, 1.0 mmol), cesium carbonate (977 mg, 3 mmol), tris(dibenzylideneacetone)dipalladium (146 mg, 0.16 mmol) and 2,2'-bis(diphenylphosphino)-1,1'-binaphthyl (90.6 mg, 0.1 mmol) were dissolved in dioxane, followed by nitrogen purging. The reaction mixture was stirred at 100° C. for 4 h. The reaction mixture was concentrated, and the residue was purified by silica gel column chromatography (dichloromethane/methanol (v/v)=30/1) followed by preparative HPLC to give compound 13 (i.e., compound 13-1 and compound 13-2) as two white solids: compound 13-1 (45 mg, 13% yield, RT=5.55, dr %: 99.56%), and compound 13-2 (30 mg, 9.8%, RT=5.70, dr %: 99.18%). Mobile phase: acetonitrile/0.01 mol/L NH$_4$HCO$_3$—H$_2$=46/54; column temperature: 35° C.; column pressure: 80 bar; flow rate: 20 mL/min; diode array detector at a wavelength of 200-300 nm.

Compound 13-1:

$^1$H NMR (400 MHz DMSO) δ 8.57 (s, 1H), 8.15 (s, 1H), 7.97 (d, 1H), 7.62 (d, 1H), 7.56 (dd, 1H), 4.49 (s, 1H), 4.24 (s, 1H), 3.29 (s, 3H), 3.01 (d, 2H), 2.29 (s, 3H), 2.07 (d, 2H), 1.99 (s, 1H), 1.68-1.79 (d, 4H), 1.64 (S, 2H), 1.38 (d, 2H).

LC-MS m/z (ESI)=431.2 [M+1].

Compound 13-2:

$^1$H NMR (400 MHz DMSO) δ 8.54 (s, 1H), 8.16 (s, 1H), 8.02 (d, 1H), 7.61 (s, 1H), 7.57 (dd, 1H), 4.34 (s, 1H), 4.14 (s, 1H), 3.29 (s, 3H), 3.16 (s, 3H), 2.30 (s, 3H), 2.01-2.07 (m, 3H), 1.67-1.76 (m, 4H), 1.60 (s, 2H), 1.44 (d, 2H).

LC-MS m/z (ESI)=431.2 [M+1].

Example 14

4-((9-(3-Hydroxyadamantan-1-yl)-7-methyl-8-oxo-8,9-dihydro-7H-purin-2-yl)amino)-3-methylbenzamide (Compound 14)

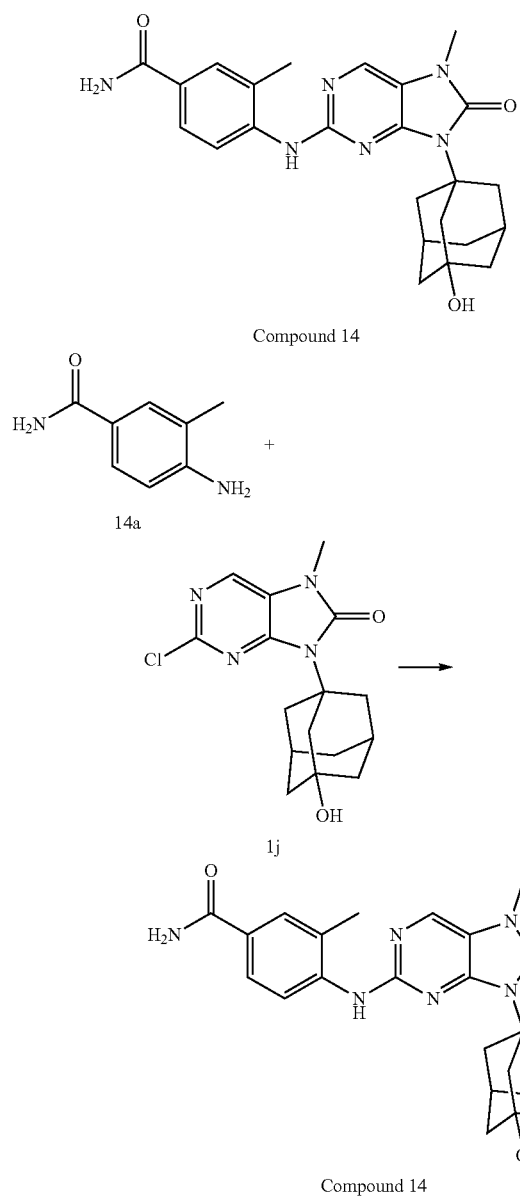

Compound 14a (100 mg, 0.76 mmol), compound 1j (270 mg, 0.8 mmol), cesium carbonate (440 mg, 1.34 mmol) and methanesulfonato(2-dicyclohexylphosphino-3,6-dimethoxy-2',4',6'-tri-i-propyl-1,1'-biphenyl)(2'-amino-1,1'-biphenyl-2-yl)palladium(II) (61 mg, 0.08 mmol) were dissolved in dioxane (10 mL), followed by nitrogen purging. The reaction mixture was stirred at 100° C. for 4 h. The reaction was monitored by TLC until its completion. The reaction mixture was poured into ice water, and the solid was collected and purified by silica gel column chromatography (dichloromethane/methanol (v/v)=30/1) to give compound 14 (white solid, 60 mg, 17.61% yield).

$^1$H NMR (400 MHz, DMSO-d$_6$) δ 8.31 (s, 1H), 8.10 (s, 1H), 7.87 (d, 1H), 7.78 (s, 1H), 7.71 (s, 1H), 7.67 (d, 1H), 7.15 (s, 1H), 4.63 (s, 1H), 3.25 (s, 3H), 2.40 (m, 6H), 2.30 (s, 3H), 2.23 (s, 2H), 1.45-1.65 (m, 6H).

LC-MS m/z (ESI)=449.20 [M+1].

Example 15

5-((9-(3-Hydroxyadamantan-1-yl)-7-methyl-8-oxo-8,9-dihydro-7H-purin-2-yl)amino)-N,4-dimethylpicolinamide (Compound 15)

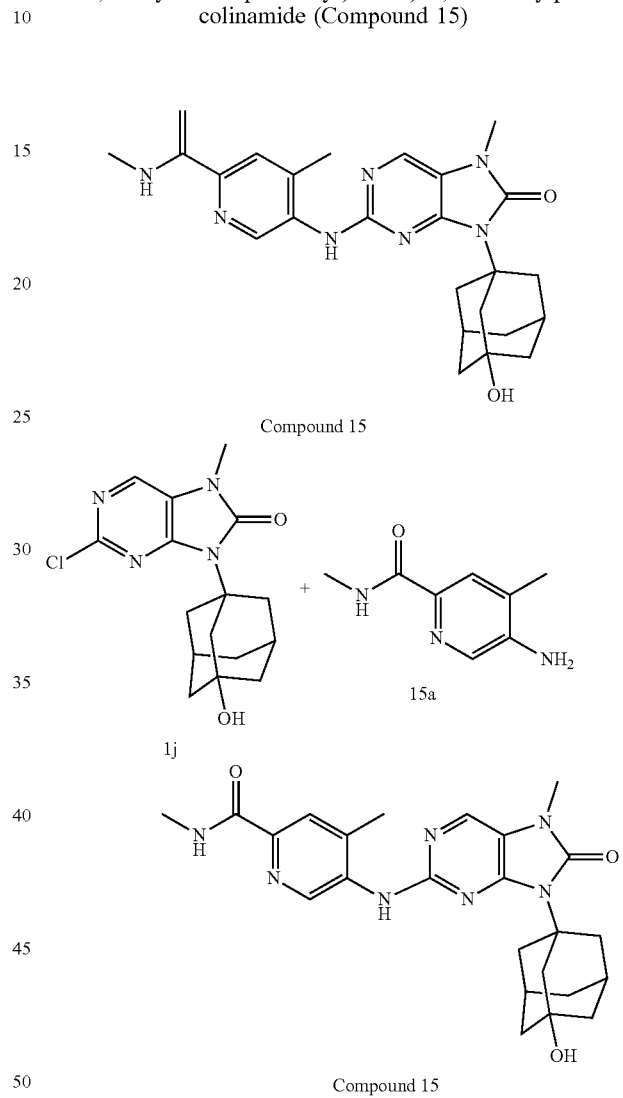

Compound 1j (190 mg, 0.6 mmol), compound 15a (100 mg, 0.6 mmol), cesium carbonate (391 mg, 1.2 mmol) and methanesulfonato(2-dicyclohexylphosphino-3,6-dimethoxy-2',4',6'-tri-i-propyl-1,1'-biphenyl)(2'-amino-1,1'-biphenyl-2-yl)palladium(II) (55 mg, 0.06 mmol) were dissolved in 2 mL of dioxane, followed by nitrogen purging. The reaction mixture was stirred at 110° C. for 4 h. The reaction mixture was concentrated, and the residue was purified by silica gel column chromatography (dichloromethane/methanol (v/v)=35/1) followed by Pre-HPLC to give compound 15 (yellow solid, 86 mg, 89% yield).

$^1$H NMR (400 MHz DMSO) δ 8.77 (s, 1H), 8.71 (s, 1H), 8.55 (m, 1H), 8.071 (s, 1H), 7.86 (s, 1H), 4.60 (S, 1H), 3.24 (S, 1H), 2.80 (d, 3H), 2.32-2.40 (s, 8H), 2.20 (m, 2H), 1.34-1.62 (m, 6H).

LC-MS m/z (ESI)=464.20 [M+1].

Example 16

9-((1R,2r,3S,5s,7s)-5-hydroxyadamantan-2-yl)-7-methyl-2-((7-methyl-[1,2,4]triazolo[1,5-a]pyridin-6-yl)amino)-7,9-dihydro-8H-purin-8-one (Compound 16)

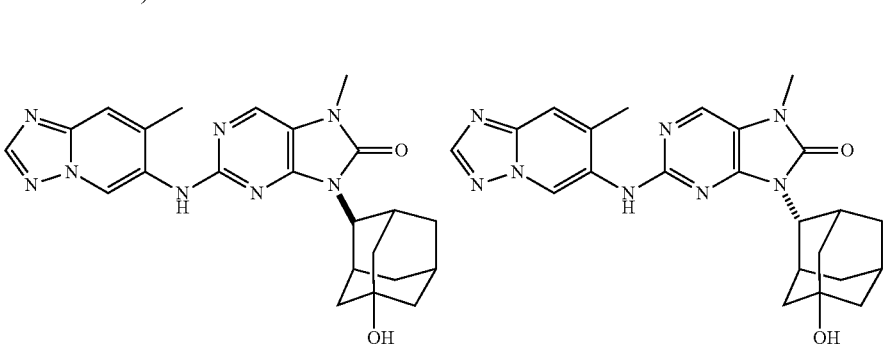

Compound 16-1 and Compound 16-2

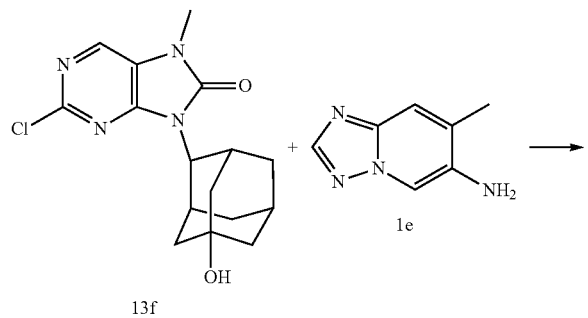

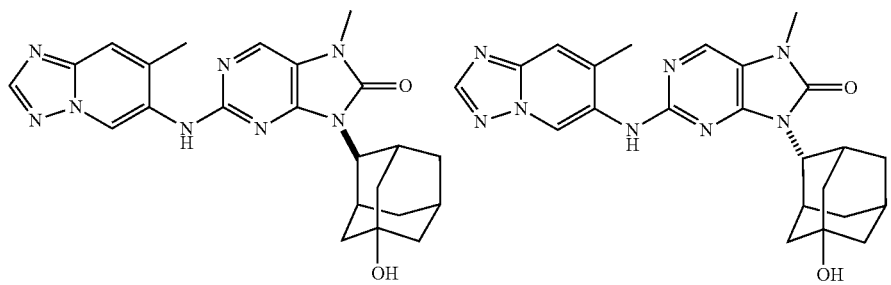

Compound 16-1 and Compound 16-2

Compound 13f (200 mg, 0.59 mmol), compound 1e (88 mg, 0.59 mmol), cesium carbonate (576 mg, 1.77 mmol) and methanesulfonato(2-dicyclohexylphosphino-3,6-dimethoxy-2',4',6'-tri-i-propyl-1,1'-biphenyl)(2'-amino-1,1'-biphenyl-2-yl)palladium(II) (54 mg, 0.059 mmol) were dissolved in dioxane (4 mL), followed by nitrogen purging. The reaction mixture was stirred at 110° C. for 4 h. The reaction mixture was concentrated, and the residue was purified by silica gel column chromatography (dichloromethane/methanol (v/v)=35/1) followed by Pre-HPLC to give compound 16 (i.e., compound 16-1 and compound 16-2) as two white solids: compound 16-1 (39 mg, 15.1% yield, RT=3.53, dr %: 99.01%), and compound 16-2 (5 mg, 6.2% yield, RT=3.70, dr %: 99.21%). Pre-HPLC (OZ), mobile phase: acetonitrile/ 0.01 mol/L $NH_4HCO_3$—$H_2$=45/55; column temperature: 35° C.; column pressure: 80 bar; flow rate: 20 mL/min; diode array detector at a wavelength of 200-300 nm.

Compound 16-1:

$^1$H NMR (400 MHz DMSO) δ 8.999 (s, 1H), 8.558 (s, 1H), 8.373 (s, 1H), 8.097 (s, 2H), 7.690 (s, 1H), 4.456 (s, 1H), 4.201 (s, 1H), 3.293 (s, 3H), 2.908 (s, 2H), 2.355 (s, 3H), 2.031 (d, 2H), 1.821 (s, 1H), 1.365 (dd, 3H), 1.551 (s, 1H), 1.225 (d, 2H).

LC-MS m/z (ESI)=447.2 [M+1].

Compound 16-2:

$^1$H NMR (400 MHz DMSO) δ 9.077 (s, 1H), 8.533 (s, 1H), 8.366 (s, 1H), 8.102 (s, 2H), 7.682 (s, 1H), 4.299 (s, 1H), 4.119 (s, 1H), 3.280 (s, 3H), 3.148 (s, 2H), 2.385 (s, 3H), 1.950 (m, 3H), 1.634 (m, 5H), 1.352 (d, 2H).

LC-MS m/z (ESI)=447.2 [M+1].

Example 17
2-Fluoro-4-(4-(4-hydroxyadamantan-1-yl)-7-methyl-8-oxo-8,9-dihydro-7H-purin-2-yl)amino)-5-methyl-benzamide (Compound 17)
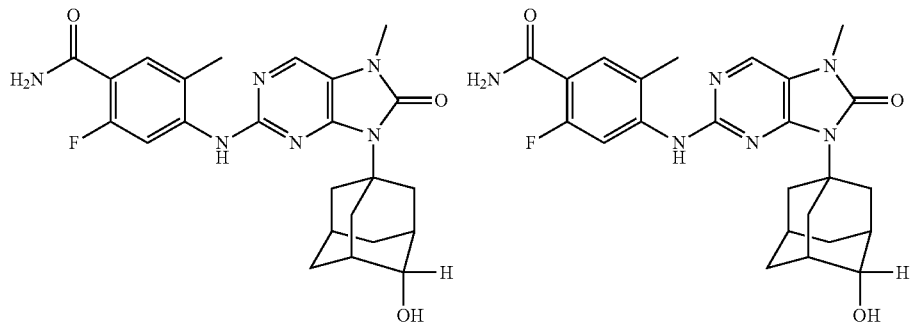
Compound 17-1 and Compound 17-2
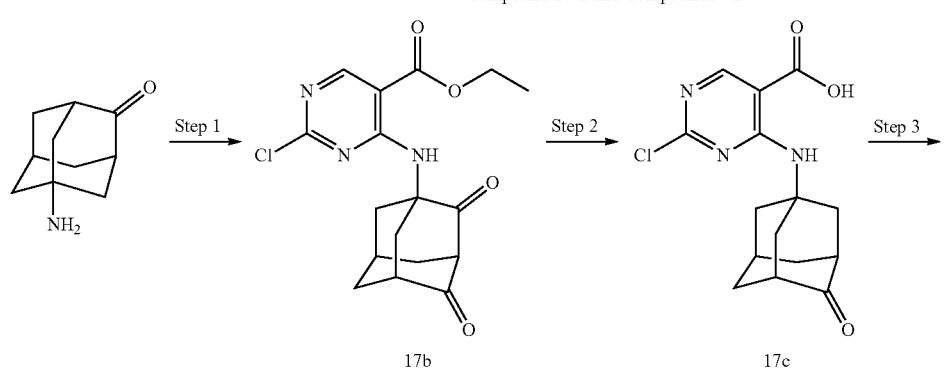
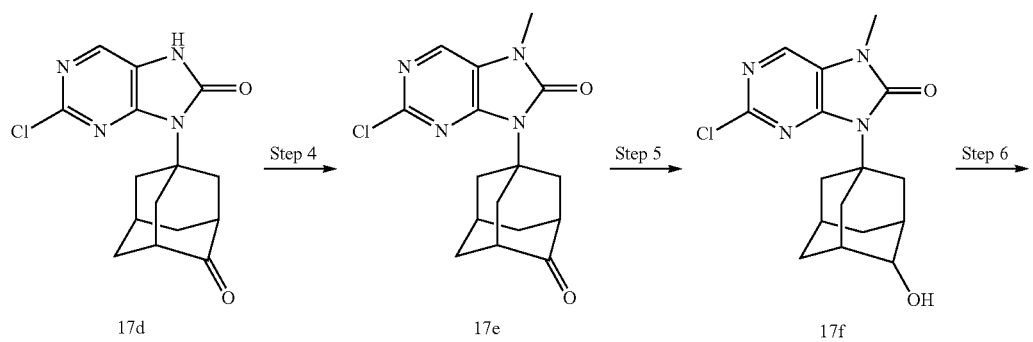
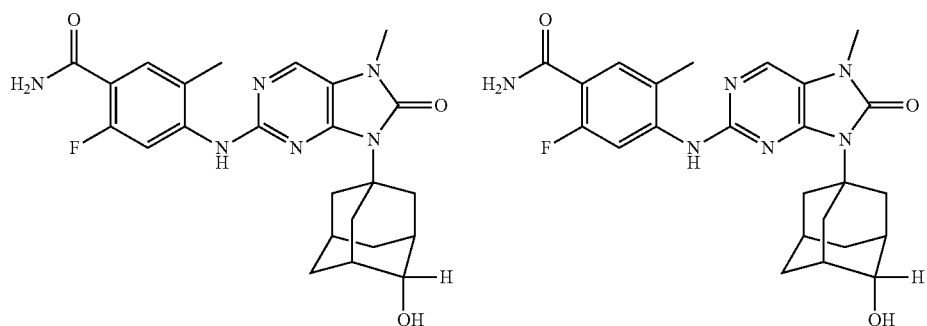
Compound 17-1 and Compound 17-2

Step 1:

Ethyl 2-chloro-4-(4-oxoadamantan-1-yl)amino)pyrimidine-5-carboxylate (17b)

Compound 1f (3.7 g, 16.7 mmol) and potassium carbonate (6.9 g, 50.1 mmol) were dissolved in acetonitrile (20 mL), and compound 17a (2.7 g, 16.7 mmol) was added at 0° C. The reaction mixture was stirred at room temperature for 20 h. Water (30 mL) was added, followed by extraction with ethyl acetate (60 mL×3). The organic phase was washed once with saturated brine, dried over anhydrous sodium sulfate, and mixed with silica gel to prepare a sample, which was then applied in the purification by silica gel column chromatography (n-hexane: ethyl acetate=10:1), followed by concentration to give compound 17b (white solid, 4 g, 69% yield).

$^1$H NMR (400 MHz DMSO) δ 8.65 (s, 1H), 8.38 (s, 1H), 4.28-4.34 (m, 1H), 2.49-2.52 (m, 2H), 2.24-2.36 (m, 5H), 2.01-2.05 (m, 2H), 1.87-1.90 (m, 2H), 1.31 (t, 3H).

LC-MS m/z (ESI)=350.10 [M+1].

Step 2:

2-Chloro-4-(4-oxoadamantan-1-yl)amino)pyrimidine-5-carboxylic acid (17c)

Compound 17b (4 g, 11.5 mmol) was dissolved in 5 mL of tetrahydrofuran and 5 mL of water, and lithium hydroxide (966 mg, 23 mmol) was added. The reaction mixture was stirred at room temperature for 1 h. Tetrahydrofuran was removed by rotary evaporation. The pH was adjusted to 4-5, and a white solid precipitated. The reaction mixture was filtered, and the filter cake was washed twice with petroleum ether/ethyl acetate (v/v=10/1). The filtrate was concentrated to give compound 17c (white solid, 3.2 g, 99% yield).

$^1$H NMR (400 MHz DMSO) δ 11.64 (s, 1H), 8.10 (s, 1H), 2.85-2.86 (m, 2H), 2.71-2.77 (m, 4H), 2.57-2.61 (m, 2H), 2.28-2.33 (m, 1H), 2.04-2.13 (m, 2H), 1.87-1.95 (m, 2H).

LC-MS m/z (ESI)=322.10 [M+1].

Step 3:

2-Chloro-9-(4-oxoadamantan-1-yl)-7,9-dihydro-8H-purin-8-one (17d)

Compound 17c (3.7 g, 11.5 mmol) was dissolved in dimethylacetamide (10 mL), and triethylamine (1.1 g, 11.5 mmol) and diphenylphosphoryl azide (3.2 g, 11.5 mmol) were added. The reaction mixture was then gradually warmed to 110° C. and stirred for 1.5 h. The reaction mixture was concentrated, followed by addition of 30 mL of water, and a white solid precipitated. The solid was collected by filtration to give compound 17d (white solid, 3.3 g, 83% yield).

LC-MS m/z (ESI)=319.10 [M+1]

Step 4:

2-Chloro-7-methyl-9-(4-oxoadamantan-1-yl)-7,9-dihydro-8H-purin-8-one (17e)

Compound 17d (3.3 g, 10.3 mmol) was dissolved in dimethylformamide (10 mL), and dimethyl sulfate (1.3 g, 10.3 mmol) and cesium carbonate (6.7 g, 20.6 mmol) were added at 0° C. The reaction mixture was stirred at 0° C. for 30 min. 20 mL of water was then added, and a solid precipitated. The solid was collected by filtration to give compound 17e (white solid, 2.9 g, 86% yield).

$^1$H NMR (400 MHz DMSO) δ 8.34 (s, 1H), 3.31 (s, 3H), 2.96-2.99 (m, 2H), 2.72-2.88 (m, 4H), 2.62-2.67 (m, 2H), 2.30 (S, 2H), 2.06-2.14 (m, 2H), 1.88-1.93 (m, 2H).

LC-MS m/z (ESI)=333.10 [M+1]

Step 5:

2-Chloro-9-(4-hydroxyadamantan-1-yl)-7-methyl-7,9-dihydro-8H-purin-8-oneile (17f)

Compound 17e (600 mg, 0.3 mmol) was dissolved in 5 mL of methanol, and sodium borohydride (23 mg, 0.6 mmol) was added in batches at room temperature. The reaction mixture was stirred at room temperature for 1 h. The reaction mixture was concentrated, and the residue was purified by silica gel column chromatography (dichloromethane/methanol (v/v)=40/1) to give compound 17f (white solid, 566 mg, 92% yield).

$^1$H NMR (400 MHz DMSO) δ 8.31 (d, 1H), 3.68 (d, 1H), 3.03 (s, 3H), 2.76 (d, 1H), 2.61 (d, 1H), 2.38-2.49 (m, 4H), 1.97-2.07 (m, 4H), 1.76 (d, 1H), 1.40-1.62 (m, 2H).

LC-MS m/z (ESI)=335.10 [M+1].

Step 6:

2-Fluoro-4-(4-hydroxyadamantan-1-yl)-7-methyl-8-oxo-8,9-dihydro-7H-purin-2-yl)amino)-5-methyl-benzamide (Compound 17)

Compound 17f (200 mg, 0.6 mmol), 4-amino-2-fluoro-5-methylbenzamide (201 mg, 1.2 mmol), cesium carbonate (586 mg, 1.8 mmol) and methanesulfonato(2-dicyclohexylphosphino-3,6-dimethoxy-2',4',6'-tri-i-propyl-1,1'-biphenyl)(2'-amino-1,1'-biphenyl-2-yl)palladium(II) (54.4 mg, 0.06 mmol) were dissolved in dioxane (4 mL), followed by nitrogen purging. The reaction mixture was stirred at 100° C. for 4 h, with the reaction monitored by TLC until its completion. The reaction mixture was concentrated, and the residue was purified by silica gel column chromatography (dichloromethane/methanol (v/v)=60/1) followed by Pre-HPLC to give compound 17 (i.e., compound 17-1 and compound 17-2) as two white solids: compound 17-1 (27 mg, 31% yield, RT=6.26, dr %: 99.44%), and compound 17-2 (12 mg, 16% yield, RT=6.53, dr %: 99.50%). Pre-HPLC (OZ), mobile phase: acetonitrile/0.01 mol/L NH$_4$HCO$_3$—H$_2$=46/54; column temperature: 34° C.; column pressure: 80 bar; flow rate: 20 mL/min; diode array detector at a wavelength of 200-300 nm.

Compound 17-1:

$^1$H NMR (400 MHz DMSO) δ 8.41 (s, 1H), 8.17 (s, 1H), 7.86 (d, 1H), 7.53 (d, 1H), 7.43 (d, 2H), 4.71 (s, 1H), 3.77 (m, 1H), 3.26 (s, 3H), 2.65 (m, 2H), 2.50-2.51 (m, 3H), 2.89 (s, 3H), 1.96-2.06 (m, 5H), 1.42 (m, 2H).

LC-MS m/z (ESI)=467.20 [M+1]

Compound 17-2:

$^1$H NMR (400 MHz DMSO) δ 8.37 (s, 1H), 8.16 (s, 1H), 7.87 (d, 1H), 7.53 (d, 1H), 7.43 (d, 2H), 4.71 (d, 1H), 3.59 (m, 1H), 3.26 (s, 3H), 2.71 (m, 2H), 2.44-2.52 (m, 4H), 2.29 (s, 3H), 2.02 (s, 3H), 1.75-1.19 (m, 2H), 1.58-1.61 (m, 2H).

LC-MS m/z (ESI)=467.20 [M+1]

Example 18

9-(4-Hydroxyadamantan-1-yl)-7-methyl-2-((7-methyl-[1,2,4]triazolo[1,5-a]pyridin-6-yl)amino)-7,9-dihydro-8H-purin-8-one (Compound 18)

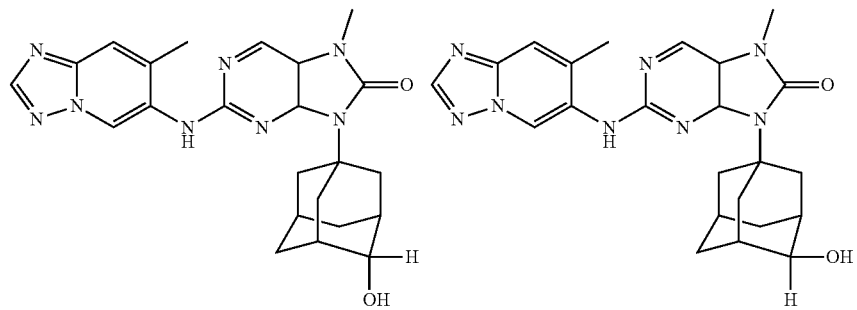
Compound 18-1 and Compound 18-2

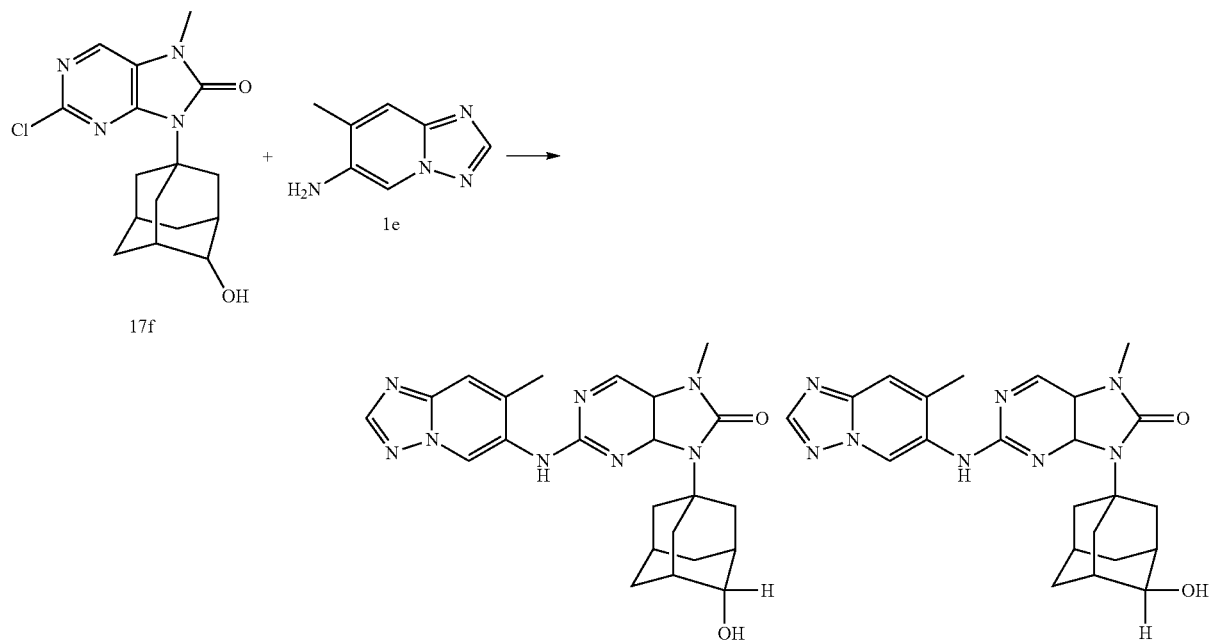
Compound 18-1 and Compound 18-2

Compound 17f (200 mg, 0.6 mmol), compound 1e (88.8 mg, 0.6 mmol), cesium carbonate (586 mg, 1.8 mmol) and methanesulfonato(2-dicyclohexylphosphino-3,6-dimethoxy-2',4',6'-tri-i-propyl-1,1'-biphenyl)(2'-amino-1,1'-biphenyl-2-yl)palladium(II) (54.4 mg, 0.06 mmol) were dissolved in dioxane (4 mL), followed by nitrogen purging. The reaction mixture was stirred at 100° C. for 4 h. The reaction was monitored by TLC until its completion. The reaction mixture was concentrated, and the residue was purified by silica gel column chromatography (dichloromethane/methanol (v/v)=60/1) followed by Pre-HPLC to give compound 18 (i.e., compound 18-1 and compound 18-2) as two white solids: compound 18-2 (44 mg, 36% yield, RT=6.03, dr %: 98.56%), and compound 17-1 (58 mg, 43% yield, RT=6.51, dr %: 98.98%). Pre-HPLC (OZ), mobile phase: acetonitrile/ 0.01 mol/L NH$_4$HCO$_3$—H$_2$=43/57; column temperature: 34° C.; column pressure: 80 bar; flow rate: 20 mL/min; diode array detector at a wavelength of 200-300 nm.

Compound 18-1:

$^1$H NMR (400 MHz DMSO) δ 9.10 (s, 1H), 8.55 (s, 1H), 8.36 (s, 1H), 8.08 (s, 1H), 7.69 (s, 1H), 4.64 (d, 1H), 3.70 (d, 1H), 3.24 (s, 3H), 2.62 (d, 2H), 2.42 (s, 3H), 2.39 (s, 4H), 1.97 (d, 2H), 1.90 (d, 3H), 1.29 (d, 2H).

LC-MS m/z (ESI)=447.20 [M+1]

Compound 18-2:

$^1$H NMR (400 MHz DMSO) δ 9.09 (s, 1H), 8.52 (s, 1H), 8.36 (s, 1H), 8.07 (s, 1H), 7.69 (s, 1H), 4.66 (d, 1H), 3.55 (d, 1H), 3.23 (s, 3H), 2.64 (d, 2H), 2.45 (s, 2H), 2.39 (s, 3H), 2.37 (s, 2H), 1.93 (d, 3H), 1.63 (d, 2H), 1.52 (d, 2H).

LC-MS m/z (ESI)=447.20 [M+1]

Example 19

7-Methyl-2-((7-methyl-[1,2,4]triazolo[1,5-a]pyridin-6-yl)amino)-9-(4-oxoadamantan-1-yl)-7,9-dihydro-8H-purin-8-one (Compound 19)

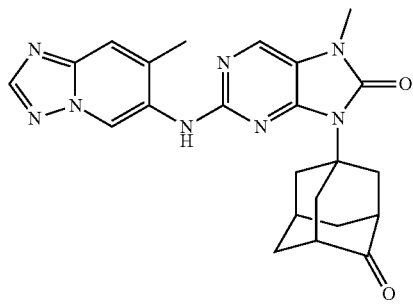

Compound 19

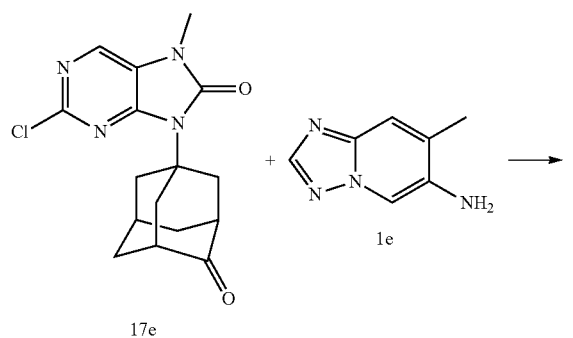

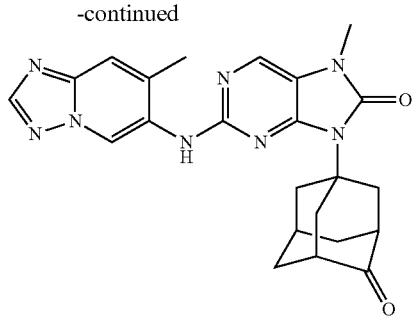

Compound 19

Compound 17e (200 mg, 0.68 mmol), compound 1e (89 mg, 0.68 mmol), cesium carbonate (391 mg, 1.2 mmol) and methanesulfonato(2-dicyclohexylphosphino-3,6-dimethoxy-2',4',6'-tri-i-propyl-1,1'-biphenyl)(2'-amino-1,1'-biphenyl-2-yl)palladium(II) (62 mg, 0.068 mmol) were dissolved in dioxane (3 mL), followed by nitrogen purging. The reaction mixture was stirred at 110° C. for 4 h, with the reaction monitored by TLC until its completion. The reaction mixture was concentrated, and the residue was purified by silica gel column chromatography (dichloromethane/methanol (v/v)=60/1) followed by Pre-HPLC to give compound 19 (white solid, 68 mg, 22.4% yield).

$^1$H NMR (400 MHz DMSO) δ 9.11 (s, 1H), 8.61 (s, 1H), 8.37 (s, 1H), 8.11 (s, 1H), 7.70 (s, 1H), 3.25 (s, 3H), 2.93-2.96 (m, 2H), 2.66-2.69 (m, 4H), 2.39 (s, 3H), 2.16-2.20 (m, 1H), 1.94-1.99 (m, 2H), 1.81-1.84 (m, 2H), 1.34-1.49 (m, 2H).

LC-MS m/z (ESI)=445.20 [M+1].

Example 20

9-(7-Methyl-2-((7-methyl-[1,2,4]triazolo[1,5-a]pyridin-6-yl)amino)-7,9-dihydro-8H-purin-8-one (Compound 20)

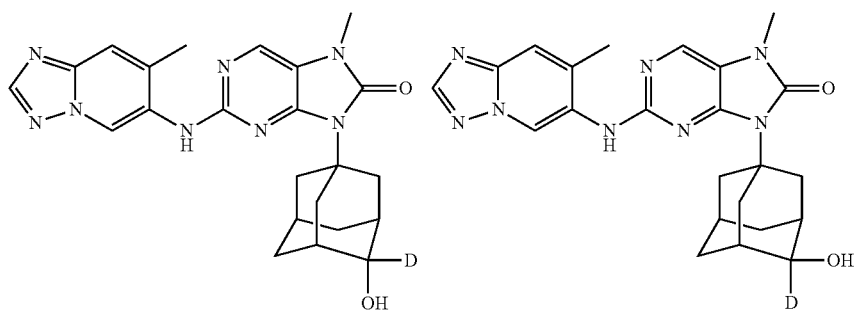

Compound 20-1 and Compound 20-2

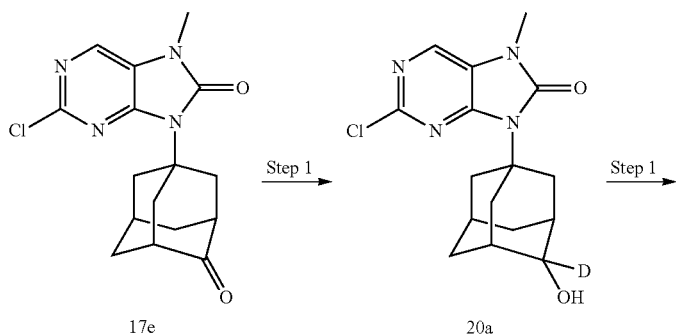

-continued

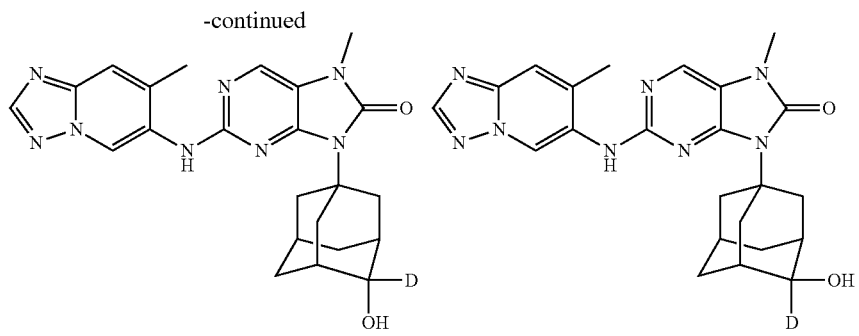

Compound 20-1 and Compound 20-2

Step 1:

2-Chloro-9-(4-hydroxyadamantan-1-yl-4-d)-7-methyl-7,9-dihydro-8H-purin-8-one (20a)

Compound 17e (600 mg, 1.8 mmol) was dissolved in 10 mL of tetrahydrofuran, and lithium aluminium hydride (76 mg, 1.8 mmol) was added. The reaction mixture was stirred at room temperature for 2 h, with the reaction monitored by TLC until its completion. Water: 10% aqueous sodium hydroxide solution:water=1:2:3 was added under an ice bath to quench the reaction, and a solid precipitated. The reaction mixture was filtered, and the filtrate was concentrated to give compound 20a (white solid, 511 mg, 83% yield).

$^1$H NMR (400 MHz DMSO) δ 8.30 (d, 1H), 4.70 (d, 1H), 3.30 (s, 3H), 3.18 (d, 1H), 2.76 (d, 1H), 2.59-2.63 (m, 1H), 2.36-2.51 (m, 3H), 1.97-2.07 (m, 4H), 1.59-1.77 (m, 2H), 1.40-1.43 (m, 1H).

LC-MS m/z (ESI)=336.20 [M+1].

Step 2:

9-(Hydroxyadamantan-1-yl-4-d)-7-methyl-2-((7-methyl-[1,2,4]triazolo[1,5-a]pyridin-6-yl)amino)-7,9-dihydro-8H-purin-8-one (Compound 20)

Compound 20a (200 mg, 0.59 mmol), compound 1e (88 mg, 0.59 mmol), cesium carbonate (586 mg, 1.8 mmol) and methanesulfonato(2-dicyclohexylphosphino-3,6-dimethoxy-2',4',6'-tri-i-propyl-1,1'-biphenyl)(2'-amino-1,1'-biphenyl-2-yl)palladium(II) (55 mg, 0.059 mmol) were dissolved in dioxane (4 mL), followed by nitrogen purging. The reaction mixture was stirred at 100° C. for 4 h. The reaction was monitored by TLC until its completion. The reaction mixture was concentrated, and the residue was purified by silica gel column chromatography (dichloromethane/methanol (v/v)=20/1) followed by Pre-HPLC to give compound 20 (i.e., compound 20-1 and compound 20-2) as two white solids: compound 20-1 (30 mg, 22% yield, RT=3.25, dr %: 98.74%), and compound 20-2 (64 mg, 44.1% yield, RT=4.66, dr %: 98.92%). Pre-HPLC (OZ), mobile phase: $CO_2$/(0.3% ethylenediamine/ethanol)=75/25; column temperature: 35° C.; column pressure: 80 bar; flow rate: 1 mL/min; detector signal channel: 215 nm@4.8 nm; diode array detector at a wavelength of 200-400 nm.

Compound 20-1:

$^1$H NMR (400 MHz DMSO) δ 9.10 (s, 1H), 8.51 (s, 1H), 8.36 (s, 1H), 8.07 (s, 1H), 7.69 (s, 1H), 4.63 (s, 1H), 3.24 (s, 3H), 2.64-2.67 (m, 2H), 2.36-2.45 (m, 7H), 1.91-1.95 (m, 3H), 1.62-1.65 (m, 2H), 1.51-1.54 (m, 2H).

LC-MS m/z (ESI)=448.20 [M+1].

Compound 20-2:

$^1$H NMR (400 MHz DMSO) δ 9.10 (s, 1H), 8.54 (s, 1H), 8.36 (s, 1H), 8.08 (s, 1H), 7.70 (s, 1H), 4.61 (s, 1H), 3.24 (s, 3H), 2.59-2.67 (m, 2H), 2.32-2.42 (m, 7H), 1.88-1.99 (m, 5H), 1.23-1.40 (m, 2H).

LC-MS m/z (ESI)=448.20 [M+1].

Example 21

5-(7-Methyl-2-((7-methyl-[1,2,4]triazolo[1,5-a]pyridin-6-yl)amino)-8-oxo-7,8-dihydro-9H-purin-9-yl)adamantane-2-carbonitrile (Compound 21)

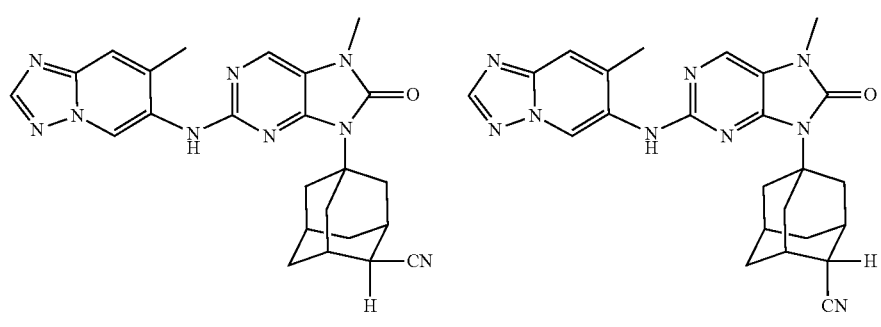

Compound 21-1 and Compound 21-2

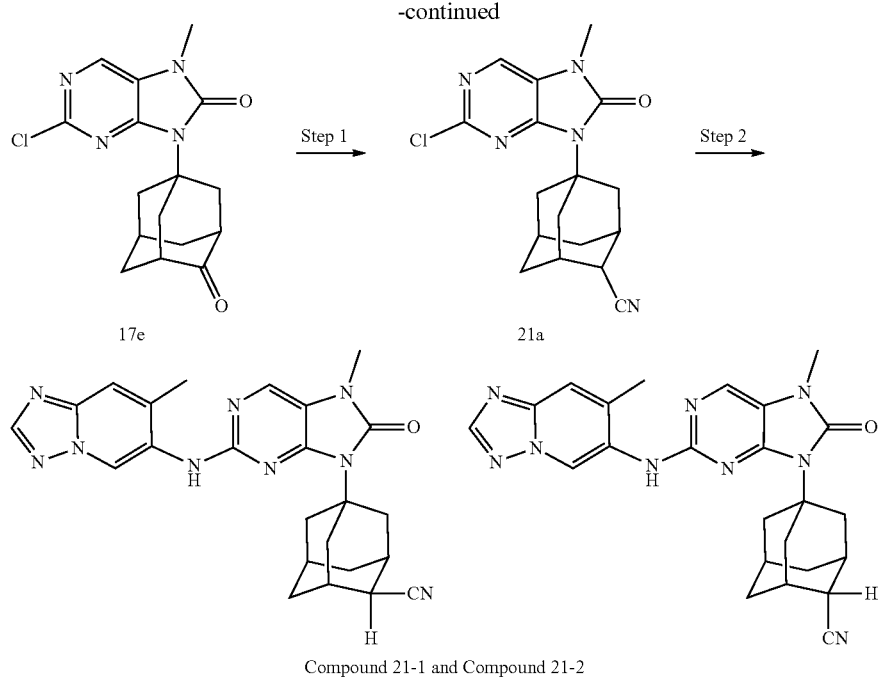

Compound 21-1 and Compound 21-2

Step 1:

5-(2-Chloro-7-methyl-8-oxo-7,8-dihydro-9H-purin-9-yl)adamantane-2-carbonitrile (21a)

Compound 17e (800 mg, 2.4 mmol), p-toluenesulfonylmethyl isocyanide (610 mg, 3.12 mmol) and potassium tert-butoxide (672 mg, 6 mmol) were dissolved in 16 mL of dioxane, and 3 mL of ethanol was added. The reaction mixture was stirred at room temperature for 6 h, with the reaction monitored by TLC until its completion. The reaction mixture was concentrated, and the residue was purified by silica gel column chromatography (petroleum ether/dichloromethane (v/v)=10/1) to give compound 21a (white solid, 533 mg, 47% yield).

LC-MS m/z (ESI)=344.20 [M+1].

Step 2:

5-(7-Methyl-2-((7-methyl-[1,2,4]triazolo[1,5-a]pyridin-6-yl)amino)-8-oxo-7,8-dihydro-9H-purin-9-yl)adamantane-2-carbonitrile (Compound 21)

Compound 21a (200 mg, 0.58 mmol), compound 1e (86.3 mg, 0.58 mmol), cesium carbonate (567 mg, 1.74 mmol) and methanesulfonato(2-dicyclohexylphosphino-3,6-dimethoxy-2',4',6'-tri-i-propyl-1,1'-biphenyl)(2'-amino-1,1'-biphenyl-2-yl)palladium(II) (53 mg, 0.058 mmol) were dissolved in dioxane (4 mL), followed by nitrogen purging. The reaction mixture was stirred at 100° C. for 4 h. The reaction was monitored by TLC until its completion. The reaction mixture was concentrated, and the residue was purified by silica gel column chromatography (dichloromethane/methanol (v/v)=20/1) followed by Pre-HPLC to give compound 21 (i.e., compound 21-1 and compound 21-2) as two white solids: compound 21-1 (23 mg, 16% yield, RT=3.92, dr %: 99.32%), and compound 21-2 (28 mg, 17.2% yield, RT=5.16, dr %: 98.96%). Pre-HPLC (OZ), mobile phase: $CO_2$/(50% isopropanol/acetonitrile solution with 0.3% ethylenediamine added)=60/40; column temperature: 35° C.; column pressure: 80 bar; flow rate: 1 mL/min; detector signal channel: 215 nm@4.8 nm; diode array detector at a wavelength of 200-400 nm.

Compound 21-1:

$^1$H NMR (400 MHz DMSO) δ 9.11 (s, 1H), 8.54 (s, 1H), 8.35 (d, 1H), 8.10 (d, 1H), 7.69 (s, 1H), 3.25 (d, 3H), 2.68-2.72 (m, 2H), 2.60-2.64 (m, 2H), 2.45-2.46 (m, 2H), 2.38 (s, 3H), 2.31 (s, 2H), 2.05 (s, 1H), 1.62-1.69 (m, 4H).

LC-MS m/z (ESI)=456.20 [M+1].

Compound 21-2:

$^1$H NMR (400 MHz DMSO) δ 9.13 (s, 1H), 8.60 (s, 1H), 8.38 (s, 1H), 8.11 (s, 1H), 7.72 (s, 1H), 3.25 (s, 3H), 3.15-3.18 (m, 1H), 2.68-2.71 (m, 2H), 2.48-2.52 (m, 5H), 2.40 (s, 3H), 2.30 (s, 2H), 2.10 (s, 1H), 1.83-1.86 (m, 2H), 1.62-1.65 (m, 2H).

LC-MS m/z (ESI)=456.20 [M+1].

Example 22

2-Fluoro-4-((9-(3-hydroxyadamantan-1-yl)-7-methyl-8-oxo-8,9-dihydro-7H-purin-2-yl)amino)-5-methylbenzamide (Compound 22)

Compound 22

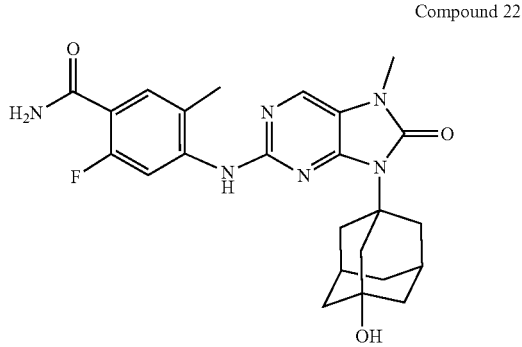

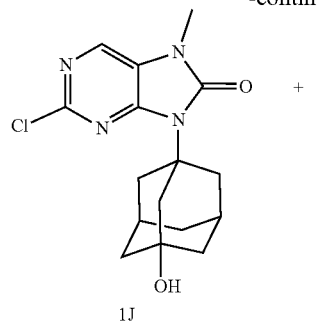

1J

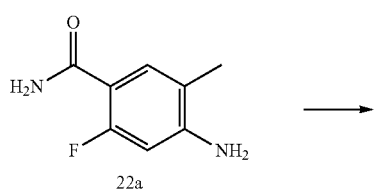

22a

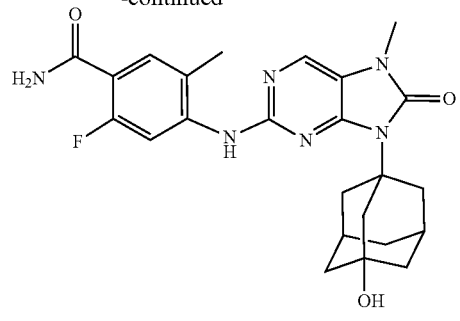

Compound 22

Compound 1j (200 mg, 0.59 mmol), compound 22a (201 mg, 1.19 mmol), cesium carbonate (577 mg, 1.77 mmol) and methanesulfonato(2-dicyclohexylphosphino-3,6-dimethoxy-2',4',6'-tri-i-propyl-1,1'-biphenyl)(2'-amino-1,1'-biphenyl-2-yl)palladium(II) (54 mg, 0.059 mmol) were dissolved in dioxane (4 mL), followed by nitrogen purging. The reaction mixture was stirred at 100° C. for 4 h. The reaction was monitored by TLC until its completion. The reaction mixture was concentrated, and the residue was purified by silica gel column chromatography (dichloromethane/methanol (v/v)=20/1) followed by Pre-HPLC to give compound 22 (white solid, 31.4 mg, 23% yield).

$^1$H NMR (400 MHz DMSO) δ 8.37 (s, 1H), 8.16 (s, 1H), 7.86 (d, 1H), 7.55 (d, 1H), 7.42 (d, 2H), 4.62 (s, 1H), 3.27 (s, 3H), 2.45 (s, 3H), 2.40 (m, 3H), 2.25-2.29 (m, 5H), 1.56-1.68 (m, 5H), 1.47-1.50 (m, 1H).

LC-MS m/z (ESI)=467.20 [M+1].

Example 23

4-((9-(Adamantan-1-yl-4-d)-7-methyl-8-oxo-8,9-dihydro-7H-purin-2-yl)amino)-2-fluoro-5-methyl-benzamide (Compound 23)

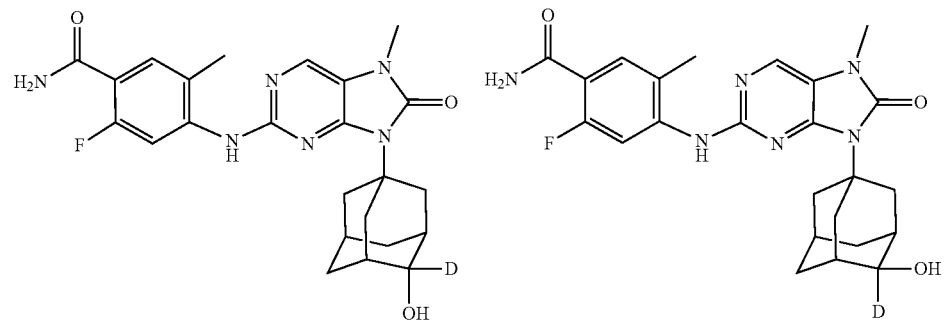

Compound 23-1 and Compound 23-2

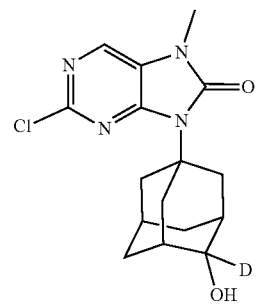

19a

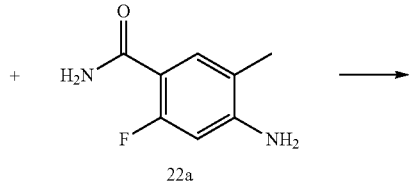

22a

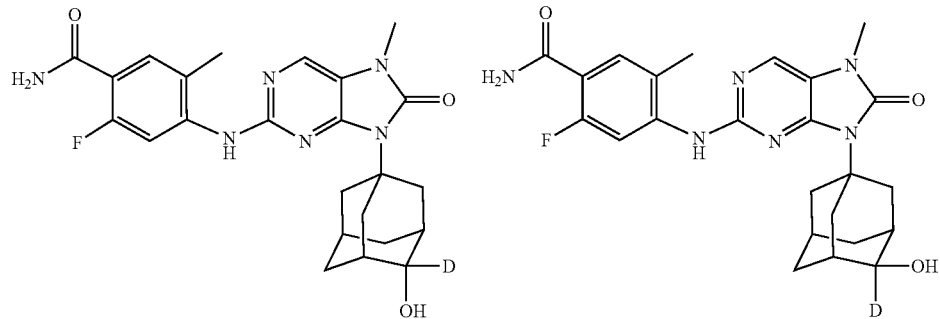

化合物23-1和化合物23-2

Compound 20a (200 mg, 0.58 mmol), compound 22a (200 mg, 1.19 mmol), cesium carbonate (567 mg, 1.74 mmol) and methanesulfonato(2-dicyclohexylphosphino-3,6-dimethoxy-2',4',6'-tri-i-propyl-1,1'-biphenyl)(2'-amino-1,1'-biphenyl-2-yl)palladium(II) (53 mg, 0.058 mmol) were dissolved in dioxane (4 mL), followed by nitrogen purging. The reaction mixture was stirred at 100° C. for 4 h. The reaction was monitored by TLC until its completion. The reaction mixture was concentrated, and the residue was purified by silica gel column chromatography (dichloromethane/methanol (v/v)=20/1) followed by Pre-HPLC to give compound 23 (i.e., compound 23-1 and compound 23-2) as two white solids: compound 23-1 (25.4 mg, 18.3% yield, RT=3.71, dr %: 98.37%), and compound 23-2 (10.2 mg, 8.6% yield, RT=4.73, dr %: 98.66%). Pre-HPLC (OZ), mobile phase: $CO_2$/(0.3% ethylenediamine/ethanol)=70/30; column temperature: 35° C.; column pressure: 80 bar; flow rate: 1 mL/min; detector signal channel: 215 nm@4.8 nm; diode array detector at a wavelength of 200-400 nm.

Compound 23-1:
$^1$H NMR (400 MHz DMSO) δ 8.36 (s, 1H), 8.16 (s, 1H), 7.88 (d, 1H), 7.54 (d, 1H), 7.40 (d, 2H), 4.68 (s, 1H), 3.27 (s, 3H), 2.66-2.73 (m, 2H), 2.52-2.53 (m, 2H), 2.44-2.49 (m, 2H), 2.29 (s, 3H), 2.02 (m, 3H), 1.76-1.79 (m, 2H), 1.59-1.62 (m, 2H).
LC-MS m/z (ESI)=468.20 [M+1].

Compound 23-2:
$^1$H NMR (400 MHz DMSO) δ 8.40 (s, 1H), 8.17 (s, 1H), 7.88 (d, 1H), 7.54 (d, 1H), 7.40 (d, 2H), 4.67 (s, 1H), 3.27 (s, 3H), 2.65-2.68 (s, 2H), 2.01-2.07 (m, 3H), 1.96 (m, 2H), 1.59-1.62 (m, 2H).
LC-MS m/z (ESI)=468.20 [M+1].

Example 24

4-((9-(4-Cyanoadamantan-1-yl)-7-methyl-8-oxo-8,9-dihydro-7H-purin-2-yl)amino)-2-fluoro-5-methyl-benzamide (Compound 24)

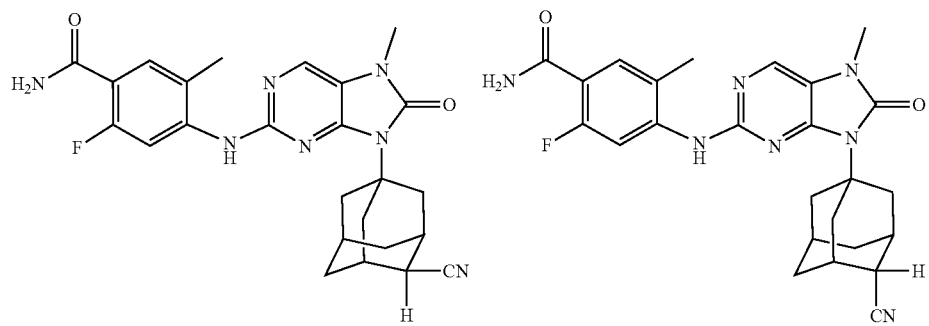

Compound 24-1 and Compound 24-2

-continued

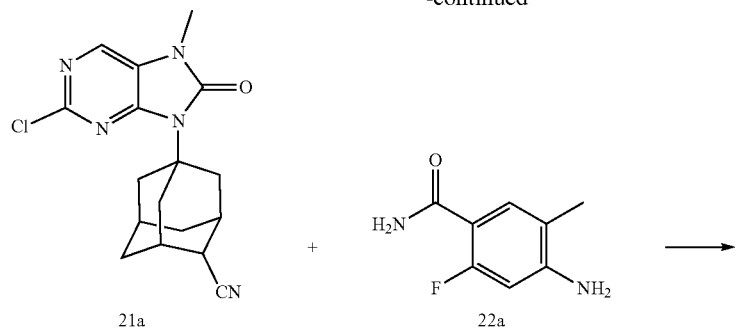

21a

22a

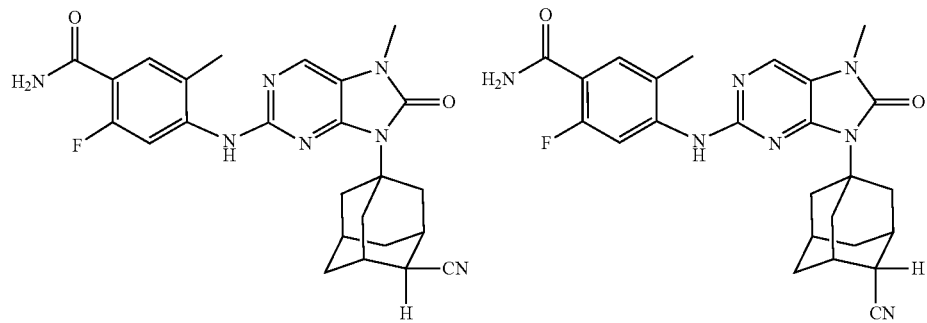

Compound 24-1 and Compound 24-2

Compound 21a (200 mg, 0.58 mmol), compound 22a (194 mg, 1.16 mmol), cesium carbonate (567 mg, 1.74 mmol) and methanesulfonato(2-dicyclohexylphosphino-3,6-dimethoxy-2',4',6'-tri-i-propyl-1,1'-biphenyl)(2'-amino-1,1'-biphenyl-2-yl)palladium(II) (53 mg, 0.058 mmol) were dissolved in dioxane (4 mL), followed by nitrogen purging. The reaction mixture was stirred at 100° C. for 4 h. The reaction was monitored by TLC until its completion. The reaction mixture was concentrated, and the residue was purified by silica gel column chromatography (dichloromethane/methanol (v/v)=20/1) followed by Pre-HPLC to give compound 24 (i.e., compound 24-1 and compound 24-2) as two white solids: compound 24-1 (5.5 mg, 5.6% yield, RT=4.97, dr %: 98.94%), and compound 24-2 (16.8 mg, 11.3% yield, RT=5.96, dr %: 99.04%). Pre-HPLC (OZ), mobile phase: CO$_2$/ethanol=65/35; column temperature: 35° C.; column pressure: 80 bar; flow rate: 1 mL/min; detector signal channel: 215 nm@4.8 nm; diode array detector at a wavelength of 200-400 nm.

Compound 24-1:

$^1$H NMR (400 MHz DMSO) δ 8.47 (s, 1H), 8.19 (s, 1H), 7.82 (d, 1H), 7.54 (d, 1H), 7.38 (d, 2H), 3.29 (s, 3H), 3.15-3.27 (m, 2H), 2.67-2.77 (m, 4H), 2.38 (s, 2H), 2.28 (s, 3H), 2.11-2.13 (m, 2H), 1.77-1.83 (m, 2H), 1.70-1.76 (m, 2H).

LC-MS m/z (ESI)=476.20 [M+1].

Compound 24-2:

$^1$H NMR (400 MHz DMSO) δ 8.36 (s, 1H), 8.18 (s, 1H), 7.88 (d, 1H), 7.54 (d, 1H), 7.40 (d, 2H), 3.28 (s, 3H), 2.99-3.02 (m, 2H), 2.71-2.75 (m, 4H), 3.57 (s, 3H), 2.28-2.33 (m, 4H), 2.06-2.10 (m, 2H), 1.88-1.91 (m, 2H).

LC-MS m/z (ESI)=476.20 [M+1].

Example 25

2-Fluoro-5-methyl-4-((7-methyl-8-oxo-9-(4-oxoadamantan-1-yl)-8,9-dihydro-7H-purin-2-yl)amino)benzamide (Compound 25)

Compound 25

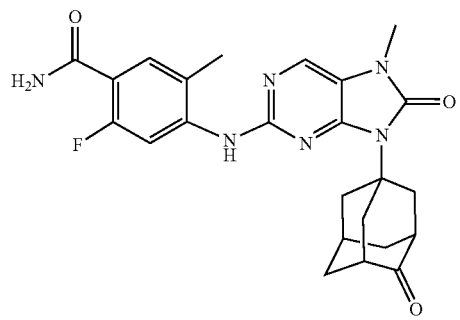

+

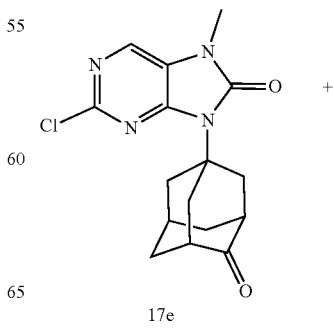

17e

-continued

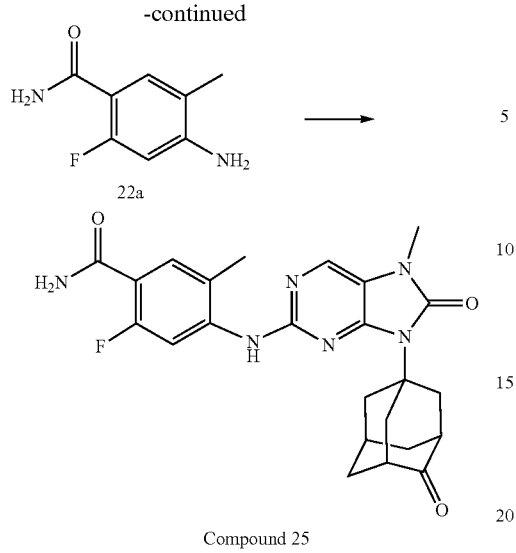

Compound 25

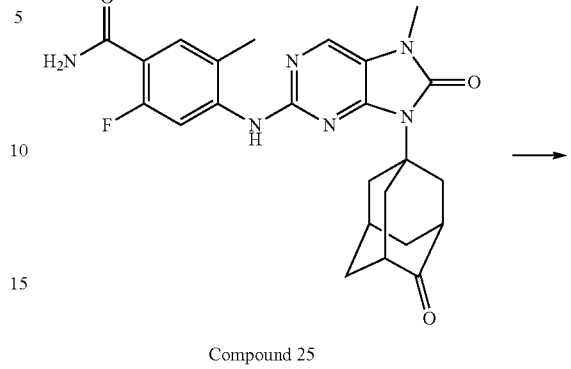

Compound 25

Compound 17e (200 mg, 0.68 mmol), compound 22a (101 mg, 0.68 mmol), cesium carbonate (391 mg, 1.2 mmol) and methanesulfonato(2-dicyclohexylphosphino-3,6-dimethoxy-2',4',6'-tri-i-propyl-1,1'-biphenyl)(2'-amino-1,1'-biphenyl-2-yl)palladium(II) (62 mg, 0.068 mmol) were dissolved in dioxane (3 mL), followed by nitrogen purging. The reaction mixture was stirred at 110° C. for 4 h, with the reaction monitored by TLC until its completion. The reaction mixture was concentrated, and the residue was purified by silica gel column chromatography (dichloromethane/methanol (v/v)=60/1) followed by Pre-HPLC to give compound 25 (white solid, 30 mg, 13.4% yield).

$^1$H NMR (400 MHz DMSO) δ 8.47 (s, 1H), 8.19 (s, 1H), 7.82 (d, 1H), 7.54 (d, 1H), 7.41 (d, 2H), 3.28 (s, 3H), 2.99-3.02 (m, 2H), 2.71-2.75 (m, 4H), 2.27-2.34 (m, 5H), 2.06-2.10 (m, 2H), 1.88-1.91 (m, 2H).

LC-MS m/z (ESI)=465.20 [M+1].

Example 26

4-((9-(4,4-Dimethoxyadamantan-1-yl)-7-methyl-8-oxo-8,9-dihydro-7H-purin-2-yl)amino)-2-fluoro-5-methylbenzamide (Compound 26)

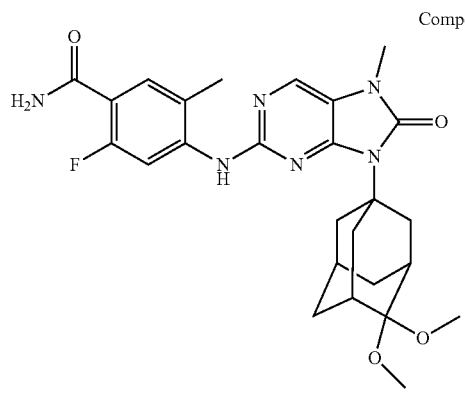

Compound 26

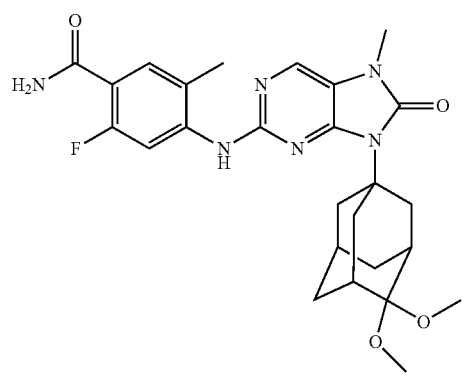

Compound 26

Compound 25 (80 mg, 0.17 mmol) was dissolved in 3 mL of methanol and 5 mL of acetonitrile, and 0.5 mL of 2 M hydrochloric acid was added. The reaction mixture was let stand at room temperature for 30 min, with the reaction monitored by TLC until its completion. The reaction mixture was concentrated, and the residue was purified by Pre-HPLC to give compound 26 (white solid, 19.5 mg, 9.6% yield).

$^1$H NMR (400 MHz DMSO) δ 8.38 (s, 1H), 8.17 (s, 1H), 7.87 (d, 1H), 7.55 (d, 1H), 7.40 (d, 2H), 3.27 (s, 3H), 3.08 (s, 3H), 3.07 (s, 3H), 2.65-2.69 (m, 2H), 2.43-2.44 (m, 2H), 2.29-2.34 (m, 3H), 2.24 (s, 2H), 2.04-2.07 (m, 1H), 1.77-1.80 (m, 2H), 1.59-1.62 (m, 2H).

LC-MS m/z (ESI)=465.20 [M+1].

Example 27

2-Fluoro-4-((9-(5-hydroxyadamantan-2-yl)-7-methyl-8-oxo-8,9-dihydro-7H-purin-2-yl)amino)-5-methylbenzamide (Compound 27)

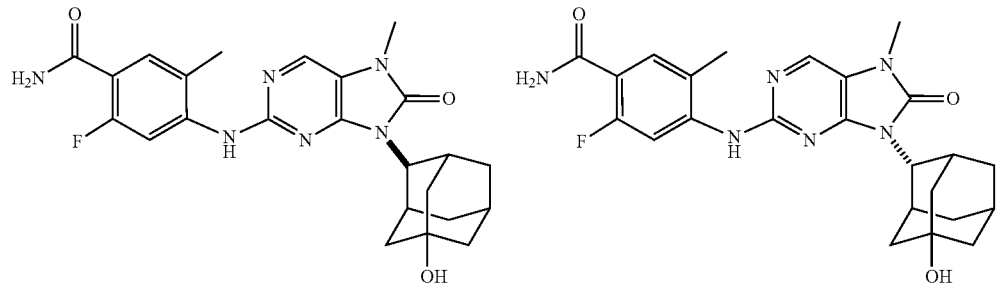

Compound 27-1 and Compound 27-2

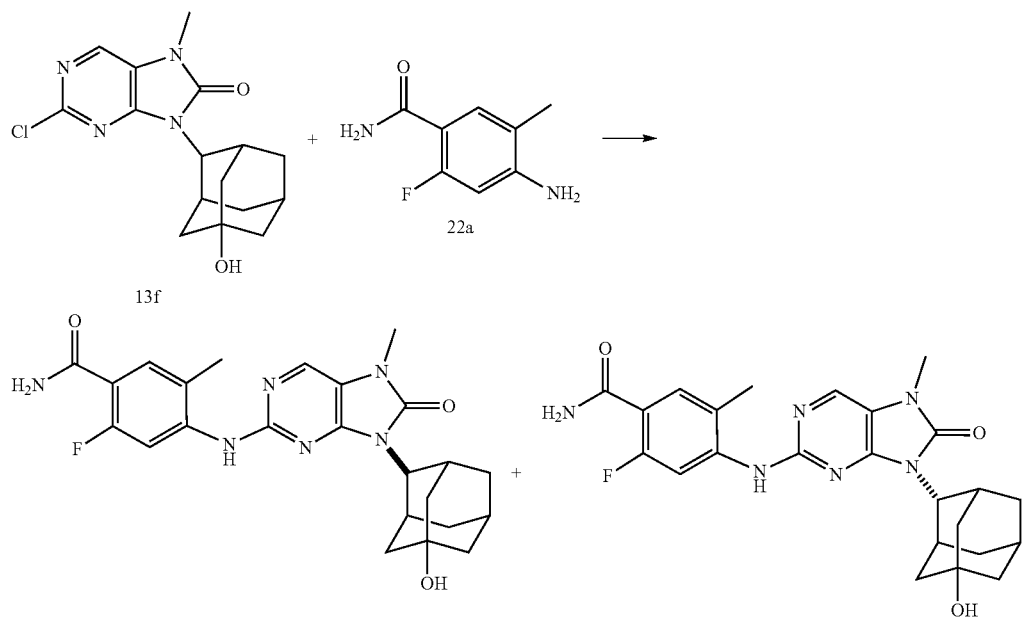

化合物27-1和化合物27-2

Compound 13f (200 mg, 0.59 mmol), compound 22a (201 mg, 1.19 mmol), cesium carbonate (577 mg, 1.77 mmol) and methanesulfonato(2-dicyclohexylphosphino-3,6-dimethoxy-2',4',6'-tri-i-propyl-1,1'-biphenyl)(2'-amino-1,1'-biphenyl-2-yl)palladium(II) (55 mg, 0.059 mmol) were dissolved in dioxane (4 mL), followed by nitrogen purging. The reaction mixture was stirred at 100° C. for 4 h, with the reaction monitored by TLC until its completion. The reaction mixture was concentrated, and the residue was purified by silica gel column chromatography (dichloromethane/methanol (v/v)=60/1) followed by Pre-HPLC to give compound 27 (i.e., compound 27-1 and compound 27-2) as two white solids: compound 27-1 (10 mg, 10.2% yield, RT=4.18, dr %: 99.22%), and compound 27-2 (13 mg, 11.3% yield, RT=5.25, dr %: 99.34%). Pre-HPLC (OZ), mobile phase: $CO_2$/(50% isopropanol/acetonitrile solution with 0.3% ethylenediamine added)=60/40; column temperature: 35° C.; column pressure: 80 bar; flow rate: 1 mL/min; detector signal channel: 215 nm@4.8 nm; diode array detector at a wavelength of 200-400 nm.

Compound 27-1:

$^1$H NMR (400 MHz DMSO) δ 8.39 (s, 1H), 8.19 (s, 1H), 7.87 (d, 2H), 7.54 (d, 2H), 7.40 (d, 2H), 4.35 (s, 1H), 4.17-4.19 (m, 1H), 3.31 (s, 3H), 3.22-3.23 (m, 2H), 2.28 (s, 3H), 2.04-2.10 (m, 3H), 1.69-1.80 (m, 4H), 1.61-1.62 (m, 2H), 1.15-1.52 (m, 2H).

LC-MS m/z (ESI)=467.20 [M+1].

Compound 27-2:

$^1$H NMR (400 MHz DMSO) δ 8.40 (s, 1H), 8.18 (s, 1H), 7.80 (d, 2H), 7.53 (d, 2H), 7.41 (d, 2H), 4.49 (s, 1H), 4.26-4.28 (m, 1H), 3.30 (s, 3H), 3.09-3.10 (m, 2H), 2.28 (s, 3H), 2.01-2.11 (m, 3H), 1.80-1.83 (m, 2H), 1.65-1.73 (m, 4H), 1.39-1.49 (m, 2H).

LC-MS m/z (ESI)=467.20 [M+1].

Example 28
4-(7-Methyl-2-((7-methyl-[1,2,4]triazolo[1,5-a]pyridin-6-yl)amino)-8-oxo-7,8-dihydro-9H-purin-9-yl)adamantane-1-carbonitrile (Compound 28)
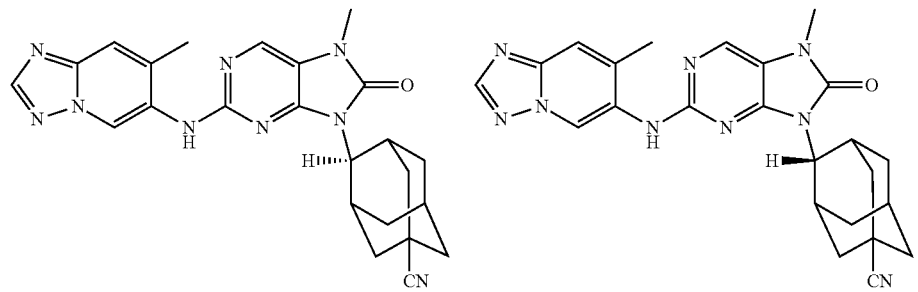
Compound 28-1 and Compound 28-2
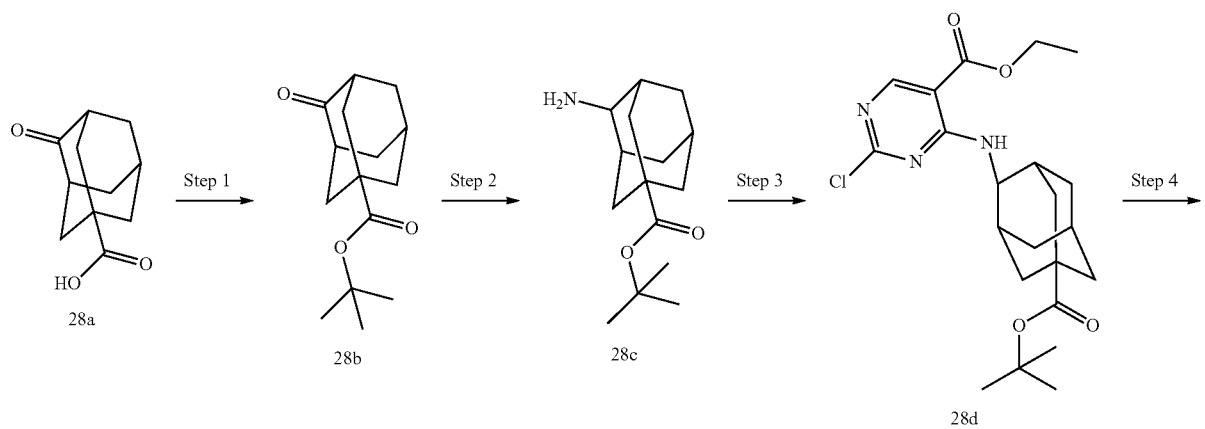
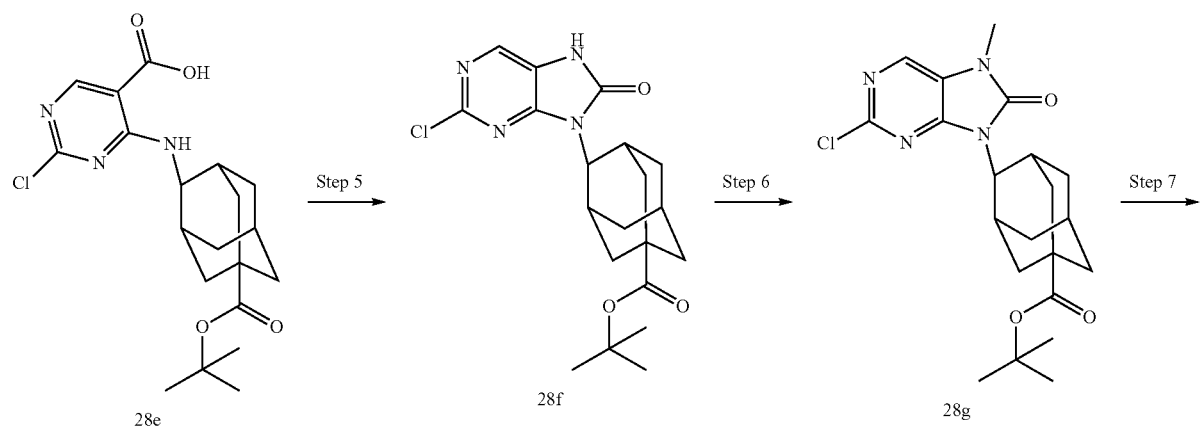

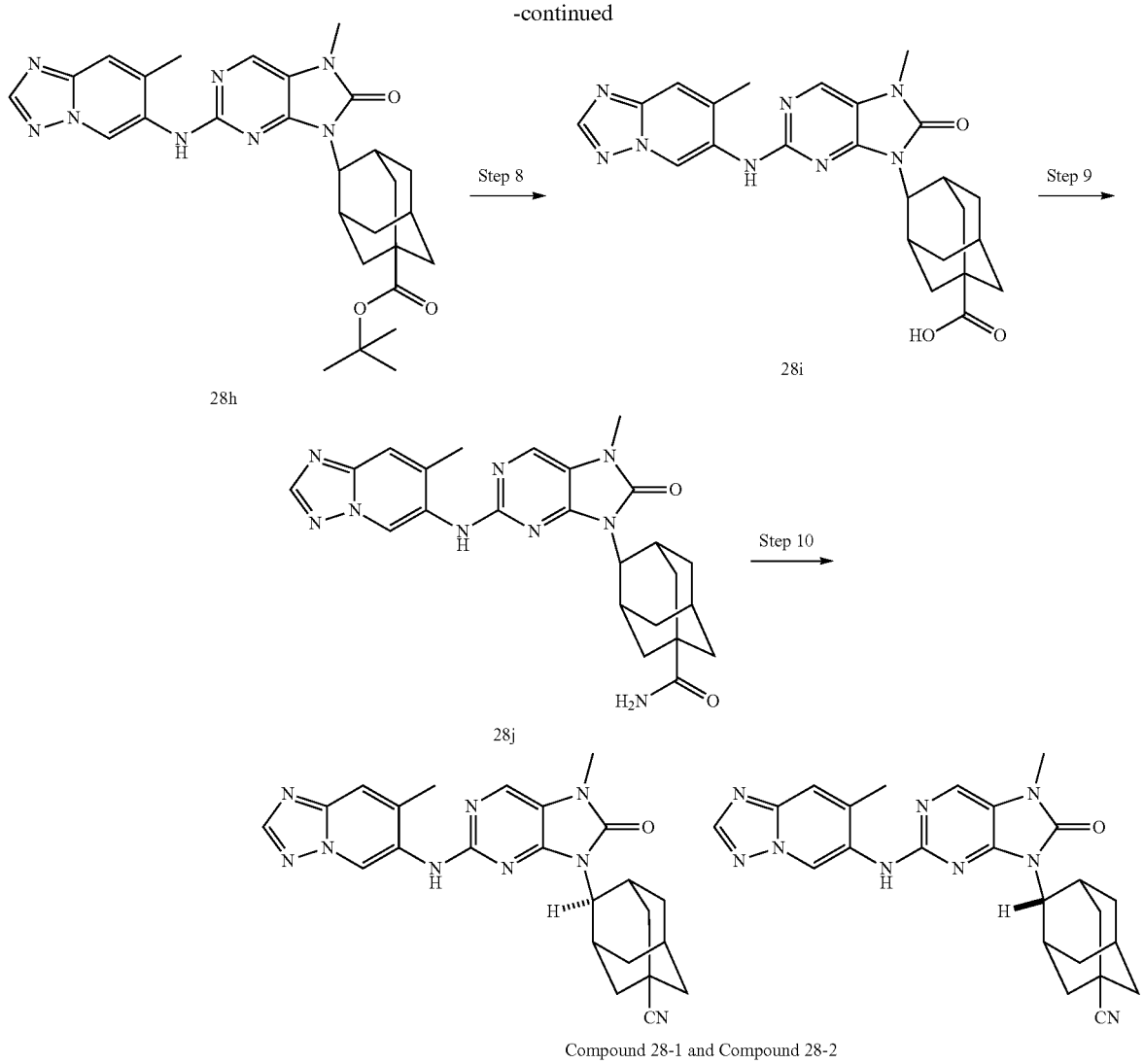

Compound 28-1 and Compound 28-2

Step 1:

tert-Butyl-4-oxoadamantane-1-carboxylate (28b)

Compound 28a (10 g, 51.49 mmol) was dissolved in dichloromethane (100 mL), and oxalyl chloride (7.84 g, 61.79 mmol) and N,N-dimethylformamide (0.38 g, 5.15 mmol) were added under an ice bath. The reaction mixture was allowed to react at room temperature for 1 h and concentrated, and the solid was collected. tert-Butanol (100 mL) was added under an ice bath, and the reaction mixture was allowed to react for another 12 h. The reaction was monitored by TLC until its completion. The reaction mixture was concentrated to dryness, and the residue was purified by column chromatography (petroleum ether:ethyl acetate=1:1) to give the target compound 28b (white solid, 8.4 g, 65.17% yield).

1H NMR (400 MHz, CDCl3) δ 2.57 (s, 2H), 1.96-2.19 (m, 11H), 1.43 (s, 9H).

Step 2:

tert-Butyl-4-aminoadamantane-1-carboxylate (28c)

Compound 28b (8 g, 31.96 mmol) was dissolved in a solution of ammonia in methanol (100 mL, 7 M). The reaction mixture was allowed to react at room temperature for 12 h. Sodium borohydride (3.63 g, 95.88 mmol) was then added under an ice bath, and the reaction mixture was allowed to react for 1 h with the temperature maintained. 50 mL of sodium bicarbonate (1 M) was added to the reaction mixture, which was then allowed to react for another hour and concentrated. The resulting solid was dissolved in 100 mL of ethyl acetate, and the solution was washed successively with 50 mL of water and 50 mL of saturated brine, dried, and concentrated to give 28c (white solid, 8 g, 99.58% yield).

1H NMR (400 MHz, CDCl3) δ 2.90-2.94 (m, 1H), 1.54-2.03 (m, 12H), 1.38 (s, 9H).

LC-MS m/z (ESI)=m/z=252.10 [M+1].

Step 3:

Ethyl 4-((5-(tert-butoxycarbonyl)adamantan-2-yl)amino)-2-chloropyrimidine-5-carboxylate (28d)

Compound 1f (8.0 g, 31.83 mmol) and compound 28c (8.44 g, 38.20 mmol) were dissolved in acetonitrile (80 mL), and potassium carbonate (20.74 g, 63.66 mmol) was added under an ice bath. The reaction mixture was allowed to react at room temperature for 12 h. The reaction was monitored by TLC until its completion. Water (50 mL) was added to the reaction mixture, followed by extraction with ethyl acetate (60 mL×3). The organic phases were combined, dried, and concentrated to give a crude product. The crude product was purified by column chromatography (petroleum ether:ethyl acetate=4:1) to give the target compound 28d (white solid, 9.3 g, 33.92% yield).

1H NMR (400 MHz, DMSO-d6) δ 8.83 (d, 0.5H), 8.78 (d, 0.5H), 8.65 (s, 0.5H), 8.64 (s, 0.5H), 4.30-4.36 (m, 2H), 4.15-4.17 (m, 1H), 2.06-2.07 (m, 2H), 1.97 (s, 1H), 1.85-1.90 (m, 3H), 1.69-1.78 (m, 7H), 1.54-1.60 (m, 1H), 1.39 (s, 9H), 1.29-1.39 (m, 3H).

LC-MS m/z (ESI)=m/z=436.20 [M+1].

Step 4:

4-((5-(tert-Butoxycarbonyl)adamantan-2-yl)amino)-2-chloropyrimidine-5-carboxylic acid (28e)

Compound 28d (9.3 g, 21.33 mmol) was dissolved in 40 mL of tetrahydrofuran and 40 mL of water, and lithium hydroxide (1.02 g, 42.66 mmol) was added. The reaction mixture was stirred at room temperature for 1 h. The reaction was monitored by TLC until its completion. The reaction mixture was concentrated to remove tetrahydrofuran and adjusted to pH 5 with 6 N hydrochloric acid, and a solid precipitated. The reaction mixture was filtered, and the filter cake was washed twice with petroleum ether and collected to give the title compound 28e (white solid, 7.8 g, 89.65% yield), which was directly used in the next step.

1H NMR (400 MHz, DMSO-d6) δ 9.18-9.23 (m, 1H), 8.58 (s, 1H), 2.05 (s, 2H), 1.67-1.97 (m, 9H), 1.56-1.59 (m, 1H), 1.38-1.39 (d, 9H).

LC-MS m/z (ESI)=m/z=408.2 [M+1].

Step 5:

tert-Butyl 4-(2-chloro-8-oxo-7,8-dihydro-9H-purin-9-yl)adamantane-1-carboxylate (28f)

Compound 28e (7.8 g, 119.12 mmol) was dissolved in N,N-dimethylacetamide (100 mL), and diphenylphosphoryl azide (1.93 g, 19.12 mmol) and triethylamine (7.37 g, 19.12 mmol) were added under an ice bath. The reaction mixture was stirred at room temperature for 2 h, then warmed to 90° C., and allowed to react for another 3 h. The reaction was monitored by TLC until its completion. The reaction mixture was allowed to naturally cool to room temperature, diluted with 40 mL of water, and then extracted with ethyl acetate (50 mL×3). The organic phases were combined, dried, and concentrated to give compound 28f (grey solid, 7.8 g, 6.45% yield).

1H NMR (400 MHz, DMSO-d6) δ 11.61-11.62 (d, 1H), 8.11 (s, 1H), 4.3 (s, 1H), 2.95 (s, 2H), 1.54-2.33 (m, 11H), 1.36-1.40 (m, 9H).

LC-MS m/z (ESI)=405.20 [M+1]

Step 6:

tert-Butyl 4-(2-chloro-7-methyl-8-oxo-7,8-dihydro-9H-purin-9-yl)adamantane-1-carboxylate (28g)

Compound 28f (4.8 g, 11.86 mmol) was dissolved in dimethylformamide (40 mL), and cesium carbonate (7.73 g, 23.72 mmol) and dimethyl sulfate (1.12 mL, 11.86 mmol) were added at 0° C. The reaction mixture was allowed to react at room temperature for 2 h. 20 mL of water was then added, and a solid precipitated. The solid was collected by filtration and dried to give the target compound 28g (pale yellow solid, 2.0 g, 40.25% yield).

LC-MS m/z (ESI)=m/z=419.20 [M+1].

1H NMR (400 MHz, DMSO-d6) δ 8.34 (s, 1H), 4.32 (s, 1H), 3.33 (d, 3H), 2.94-2.96 (m, 2H), 2.28 (d, 1H), 2.17 (d, 1H), 1.91 (s, 3H), 1.79-1.84 (m, 4H), 1.69 (d, 1H), 1.54 (d, 1H), 1.35-1.40 (m, 9H).

Step 7:

tert-Butyl-4-(7-methyl-2-((7-methyl-[1,2,4]triazolo [1,5-a]pyridin-6-yl)amino)-8-oxo-7,8-dihydro-9H-purin-9-yl)adamantane-1-carboxylate (28h)

Compound 1e (300 mg, 2.02 mmol), compound 28g (850 mg, 2.02 mmol), cesium carbonate (1.3 g, 4.04 mmol) and methanesulfonato(2-dicyclohexylphosphino-3,6-dimethoxy-2',4',6'-tri-i-propyl-1,1'-biphenyl)(2'-amino-1,1'-biphenyl-2-yl)palladium(II) (183.12 mg, 0.2 mmol) were dissolved in dioxane (10 mL), followed by nitrogen purging. The reaction mixture was stirred at 100° C. for 4 h. The reaction was monitored by TLC until its completion. The reaction mixture was poured into ice water, and the solid was collected and purified by silica gel column chromatography (dichloromethane/methanol (v/v)=100/1) to give compound 28h (white solid, 500 mg, 13.96% yield).

1H NMR (400 MHz, DMSO-d6) δ 9.03 (s, 0.5H), 9.02 (s, 0.5H), 8.57 (d, 1H), 8.36 (d, 1H), 8.11 (d, 1H), 7.69 (s, 0.5H), 7.68 (s, 0.5H), 4.26 (s, 0.5H), 4.21 (s, 0.5H), 3.28-3.34 (m, 3H), 2.99 (s, 1H), 2.86 (s, 1H), 2.36 (d, 3H), 2.13 (d, 2H), 1.71-1.94 (m, 8H), 1.52 (s, 0.5H), 1.49 (s, 0.5H), 1.38 (s, 4.5H), 1.28 (s, 4.5H).

LC-MS m/z (ESI)=531.3 [M+1].

Step 8:

4-(7-Methyl-2-((7-methyl-[1,2,4]triazolo[1,5-a]pyridin-6-yl)amino)-8-oxo-7,8-dihydro-9H-purin-9-yl) adamantane-1-carboxylic acid (28i)

Compound 28h (0.5 g, 0.94 mmol) was dissolved in 4 N dioxane hydrochloride solution (50 mL). The mixture was allowed to react at room temperature for 16 h and concentrated to give crude compound 28i (pale yellow solid, 0.45 g, 99% yield).

LC-MS m/z (ESI)=475.20 [M+1].

Step 9:

4-(7-Methyl-2-((7-methyl-[1,2,4]triazolo[1,5-a]pyridin-6-yl)amino)-8-oxo-7,8-dihydro-9H-purin-9-yl) adamantane-1-carboxamide (28j)

Compound 28i (400 mg, 0.84 mmol), triethylamine (212.50 mg, 2.1 mmol) and ammonium chloride (224.66 mg, 4.2 mmol) were dissolved in N,N-dimethylformamide (10 mL), and 2-(7-azabenzotriazole)-N,N,N'N'-tetramethyluronium hexafluorophosphate (239.54 mg, 0.63 mmol) was added at 0° C. The reaction mixture was allowed to react for 1 h. Water (20 mL) was added, and the mixture was extracted with ethyl acetate (40 mL×3). The organic phases were combined, dried, and concentrated to give a crude product. The crude product was purified by preparative medium pressure liquid chromatography to give compound 28j (white solid, 100 mg, 25.14% yield).

1H NMR (400 MHz, Chloroform-d) δ 9.64 (s, 1H), 8.24 (s, 1H), 7.89 (s, 1H), 7.58 (s, 2H), 4.53 (s, 1H), 3.41 (s, 3H), 3.02 (s, 2H), 2.51 (s, 3H), 2.35 (d, J=13.7 Hz, 2H), 2.22 (s, 2H), 2.10 (d, J=12.8 Hz, 2H), 1.97 (s, 3H), 1.64 (s, 2H).

LC-MS m/z (ESI)=474.20 [M+1].

Step 10:

4-(7-Methyl-2-((7-methyl-[1,2,4]triazolo[1,5-a]pyridin-6-yl)amino)-8-oxo-7,8-dihydro-9H-purin-9-yl)adamantane-1-carbonitrile (Compound 28-1 and Compound 28-2)

Compound 28j (150 mg, 0.32 mmol) was dissolved in dichloromethane (20 mL), and pyridine (100.23 mg, 1.27 mmol) and trifluoroacetic anhydride (199.59 mg, 0.95 mmol) were added under an ice bath. The reaction mixture was allowed to react for another hour with the temperature maintained. Methanol (20 mL) was added, and the crude product was concentrated. The crude product was re-dissolved in ethyl acetate (50 mL), and the resulting solution was washed successively with 15% NaHCO$_3$ (50 mL) and saturated brine (50 mL), dried, and concentrated to give compound 28, which was subjected to Pre-HPLC separation to give two white solids (i.e. compound 28-1 and compound 28-2): compound 28-1(50 mg, 34.30%, RT=2.637 min, dr %: 99.32%), and compound 28-2(70 mg, 48.02%, RT=3.129 min, dr %: 99.43%). Pre-HPLC (OZ), mobile phase: acetonitrile/methanol=1/1; column temperature: 35° C.; column pressure: 100 bar; flow rate: 13.5 mL/min; detector signal channel: 215 nm@4.8 nm; diode array detector at a wavelength of 200-400 nm.

LC-MS m/z (ESI)=456.2 [M+1].

Compound 28-1:

1H NMR (401 MHz, DMSO-d6) δ 9.06 (s, 1H), 8.59 (s, 1H), 8.37 (s, 1H), 8.12 (s, 1H), 7.69 (s, 1H), 4.27 (s, 1H), 3.29 (s, 3H), 2.92 (s, 2H), 2.37 (s, 3H), 1.71-2.08 (m, 8H).

Compound 28-2:

1H NMR (400 MHz, Chloroform-d) δ 9.48 (s, 1H), 8.28 (s, 1H), 7.90 (s, 1H), 7.58 (s, 1H), 6.76 (s, 1H), 4.42 (s, 1H), 3.40 (s, 3H), 3.14 (s, 2H), 2.24-2.33 (m, 6H), 2.1 (s, 2H), 2.01-2.03 (m, 1H), 1.67 (d, 2H).

Example 29

9-(3-Hydroxyadamantan-1-yl)-2-((6-methoxy-4-methylpyridin-3-yl)amino)-7-methyl-7,9-dihydro-8H-purin-8-one (Compound 29)

Compound 29

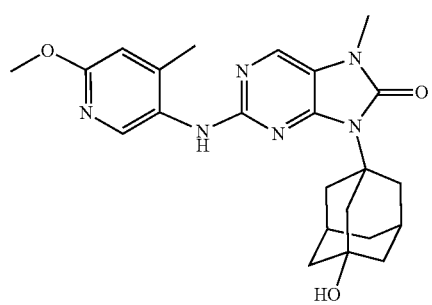

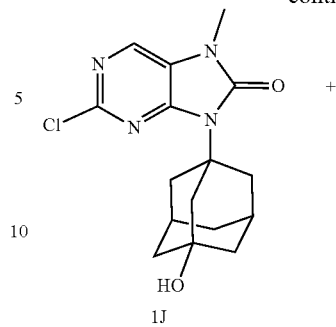

1J

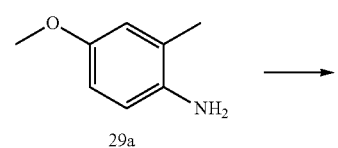

29a

Compound 29

Compound 1j (170 mg, 0.78 mmol), compound 29a (130 mg, 0.94 mmol), cesium carbonate (510 mg, 1.57 mmol) and methanesulfonato(2-dicyclohexylphosphino-3,6-dimethoxy-2',4',6'-tri-i-propyl-1,1'-biphenyl)(2'-amino-1,1'-biphenyl-2-yl)palladium(II) (70 mg, 0.078 mmol) were dissolved in 1,4-dioxane (5 mL), followed by nitrogen purging. The reaction mixture was stirred at 110° C. for 4 h, with the reaction monitored by TLC until its completion. The reaction mixture was concentrated, and the residue was purified by silica gel column chromatography (dichloromethane/methanol (v/v)=20/1) to give compound 29 (white solid, 158 mg, 46.16% yield).

1H NMR (400 MHz, DMSO-d6) δ 8.35 (s, 1H), 8.05 (s, 1H), 7.95 (s, 1H), 6.69 (s, 1H), 4.56 (s, 1H), 3.80 (s, 3H), 3.20 (s, 3H), 2.37-2.27 (m, 6H), 2.15 (s, 3H), 1.60-1.41 (m, 6H).

LC-MS m/z (ESI)=437.2 [M+1].

Example 30

7-Methyl-2-((6-methyl-2,3-dihydrobenzofuran-5-yl)amino)-9-(4-oxoadamantan-1-yl)-7,9-dihydro-8H-purin-8-one (Compound 30)

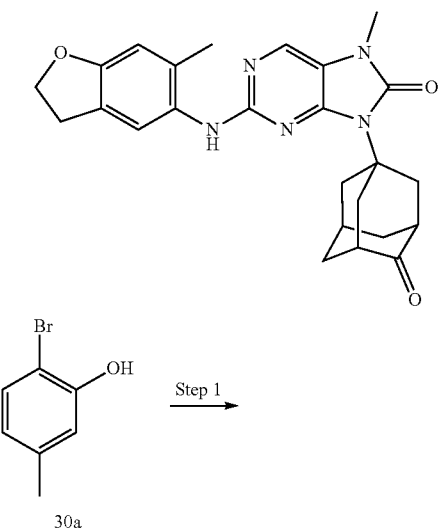

Compound 30

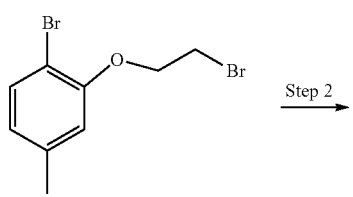

30b

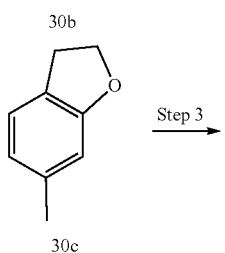

30c

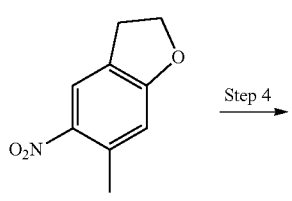

30d

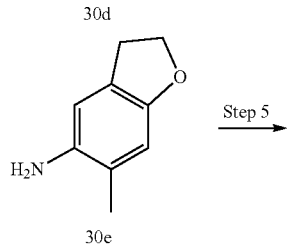

30e

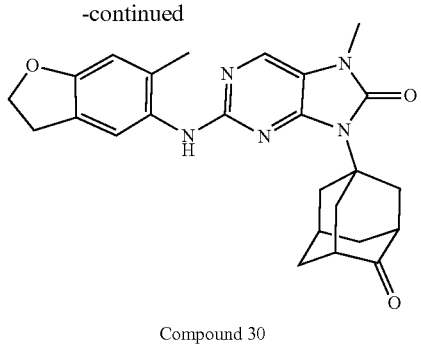

Compound 30

Step 1:

1-Bromo-2-(2-bromoethoxy)-4-methylbenzene (30b)

1,2-Dibromoethane was well mixed with acetonitrile (100 mL), and then 2-bromo-5-methylphenol 30a (25 g, 133.67 mmol) was added, followed by addition of potassium carbonate (55.42 g, 401.01 mmol). The reaction mixture was allowed to react at 80° C. for 5 h. After the reaction was completed, the reaction mixture was filtered, and the filtrate was concentrated. The residue was purified by silica gel column chromatography (pure petroleum ether) to give compound 30b (colorless liquid, 34 g, 86.51% yield).

Step 2:

6-Methyl-2,3-dihydrobenzofuran (30c)

Compound 30b (34 g, 115.65 mmol) was added to a dry reaction flask and dissolved in dry tetrahydrofuran (160 mL), and n-butyllithium (55 mL, 138.78 mmol) was added dropwise at −78° C. After the dropwise addition was completed, the reaction mixture was allowed to react for another 1.5 h. After the reaction was completed, the reaction mixture was quenched by addition of water (20 mL), concentrated under reduced pressure to remove the organic solvent, and extracted twice with ethyl acetate. The organic phases were combined, dried, and concentrated, and the residue was purified by silica gel column chromatography (pure petroleum ether) to give compound 30c (colorless liquid, 10 g, 64.43% yield).

Step 3:

6-Methyl-5-nitro-2,3-dihydrobenzofuran (30d)

Compound 30c (10 g, 74.53 mmol) was dissolved in acetic acid (50 mL), and nitric acid (11.8 mL, 178.87 mmol, 68% purity) was added dropwise at room temperature. After the addition was completed, the reaction mixture was allowed to react for another 10 min. The reaction was monitored by TLC until its completion. The reaction mixture was poured into ice water, followed by three extractions with ethyl acetate. The organic phase was dried and concentrated, and the residue was purified by silica gel column chromatography (petroleum ether/ethyl acetate=15/1) to give compound 30d (yellow solid, 7.0 g, 52.43% yield).

Step 4:

6-Methyl-2,3-dihydrobenzofuran-5-amine (30e)

Compound 30d (7.0 g, 39.07 mmol) was well mixed with 110 mL of ethanol/water (10/1), and iron powder (10.9 g, 195.33 mmol) was added, followed by addition of diluted hydrochloric acid (9.8 mL, 2 mol/L). The reaction mixture was allowed to react at 85° C. for 2 h. The reaction mixture was filtered to remove iron powder. The filtrate was concentrated, and then the pH was adjusted with saturated sodium bicarbonate solution until it is slightly basic, followed by three extractions with ethyl acetate. The organic phases were combined, dried, and concentrated, and the residue was purified by silica gel column chromatography (petroleum ether/ethyl acetate=5/1) to give compound 30e (brown solid, 4.5 g, 77.05% yield).

$^1$H NMR (400 MHz DMSO) δ 6.52 (s, 1H), 6.38 (s, 1H), 4.36-4.31 (t, 2H), 4.25 (s, 2H), 3.02-2.98 (t, 2H), 1.98 (s, 3H).

LC-MS m/z (ESI)=150.10 [M+1].

Step 5:

7-Methyl-2-((6-methyl-2,3-dihydrobenzofuran-5-yl)amino)-9-(4-oxoadamantan-1-yl)-7,9-dihydro-8H-purin-8-one (Compound 30)

Compound 1j (200 mg, 0.60 mmol), compound 30e (178 mg, 1.2 mmol), cesium carbonate (579 mg, 1.8 mmol) and Brettphos G3 Pd (54 mg, 0.06 mmol) were added to a dry reaction flask, followed by addition of 1,4-dioxane (20 mL). The system was purged with nitrogen three times, and the reaction mixture was allowed to react at 110° C. for 2.5 h. The reaction mixture was concentrated, and the residue was purified by silica gel column chromatography (DCM:MeOH=20:1) to give compound 30 (white solid, 40 mg, 14.97% yield).

$^1$H NMR (400 MHz, DMSO-$d_6$) δ 8.07 (s, 1H), 7.96 (s, 1H), 7.26 (s, 1H), 6.60 (s, 1H), 4.59 (s, 1H), 4.47 (t, 2H), 3.21 (s, 3H), 3.12 (t, 2H), 2.38-2.32 (m, 4H), 2.17 (s, 2H), 2.13 (s, 3H), 1.62-1.51 (m, 4H), 1.50-1.40 (m, 2H).

LC-MS m/z (ESI)=446.20 [M+1].

Example 31

9-(4,4-Dimethoxyadamantan-1-yl)-7-methyl-2-((6-methyl-2,3-dihydrobenzofuran-5-yl)amino)-7,9-dihydro-8H-purin-8-one (Compound 31)

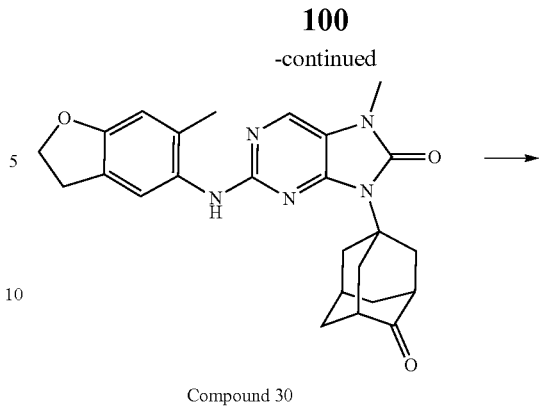

Compound 30

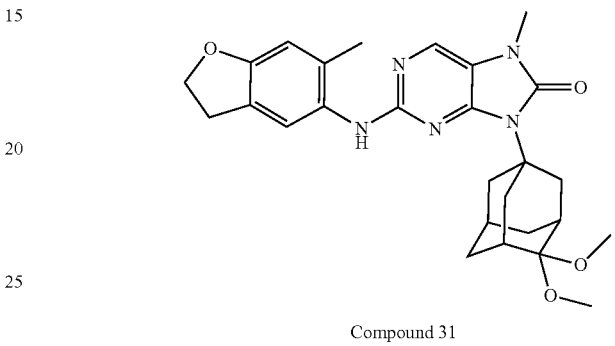

Compound 31

Compound 30 (100 mg, 0.22 mmol) was dissolved in 3 mL of methanol and 5 mL of acetonitrile, and 0.5 mL of 2 M hydrochloric acid was added. The reaction mixture was let stand at room temperature for 30 min, with the reaction monitored by TLC until its completion. The reaction mixture was concentrated, and the residue was purified by Pre-HPLC to give compound 31 (white solid, 22.0 mg, 20.4% yield).

$^1$H NMR (400 MHz, DMSO-$d_6$) δ 8.07 (s, 1H), 7.96 (s, 1H), 7.26 (s, 1H), 6.60 (s, 1H), 4.59 (s, 1H), 4.47 (t, 2H), 3.21 (s, 3H), 3.08 (s, 3H), 3.07 (s, 3H), 3.12 (t, 2H), 2.38-2.32 (m, 4H), 2.17 (s, 2H), 2.13 (s, 3H), 1.62-1.51 (m, 4H), 1.50-1.40 (m, 2H).

LC-MS m/z (ESI)=492.24 [M+1].

Example 32

9-(3-Hydroxyadamantan-1-yl)-7-methyl-2-((6-methyl-2,3-dihydrobenzofuran-5-yl)amino)-7,9-dihydro-8H-purin-8-one (Compound 32)

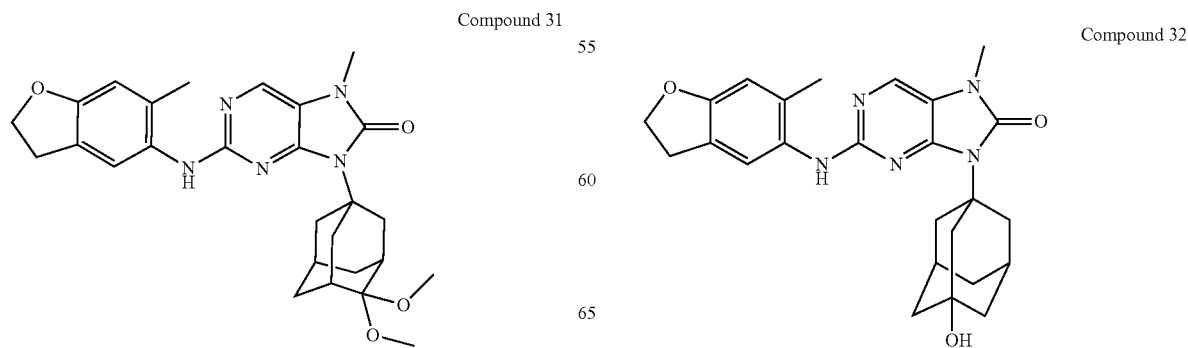

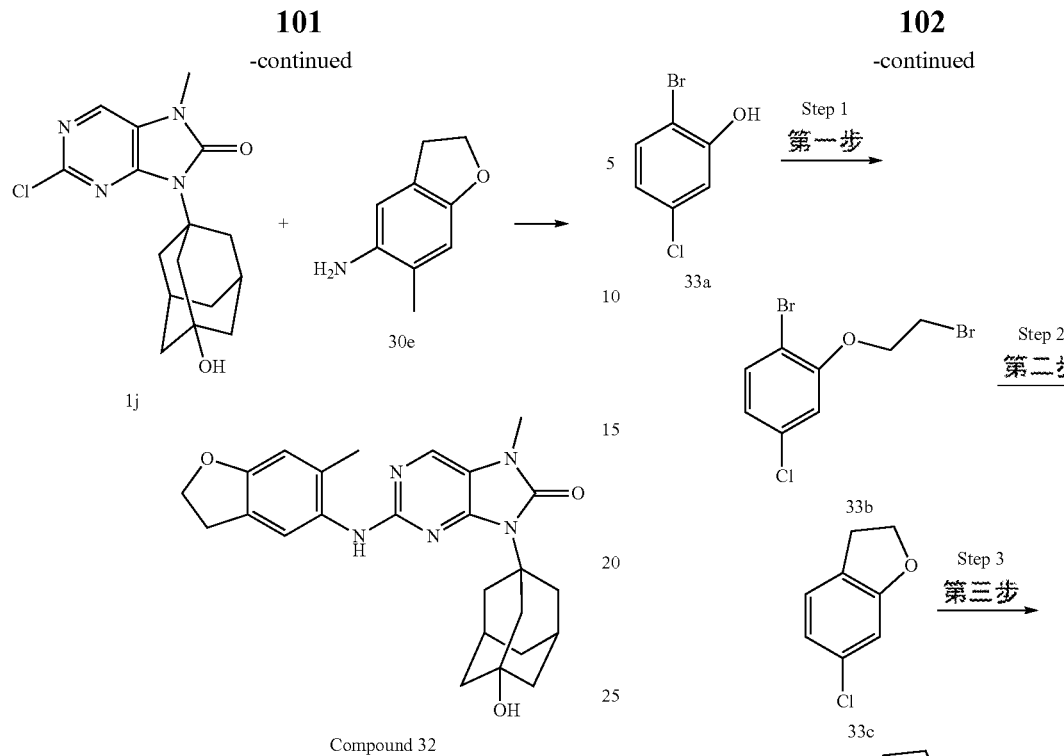

Compound 1j (200 mg, 0.60 mmol), compound 30e (178 mg, 1.2 mmol), cesium carbonate (579 mg, 1.8 mmol) and Brettphos G3 Pd (54 mg, 0.06 mmol) were added to a dry reaction flask, followed by addition of 1,4-dioxane (20 mL). The system was purged with nitrogen three times, and the reaction mixture was allowed to react at 110° C. for 2.5 h. The reaction mixture was concentrated, and the residue was purified by silica gel column chromatography (DCM MeOH=20:1) to give compound 32 (white solid, 40 mg, 14.97% yield).

$^1$H NMR (400 MHz, DMSO-d$_6$) δ 8.07 (s, 1H), 7.96 (s, 1H), 7.26 (s, 1H), 6.60 (s, 1H), 4.59 (s, 1H), 4.47 (t, 2H), 3.21 (s, 3H), 3.12 (t, 2H), 2.38-2.32 (m, 6H), 2.17 (s, 2H), 2.13 (s, 3H), 1.62-1.51 (m, 4H), 1.50-1.40 (m, 2H).

LC-MS m/z (ESI)=448.20 [M+1].

Example 33

2-((6-Chloro-2,3-dihydrobenzofuran-5-yl)amino)-9-(3-hydroxyadamantan-1-yl)-7-methyl-7,9-dihydro-8H-purin-8-one (Compound 33)

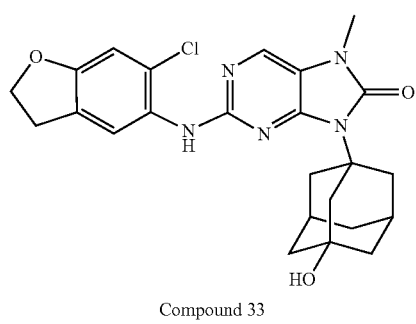

Compound 33

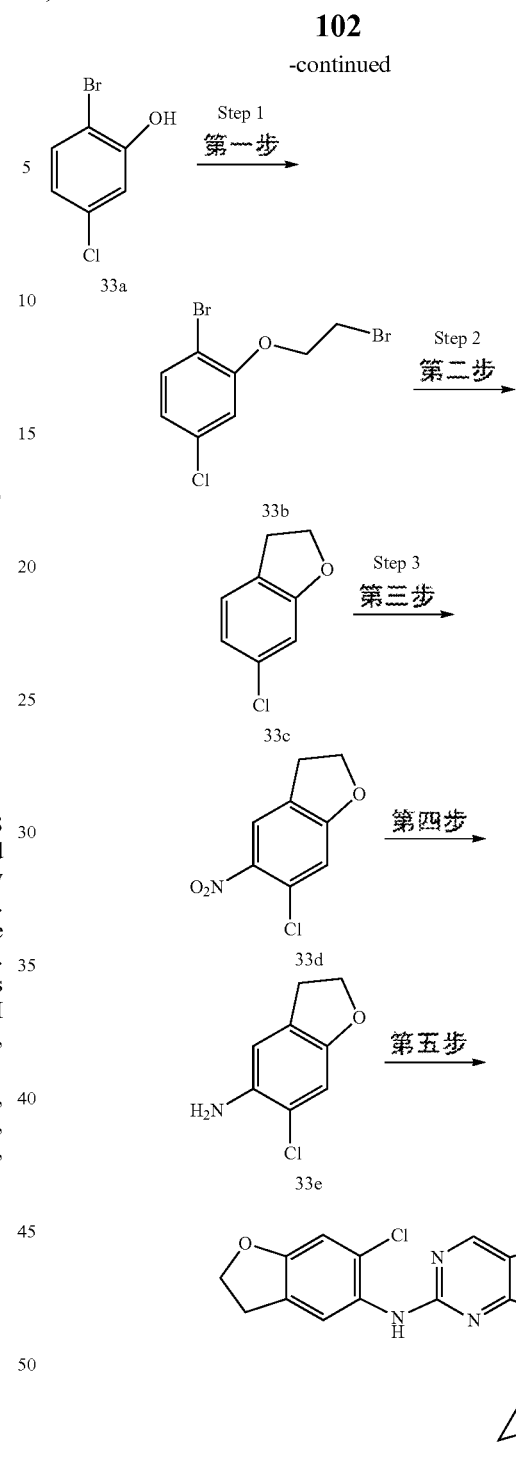

Step 1:

1-Bromo-2-(2-bromoethoxy)-4-chlorobenzene (3b)

1,2-Dibromoethane (109.2 g, 581.28 mmol) was well mixed with acetonitrile (120 mL), and then compound 33a (30 g, 144.61 mmol) was added, followed by addition of potassium carbonate (60 g, 434.12 mmol). The reaction mixture was allowed to react at 80° C. for 5 h. After the reaction was completed, the reaction mixture was filtered, and the filtrate was concentrated. The residue was purified by silica gel column chromatography (petroleum ether/ethyl acetate=200/1) to give compound 33b (white solid, 31 g, 68.19% yield).

Step 2:

6-Chloro-2,3-dihydrobenzofuran (33c)

Compound 33b (31 g, 98.60 mmol) was added to a dry reaction flask and dissolved in dry tetrahydrofuran (160 mL), and n-butyllithium (45.5 mL, 118.32 mmol) was added dropwise at −78° C. After the dropwise addition was completed, the reaction mixture was allowed to react for another 1.5 h. After the reaction was completed, the reaction mixture was quenched by addition of water (20 mL), concentrated under reduced pressure to remove the organic solvent, and extracted twice with ethyl acetate. The organic phases were combined, dried, and concentrated, and the residue was purified by silica gel column chromatography (pure petroleum ether) to give compound 33c (colorless liquid, 15 g, 98.42% yield).

1H NMR (400 MHz CDCl3) δ 6.98-6.96 (dt, 1H), 6.72-6.69 (dd, 1H), 6.67 (d, 1H), 4.50-4.46 (t, 2H), 3.08-3.03 (t, 2H).

Step 3:

6-Chloro-5-nitro-2,3-dihydrobenzofuran (33d)

Compound 33c (15 g, 97.03 mmol) was dissolved in acetic acid (110 mL), and nitric acid (15.5 mL, 232.87 mmol, 68% purity) was added dropwise at 70° C. After the addition was completed, the reaction mixture was allowed to react for another 30 min. The reaction was monitored by TLC until its completion. The reaction mixture was poured into ice water, followed by three extractions with ethyl acetate. The organic phase was dried and concentrated, and the residue was purified by silica gel column chromatography (petroleum ether/ethyl acetate=20/1) to give compound 33d (yellow solid, 12.5 g, 64.55% yield).

LC-MS m/z (ESI)=200.00 [M+1].

Step 4:

6-Chloro-2,3-dihydrobenzofuran-5-amine (33e)

Compound 33d (12.5 g, 62.63 mmol) was well mixed with 110 mL of ethanol/water (10/1), and iron powder (17.8 g, 318.77 mmol) was added, followed by addition of diluted hydrochloric acid (16.5 mL, 2 mol/L). The reaction mixture was allowed to react at 85° C. for 2 h. The reaction mixture was filtered to remove iron powder. The filtrate was concentrated, and then the pH was adjusted with saturated sodium bicarbonate solution until it is slightly basic, followed by three extractions with ethyl acetate. The organic phases were combined, dried, and concentrated, and the residue was purified by silica gel column chromatography (petroleum ether/ethyl acetate=15/1) to give compound 33e (yellow solid, 7.0 g, 65.91% yield).

1H NMR (400 MHz DMSO) δ 6.72 (s, 1H), 6.64 (s, 1H), 4.73 (s, 2H), 4.43-4.39 (t, 2H), 3.07-3.02 (t, 2H).

LC-MS m/z (ESI)=170.00 [M+1].

Step 5:

Compound 1j (0.2 g, 1.18 mmol), compound 33e (0.197 g, 0.589 mmol), cesium carbonate (0.80 g, 0.088 mmol) and methanesulfonato(2-dicyclohexylphosphino-3,6-dimethoxy-2',4',6'-tri-i-propyl-1,1'-biphenyl)(2'-amino-1,1'-biphenyl-2-yl)palladium(II) (0.384 g, 1.18 mmol) were dissolved in 1,4-dioxane (5 mL), followed by nitrogen purging. The reaction mixture was stirred at 110° C. for 4 h, with the reaction monitored by TLC until it was substantially completed. The reaction mixture was concentrated, and the residue was purified by silica gel column chromatography (dichloromethane/methanol (v/v)=20/1) to give compound 33 (white solid, 83 mg, 30.08% yield).

1H NMR (400 MHz, DMSO-d6) δ 8.12 (s, 1H), 8.00 (s, 1H), 7.54 (s, 1H), 6.89 (s, 1H), 4.59 (s, 1H), 4.55 (t, 2H), 3.22 (s, 3H), 3.18 (t, 2H), 2.40-2.30 (m, 7H), 1.60-1.43 (m, 7H).

LC-MS m/z (ESI)=468.17 [M+1].

Example 34

4-((9-(3-Cyanoadamantan-1-yl)-7-methyl-8-oxo-8,9-dihydro-7H-purin-2-yl)amino)-2-fluoro-5-methyl-benzamide (Compound 34)

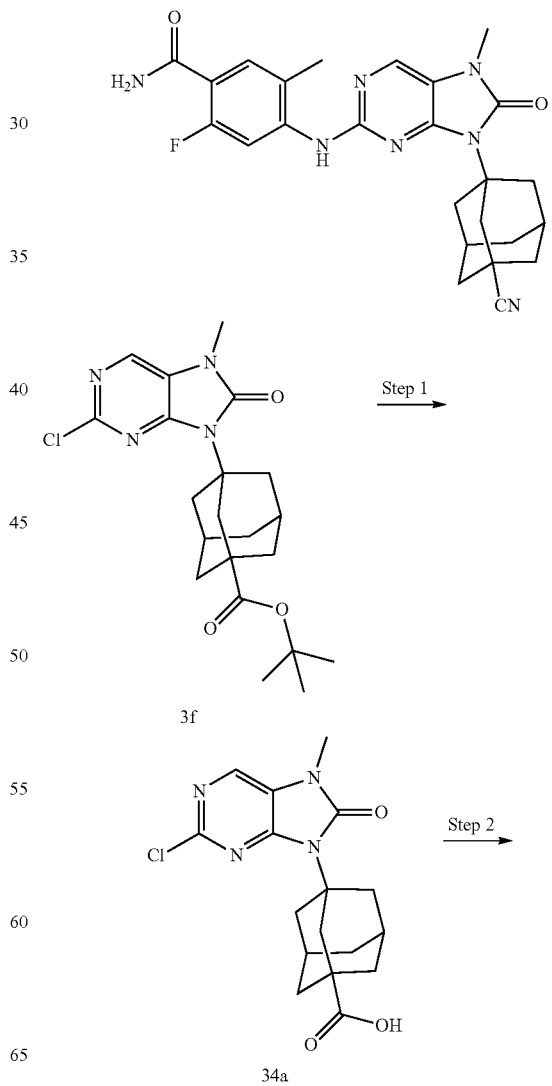

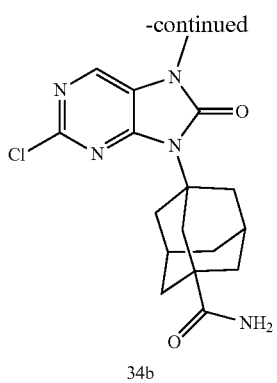

34b

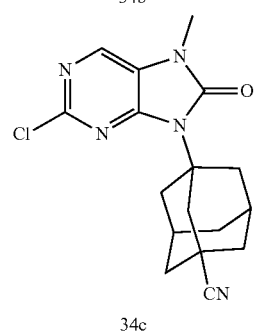

34c

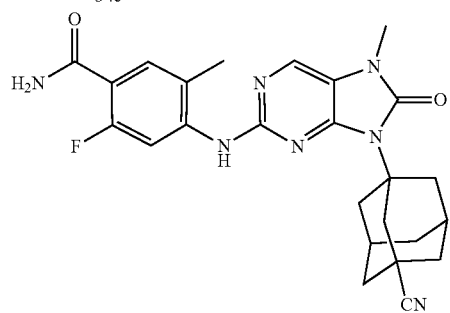

Compound 34

Step 1:

3-(2-Chloro-7-methyl-8-oxo-7,8-dihydro-9H-purin-9-yl)adamantane-1-carboxylic acid (34a)

Compound 3f (5.0 g, 11.9 mmol) was dissolved in 4 N dioxane hydrochloride solution (100 mL). The mixture was allowed to react at 60° C. for 6 h and concentrated, and the residue was purified by preparative medium pressure liquid chromatography to give compound 34a (pale yellow solid, 4.3 g, 99% yield).

LCMS m/z (ESI)=363.2 [M+1].

Step 2:

3-(2-Chloro-7-methyl-8-oxo-7,8-dihydro-9H-purin-9-yl)adamantane-1-carboxamide (34b)

Compound 34a (4.3 g, 11.9 mmol), ammonium chloride (6.37 g, 119.0 mmol) and triethylamine (6.0 g, 59.5 mmol) were dissolved in tetrahydrofuran (50 mL), and HATU (9.05 g, 23.8 mmol) was added under an ice bath. The mixture was allowed to react at room temperature for 2 h, quenched by addition of water (100 mL), and concentrated by rotary evaporation under reduced pressure to remove tetrahydrofuran, and a large amount of solid precipitated. The mixture was filtered, and the filtrate was concentrated to dryness by rotary evaporation to give compound 34b (off-white solid, 4.0 g, 93.0% yield).

LCMS m/z (ESI)=362.2 [M+1].

Step 3:

3-(2-Chloro-7-methyl-8-oxo-7,8-dihydro-9H-purin-9-yl)adamantane-1-carbonitrile (34c)

Compound 34b (4.0 g, 11.0 mmol) was dissolved in dichloromethane (40 mL), and pyridine (3.48 g, 44.0 mmol) and trifluoroacetic anhydride (6.93 g, 33.0 mmol) were added under an ice bath. The reaction mixture was allowed to react for another hour with the temperature maintained. Methanol (20 mL) was added, and the crude product was concentrated. The crude product was poured into saturated NaHCO$_3$ solution (100 mL), and a large amount of solid precipitated. The mixture was filtered, and the filtrate was concentrated to dryness by rotary evaporation to give compound 34c (pale yellow solid, 3.3 g, 87.3% yield).

LCMS m/z (ESI)=344.2 [M+1].

Step 4:

4-((9-(3-Cyanoadamantan-1-yl)-7-methyl-8-oxo-8,9-dihydro-7H-purin-2-yl)amino)-2-fluoro-5-methyl-benzamide (Compound 34)

Compound 34c (2.0 g, 5.82 mmol), compound 21a (1.96 g, 11.64 mmol), cesium carbonate (3.80 g, 11.64 mmol) and methanesulfonato(2-dicyclohexylphosphino-3,6-dimethoxy-2',4',6'-tri-i-propyl-1,1'-biphenyl)(2'-amino-1,1'-biphenyl-2-yl)palladium(II) (528 mg, 0.582 mmol) were dissolved in dioxane (30 mL), followed by nitrogen purging. The reaction mixture was stirred at 100° C. for 4 h. The reaction was monitored by TLC until its completion. The reaction mixture was poured into ice water, and the solid was collected and purified by silica gel column chromatography (dichloromethane/methanol (v/v)=100/1) to give compound 34 (white solid, 1.0 g, 36.1% yield).

$^1$H NMR (400 MHz, DMSO-d$_6$) δ 8.50 (s, 1H), 8.18 (s, 1H), 7.80 (d, 1H), 7.54 (d, 1H), 7.48 (s, 1H), 7.32 (d, 1H), 3.27 (s, 3H), 2.82 (s, 2H), 2.61-2.52 (m, 4H), 2.28 (s, 3H), 2.23 (q, 2H), 2.06-1.94 (m, 4H), 1.68 (s, 2H).

LCMS m/z (ESI)=476.2 [M+1].

$^{19}$F NMR (377 MHz, DMSO-d$_6$) δ−115.48.

Example 35

3-(2-((7-Methyl-[1,2,4]triazolo[1,5-a]pyridin-6-yl)amino)-8-oxo-7,8-dihydro-9H-purin-9-yl)adamantane-1-carbonitrile (Compound 35)

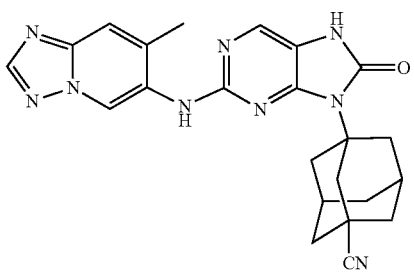

Compound 35

-continued

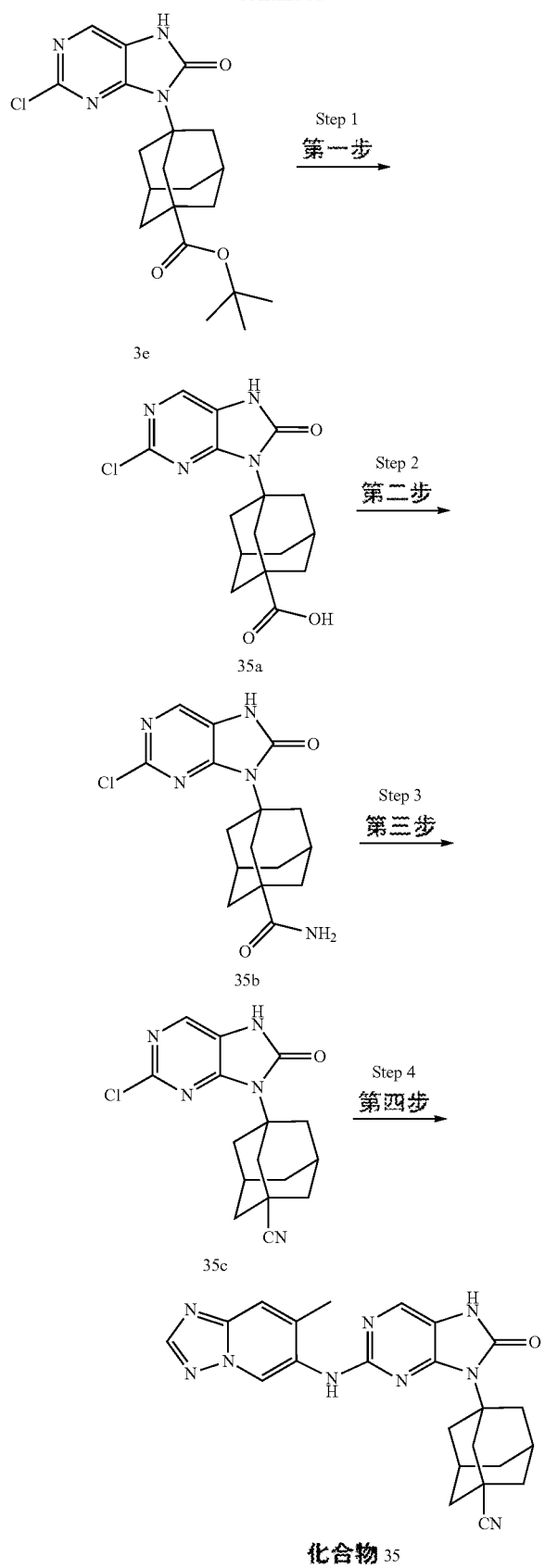

3-(2-Chloro-8-oxo-7,8-dihydro-9H-purin-9-yl)adamantane-1-carboxylic acid (35a)

Compound 1e (3.2 g, 7.90 mmol) was dissolved in 4 N dioxane hydrochloride solution (100 mL). The mixture was allowed to react at 60° C. for 6 h and concentrated, and the residue was purified by preparative medium pressure liquid chromatography to give compound 35a (pale yellow solid, 2.75 g, 100% yield).
LCMS m/z (ESI)=349.2 [M+1].
Step 2:

3-(2-Chloro-8-oxo-7,8-dihydro-9H-purin-9-yl)adamantane-1-carboxamide (35b)

Compound 35a (2.75 g, 7.90 mmol), ammonium chloride (4.23 g, 79.0 mmol) and triethylamine (3.99 g, 39.5 mmol) were dissolved in tetrahydrofuran (40 mL), and HATU (6.01 g, 15.80 mmol) was added under an ice bath. The mixture was allowed to react at room temperature for 2 h, quenched by addition of water (100 mL), and concentrated by rotary evaporation under reduced pressure to remove tetrahydrofuran, and a large amount of solid precipitated. The mixture was filtered, and the filtrate was concentrated to dryness by rotary evaporation to give compound 35b (off-white solid, 2.4 g, 87.5% yield).
LCMS m/z (ESI)=348.2 [M+1].
Step 3:

3-(2-Chloro-8-oxo-7,8-dihydro-9H-purin-9-yl)adamantane-1-carbonitrile (35c)

Compound 35b (2.4 g, 6.91 mmol) was dissolved in dichloromethane (40 mL), and pyridine (2.19 g, 27.63 mmol) and trifluoroacetic anhydride (4.35 g, 20.73 mmol) were added under an ice bath. The reaction mixture was allowed to react for another hour with the temperature maintained. Methanol (20 mL) was added, and the crude product was concentrated. The crude product was poured into saturated $NaHCO_3$ solution (100 mL), and a large amount of solid precipitated. The mixture was filtered, and the filtrate was concentrated to dryness by rotary evaporation to give compound 35c (pale yellow solid, 1.4 g, 61.4% yield).
LCMS m/z (ESI)=330.2 [M+1].
Step 4:

3-(2-((7-Methyl-[1,2,4]triazolo[1,5-a]pyridin-6-yl) amino)-8-oxo-7,8-dihydro-9H-purin-9-yl)adamantane-1-carbonitrile (Compound 35)

Compound 35c (1.4 g, 4.24 mmol), 7-methyl-[1,2,4] triazolo[1,5-a]pyridin-6-amine 1e (624 mg, 4.24 mmol), cesium carbonate (2.70 g, 8.28 mmol) and methanesulfonato (2-dicyclohexylphosphino-3,6-dimethoxy-2',4',6'-tri-i-propyl-1,1'-biphenyl)(2'-amino-1,1'-biphenyl-2-yl)palladium (II) (385 mg, 0.424 mmol) were dissolved in dioxane (30 mL), followed by nitrogen purging. The reaction mixture was stirred at 100° C. for 4 h. The reaction was monitored by TLC until its completion. The reaction mixture was poured into ice water, and the solid was collected and purified by silica gel column chromatography (dichloromethane/methanol (v/v)=100/1) to give compound 35 (white solid, 286 mg, 15.3% yield).
$^1$H NMR (400 MHz, DMSO-$d_6$) δ 10.95 (s, 1H), 9.06 (s, 1H), 8.56 (s, 1H), 8.36 (s, 1H), 7.89 (s, 1H), 7.69 (s, 1H), 2.75 (s, 2H), 2.49-2.44 (m, 4H), 2.37 (s, 3H), 2.14 (s, 2H), 1.90 (d, 4H), 1.61-1.53 (m, 2H).

LCMS m/z (ESI)=442.2 [M+1].

Example 36

9-(3-Hydroxyadamantan-1-yl)-2-((7-methyl-[1,2,4]triazolo[1,5-a]pyridin-6-yl)amino)-7,9-dihydro-8H-purin-8-one (Compound 36)

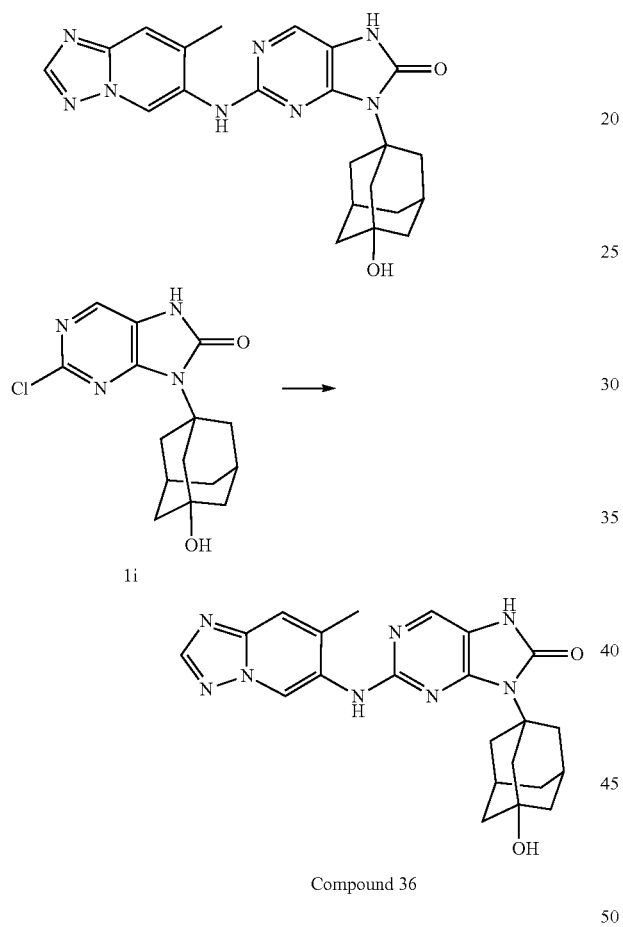

Compound 1i (128 mg, 0.4 mmol), compound 1e (132 mg, 0.3 mmol), cesium carbonate (1 g, 1.2 mmol), tris(dibenzylideneacetone)dipalladium (915 mg, 0.04 mmol) and 2,2'-bis(diphenylphosphino)-1,1'-binaphthyl (622 mg, 0.08 mmol) were dissolved in dioxane, followed by nitrogen purging. The reaction mixture was stirred at 100° C. for 4 h. The reaction mixture was concentrated, and the residue was purified by silica gel column chromatography (dichloromethane/methanol (v/v)=30/1) to give compound 36 (white solid, 30.0 mg, 17.5% yield).

¹H NMR (400 MHz DMSO) δ10.86 (s, 1H), 9.09 (s, 1H), 8.47 (s, 1H), 8.36 (s, 1H), 7.87 (s, 1H), 7.69 (s, 1H), 4.55 (s, 1H), 2.50-2.52 (m, 9H), 1.50-1.58 (M, 4H), 1.41-1.44 (m, 2H).

LC-MS m/z (ESI)=433.20 [M+1].

Example 37

9-(3-Hydroxy adamantan-1-yl)-7-(methyl-d3)-2-((7-methyl-[1,2,4]triazolo[1,5-a]pyridin-6-yl)amino)-7,9-dihydro-8H-purin-8-one (Compound 37)

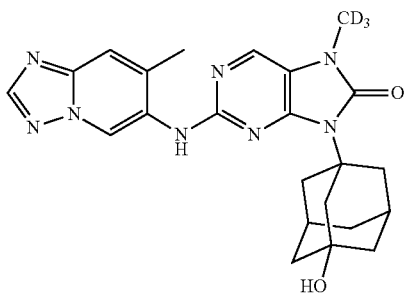

Compound 37

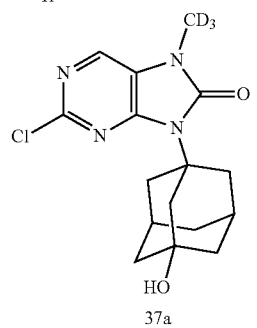

Step 1
第一步

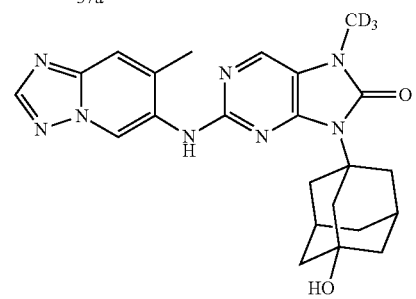

Step 2
第二步

化合物 37

2-Chloro-9-((3-hydroxyadamantan-1-yl)-7-(methyl-d3)-7,9-dihydro-8H-purin-8-one (37a)

Compound 1i (1.0 g, 3.12 mmol) was dissolved in dimethyl sulfoxide (20 mL), and cesium carbonate (1.6 g, 6.24 mmol) was added at room temperature, followed by addition of deuterated iodomethane (0.4 g, 3.36 mmol) at 0° C. The reaction mixture was allowed to react at room temperature for 2 h. After the reaction was completed, 5 mL of water was added, followed by three extractions with ethyl acetate. The organic phase was dried over anhydrous sodium sulfate and concentrated, and a solid precipitated. The mixture was filtered, and the filtrate was concentrated to dryness. The residue was purified by silica gel column chromatography (dichloromethane/methanol (v/v)=15:1) to give compound 37a (white solid, 0.36 g, 34.66% yield).

LC-MS m/z (ESI)=457.20 [M+1].

Step 2:

9-(3-Hydroxyadamantan-1-yl)-7-(methyl-d3)-2-((7-methyl-[1,2,4]triazolo[1,5-a]pyridin-6-yl)amino)-7,9-dihydro-8H-purin-8-one (Compound 37)

Compound 37a (135.1 mg, 0.4 mmol), compound 1e (40 mg, 0.3 mmol), cesium carbonate (391 mg, 1.2 mmol), tris(dibenzylideneacetone)dipalladium (40 mg, 0.04 mmol) and 2,2'-bis(diphenylphosphino)-1,1'-binaphthyl (622 mg, 0.08 mmol) were dissolved in dioxane, followed by nitrogen purging. The reaction mixture was stirred at 100° C. for 4 h. The reaction mixture was concentrated, and the residue was purified by silica gel column chromatography (dichloromethane/methanol (v/v)=30/1) to give compound 37 (white solid, 12.6 mg, 2.5% yield).

$^1$H NMR (400 MHz DMSO) δ 9.09 (s, 1H), 8.56 (s, 1H), 8.36 (s, 1H), 8.08 (s, 1H), 7.70 (s, 1H), 4.56 (s, 1H), 2.35-2.42 (m, 9H), 2.17 (s, 2H), 1.58-1.23 (m, 6H).

LC-MS m/z (ESI)=450.28 [M+1].

Example 38

9-(-4,4-Dimethoxyadamantan-1-yl)-7-methyl-2-((7-methyl-[1,2,4]triazolo[1,5-a]pyridin-6-yl)amino)-7,9-dihydro-8H-purin-8-one (Compound 38)

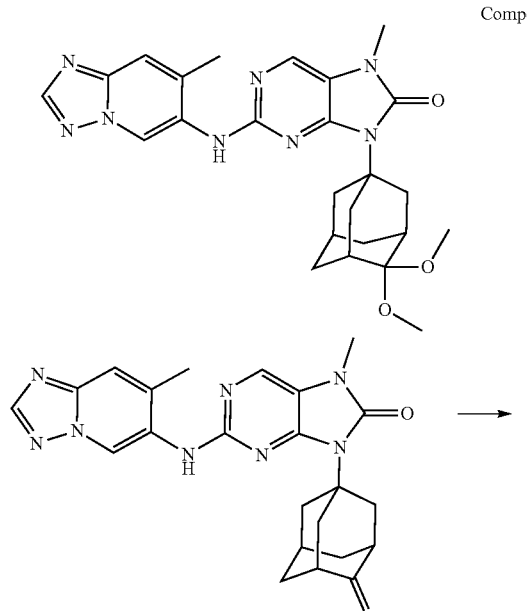

Compound 18

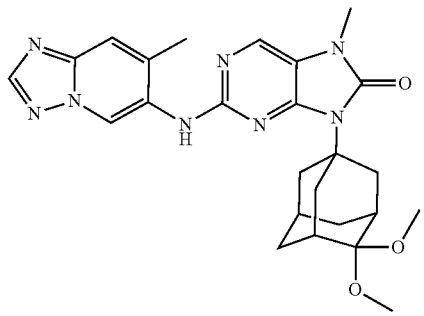

Compound 38

Compound 18 (100 mg, 0.22 mmol) was dissolved in 3 mL of methanol and 5 mL of acetonitrile, and 0.5 mL of 2 M hydrochloric acid was added. The reaction mixture was let stand at room temperature for 30 min, with the reaction monitored by TLC until its completion. The reaction mixture was concentrated, and the residue was purified by Pre-HPLC to give compound 30 (white solid, 22.0 mg, 20.4% yield).

$^1$H NMR (400 MHz DMSO) δ 9.11 (s, 1H), 8.61 (s, 1H), 8.37 (s, 1H), 8.11 (s, 1H), 7.70 (s, 1H), 3.25 (s, 3H), 3.08 (s, 3H), 3.07 (s, 3H), 2.93-2.96 (m, 2H), 2.66-2.69 (m, 4H), 2.39 (s, 3H), 1.94-1.99 (m, 2H), 1.81-1.84 (m, 2H), 1.34-1.49 (m, 2H).

LC-MS m/z (ESI)=491.24 [M+1].

Biological Assays

1. Inhibition of DNA-PK Kinase

The inhibitory activity of the compounds against DNA-PK kinase was determined using a DNA-PK kinase assay kit (purchased from Promega, Cat. No. V4107, Batch No. 0000366495). The results were quantified using chemiluminescence, specifically as follows:

i. ADP-fluorescence standard curves at different concentrations were constructed according to the instructions of the kit;

ii. reaction systems (5 L) were prepared in a 384-well white plate; 1 µL of a compound (concentration gradients 1 µM, 200 nM, 40 nM, 8 nM, 1.6 nM, 0.32 nM, 0.064 nM and 0.013 nM were set for each compound), 20 units of DNA-PK kinase, 0.2 µg/µL substrate, 10 µg/µL DNA, 50 µM ATP and 1% DMSO were successively added to each well;

iii. the mixtures were well mixed, centrifuged (1000 rpm, 30 s), and incubated at 37° C. for 60 min;

iv. the reactions were terminated by adding 5 µL of ADP-Glo™ Reagent; the mixtures were well mixed, centrifuged (1000 rpm, 30 s), and incubated at room temperature for 40 min;

v. 10 µL of Kinase Detection Reagent was added; the mixtures were well mixed by shaking, centrifuged (1000 rpm, 30 s), and incubated at room temperature for 30 min;

vi. fluorescence values were measured using a microplate reader (Thermo fisher, Varioskan LUX). IC$_{50}$ was calculated using GraphPad Prism 8. The results are shown in Table 1.

TABLE 1

Inhibitory activity against DNA-PK kinase

| Compound No. | IC$_{50}$ (nM) |
|---|---|
| Compound 1 | 1.30 |
| Compound 2 | 0.01 |
| Compound 3 | 14.95 |
| Compound 4 | 0.45 |
| Compound 5 | 3.87 |
| Compound 6 | 0.08 |
| Compound 7 | 0.01 |
| Compound 8 | 0.01 |
| Compound 9 | 1.10 |
| Compound 10 | 2.26 |
| Compound 11 | 0.10 |
| Compound 12 | 0.01 |
| Compound 13-1 | 0.68 |
| Compound 13-2 | 51.90 |
| Compound 14 | 0.01 |
| Compound 15 | 1.10 |
| Compound 16-1 | 0.52 |
| Compound 16-2 | 2.49 |
| Compound 17-1 | 0.01 |
| Compound 17-2 | 2.20 |
| Compound 18 | 0.06 |
| Compound 18-2 | 0.13 |
| Compound 19 | 0.03 |
| Compound 20-1 | 0.03 |
| Compound 20-2 | 1.10 |
| Compound 21-1 | 0.01 |
| Compound 21-2 | 0.10 |
| Compound 22 | 0.01 |
| Compound 23-1 | 2.84 |
| Compound 23-2 | 0.85 |
| Compound 24-1 | 0.66 |
| Compound 24-2 | 8.39 |
| Compound 25 | 0.01 |
| Compound 26 | 0.01 |
| Compound 27-1 | 10.5 |
| Compound 27-2 | 0.48 |
| Compound 28-1 | 0.75 |
| Compound 28-2 | 0.10 |
| Compound 29 | 0.50 |
| Compound 30 | 0.08 |
| Compound 31 | 0.10 |
| Compound 32 | 2.30 |
| Compound 33 | 6.40 |
| Compound 34 | 7.50 |
| Compound 35 | 0.48 |
| Compound 36 | 0.32 |
| Compound 37 | 1.30 |
| Comparative example | 100.20 |

Note:
Compound 3 of J. Med. Chem (2020), 63 (7), 3461-3471 was used as the comparative example; it was prepared according to its preparation method.

The results show that the compounds of the present invention have more significant inhibitory effects on DNA-PK kinase than the comparative example.

2. Inhibition of Graft Tumors
 2.1. Experimental materials: A549 cells (purchased from ATCC); doxorubicin liposome (Dox) (lipo doxorubicin, under trade name "Libod (里葆多)", purchased from Shanghai Fudan-Zhangjiang Bio-Pharmaceutical Co., Ltd.); compounds 1, 6, 19, 22 and 34; female nude mice (18-20 g in weight) at the age of 6 weeks (Beijing Vital River Laboratory Animal Technology Co., Ltd.), 10 mice per group.
 2.2. Determination of inhibitory effect of doxorubicin in combination with compounds to be screened on A549 graft tumors:
  2.2.1. A549 cells growing at log phase were collected and washed twice with pre-cooled PBS for later use;
  2.2.2. Balb/c nude mice were acclimated to the laboratory environment for 3 days, and subcutaneously inoculated with A549 cells in the right flank in an amount of $5\times10^6$ cells per mouse; a pharmacodynamic study was conducted when tumors had grown to a size of about 200 mm$^3$.
  2.2.3. mice with tumors were randomly divided into groups as follows: doxorubicin (Dox) group, test compound+Dox group and control group (vehicle); the mice was intragastrically administrated (i.g.) at a volume of 5 mL/kg twice a day (BID) for 21 days (the solvent was 5% DMSO+30% 2-hydroxypropyl-β-cyclodextrin); one hour after the intragastric administration in the morning, lipo doxorubicin (2.5 mg/kg) was injected via the tail vein once a week (QW) at a volume of 5 mL/kg; the specific administration regimens are as follows:

| Group | Treatment | Dosage |
|---|---|---|
| 1 | Vehicle | — |
| 2 | Compound 1 + doxorubicin | Compound 1 (20 mg/kg, BID, i.g.) Dox (2.5 mg/kg, QW, i.v.) |
| 3 | Compound 6 + doxorubicin | Compound 6 (20 mg/kg, BID, i.g.) Dox (2.5 mg/kg, QW, i.v.) |
| 4 | Compound 19 + doxorubicin | Compound 19 (20 mg/kg, BID, i.g.) Dox (2.5 mg/kg, QW, i.v.) |
| 5 | Compound 22 + doxorubicin | Compound 22 (20 mg/kg, BID, i.g.) Dox (2.5 mg/kg, QW, i.v.) |
| 6 | Compound 34 + doxorubicin | Compound 34 (20 mg/kg, BID, i.g.) Dox (2.5 mg/kg, QW, i.v.) |
| 7 | Lipo Doxorubicin | 2.5 mg/kg, QW, i.v. |

2.2.4. the mice were weighed twice a week, and meanwhile the tumor volume was determined: tumor volume (V) was calculated as: $V=\frac{1}{2}\times L_{long}\times L_{short}^2$; the tumor inhibition rate was calculated as: tumor inhibition rate (%)=(D21 tumor volume (vehicle)−D21 tumor volume (administration group))/D21 tumor volume (vehicle)×100;
 2.2.5. after 21 days of administration, tumors were isolated and weighed, and the rate of change in body weight was calculated as: rate of change in body weight (%)=(D21 body weight−D0 body weight)/D0 body weight×100.

TABLE 2

Experimental results for inhibition of graft tumors

| Test item | Group 1 | | | Group 2 | | | Group 3 | | |
|---|---|---|---|---|---|---|---|---|---|
| | Vehicle-1 | Dox-1 | Compound 1 + Dox-1 | Vehicle-2 | Dox-2 | Compound 6 + Dox-2 | Vehicle-3 | Dox-3 | Compound 19 + Dox-3 |
| D0 mean tumor volume (mm$^3$) | 171.60 | 171.80 | 171.60 | 185.88 | 182.25 | 185.63 | 186.21 | 186.23 | 185.99 |
| D0 mean body weight (g) | 18.96 | 19.74 | 19.70 | 18.50 | 18.90 | 20.10 | 19.03 | 19.27 | 19.03 |
| D21 mean tumor volume (mm$^3$) | 596.17 | 474.28 | 371.06 | 1057.75 | 634.38 | 510.00 | 698.21 | 605.36 | 318.55 |

TABLE 2-continued

Experimental results for inhibition of graft tumors

| D21 mean body weight (g) | 20.24 | 18.96 | 17.83 | 21.30 | 18.70 | 20.50 | 20.91 | 19.81 | 18.03 |
|---|---|---|---|---|---|---|---|---|---|
| D21 tumor inhibition rate (%) | — | 20.45 | 37.76 | — | 40.02 | 51.78 | — | 13.30 | 54.38 |
| D21 weight Rate of change (%) | 6.75 | −3.95 | −9.49 | 15.14 | −1.05 | 1.99 | 9.88 | 2.80 | −5.25 |

| | Group 4 | | | Group 5 | | |
|---|---|---|---|---|---|---|
| Test item | Vehicle-3 | Dox-3 | Compound 22 + Dox-3 | Vehicle-3 | Dox-3 | Compound 34 + Dox-3 |
| D0 mean tumor volume (mm³) | 186.21 | 186.23 | 184.94 | 186.21 | 186.23 | 185.95 |
| D0 mean body weight (g) | 19.03 | 19.27 | 19.17 | 19.03 | 19.27 | 19.91 |
| D21 mean tumor volume (mm³) | 698.21 | 605.36 | 502.56 | 698.21 | 605.36 | 451.01 |
| D21 mean body weight (g) | 20.91 | 19.81 | 18.7 | 20.91 | 19.81 | 19.11 |
| D21 tumor inhibition rate (%) | — | 13.30 | 28.02 | — | 13.30 | 35.40 |
| D21 weight Rate of change (%) | 9.88 | 2.80 | −2.45 | 9.88 | 2.80 | −4.01 |

Conclusion: The experimental results show that all of the compounds of the present invention, when used in combination with doxorubicin, can improve the inhibitory effect of doxorubicin on tumors and will not cause significant weight loss.

While specific embodiments of the present invention have been described in detail in the specification, it will be understood by those skilled in the art that the embodiments described above are illustrative and are not to be construed as limiting the present invention, and that various changes and modifications can be made to the present invention without departing from the principles of the present invention, and the technical schemes resulting from these changes and modifications also fall within the protection scope of the appended claims.

The invention claimed is:

1. A compound shown as general formula (I) or all stereoisomers, solvates, pharmaceutically acceptable salts or cocrystals thereof:

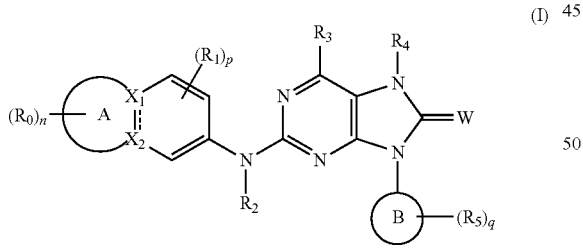

(I)

wherein,

A is absent or is selected from a 4-12 membered heterocycle containing 1 to 4 heteroatoms selected from N, O and S;

$X_1$ and $X_2$ are each independently selected from C, O, N and S, and when A is selected from a 4-12 membered heterocycle, $X_1$ and $X_2$ are part of ring A;

B is selected from adamantyl;

$R_0$ and $R_1$ are each independently selected from H, halogen, carboxyl, =O, —OH, cyano, —NR$^{a1}$R$^{a2}$, $C_{1-6}$ alkyl, —$C_{1-6}$ alkylene-OH, —$C_{1-6}$ alkylene-NR$^{a1}$R$^{a2}$, $C_{1-6}$ alkoxy, —C(=O)O$C_{1-6}$ alkyl, —C(=O)NR$^{a1}$R$^{a2}$, $C_{2-6}$ alkenyl and $C_{2-6}$ alkynyl, wherein the $C_{1-6}$ alkyl, $C_{1-6}$ alkylene and $C_{1-6}$ alkoxy are optionally further substituted with 1-3 substituents selected from D and halogen;

or when n is selected from 2, 3 and 4, two $R_0$, together with atoms to which they are attached, form a 3-8 membered ring, wherein the 3-8 membered ring optionally contains 1 to 3 heteroatoms selected from N, O and S, and is optionally further substituted with 1 or more substituents selected from —OH, carboxyl, halogen, cyano, =O, $C_{1-6}$ alkyl and amino;

$R_2$ is selected from H and $C_{1-6}$ alkyl;

$R_3$ is selected from H, halogen, $C_{1-6}$ alkyl and $C_{1-6}$ alkoxy;

$R_4$ is selected from H, $C_{1-6}$ alkyl, $C_{3-12}$ cycloalkyl, $C_3$ heterocycloalkyl and $C_{4-12}$ heterocycloalkyl, wherein the $C_3$ heterocycloalkyl or $C_{4-12}$ heterocycloalkyl contains 1 to 3 heteroatoms selected from N, O and S, and the $C_{1-6}$ alkyl, $C_{3-12}$ cycloalkyl, $C_3$ heterocycloalkyl or $C_{4-12}$ heterocycloalkyl is optionally substituted with 1 or more substituents selected from —OH, D, halogen, cyano, carboxyl, —NH$_2$, =O, —C(=O)NH$_2$, $C_{1-6}$ alkyl, —$C_{1-6}$ alkylene-OH, $C_{1-6}$ alkoxy, $C_{2-6}$ alkenyl, $C_{2-6}$ alkynyl, $C_{3-12}$ cycloalkyl, $C_3$ heterocycloalkyl, $C_{4-12}$ heterocycloalkyl, $C_{6-12}$ aryl and $C_{5-12}$ heteroaryl;

or, $R_3$ and $R_4$, together with atoms to which they are attached, form a 4-12 membered heterocycle, wherein the heterocycle contains 1 to 3 heteroatoms selected from N, O and S, and the 4-12 membered heterocycle is optionally substituted with 1 or more substituents selected from —OH, carboxyl, halogen, cyano, =O, $C_{1-6}$ alkyl, $C_{1-6}$ heteroalkyl, $C_{2-6}$ alkenyl, $C_{2-6}$ alkynyl, —NR$^{a1}$R$^{a2}$, —C(=O)O$C_{1-6}$ alkyl, —C(=O)NR$^{a1}$R$^{a2}$, $C_{3-12}$ cycloalkyl, $C_3$ heterocycloalkyl, $C_{4-12}$ heterocycloalkyl, $C_{6-12}$ aryl and $C_{5-12}$ heteroaryl, wherein the $C_{1-6}$ alkyl, $C_{1-6}$ heteroalkyl, $C_{2-6}$ alkenyl or $C_{2-6}$ alkynyl is optionally further substituted with 1 or more substituents selected from —OH, carboxyl, cyano, halogen, —O—R$^{a1}$, —NR$^{a1}$R$^{a2}$, $C_{3-12}$ cycloalkyl, $C_3$ heterocycloalkyl, $C_{4-12}$ heterocycloalkyl, $C_{6-12}$ aryl and $C_{5-12}$ heteroaryl;

$R_5$ is selected from —OH, halogen, D, cyano, carboxyl, =O, $C_{1-6}$ alkyl, $C_{1-6}$ alkoxy, $C_{2-6}$ alkenyl, $C_{2-6}$ alkynyl, —NR$^{a1}$R$^{a2}$, —C(=O)O$C_{1-6}$ alkyl, —OC(=O)$C_{1-6}$ alkyl, —C(=O)NR$^{a1}$R$^{a2}$, $C_{3-12}$ cycloalkyl, $C_3$ heterocycloalkyl, C<sub>4-12</sub> heterocycloalkyl, C<sub>6-12</sub> aryl and C<sub>5-12</sub> heteroaryl, wherein the $C_{1-6}$ alkyl, $C_{1-6}$ alkoxy, $C_{3-12}$ cycloalkyl, $C_{4-12}$ heterocycloalkyl, $C_{6-12}$ aryl and $C_{6-12}$ heteroaryl are optionally further substituted with 1 to 3 substituents selected from OH, carboxyl, halogen, $C_{1-6}$ alkyl, $C_{1-6}$ alkoxy, $-NR^{a1}R^{a2}$ and =O;

$R^{a1}$ and $R^{a2}$ are each independently selected from H, $C_{1-6}$ alkyl, $-C(=O)R^{a3}$ and $-C(=O)NR^{a4}R^{a5}$, wherein the $C_{1-6}$ alkyl is optionally further substituted with 1 or more substituents selected from OH, halogen, $C_{1-6}$ alkyl, $C_{1-6}$ alkoxy, $C_{6-12}$ aryl, $C_{5-12}$ heteroaryl, $C_{3-12}$ cycloalkyl, $C_3$ heterocycloalkyl and $C_{4-12}$ heterocycloalkyl; or $R^{a1}$ and $R^{a2}$, together with a N atom form a 3-12 membered heterocycle, which contains 1 to 4 heteroatoms selected from N, O and S;

$R^{a3}$ is selected from $C_{1-6}$ alkyl, $C_{1-6}$ alkoxy and $C_{6-12}$ aryl;

$R^{a4}$ and $R^{a5}$ are each independently selected from H and $C_{1-6}$ alkyl; or $R^{a4}$ and $R^{a5}$, together with a N atom, form a 3-12 membered heterocycle, which contains 1 to 4 heteroatoms selected from N, O and S;

W is selected from O and S;

n, p and q are each independently selected from 0, 1, 2, 3 or 4;

===== is a single bond or a double bond.

2. The compound or the stereoisomer, solvate, pharmaceutically acceptable salt or cocrystal thereof according to claim 1, wherein the compound is a compound shown as general formula (II):

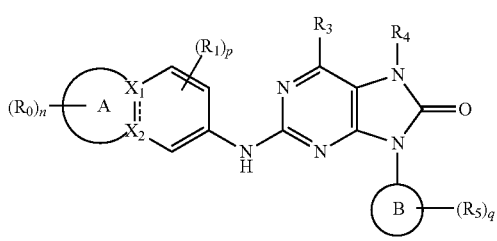

(II)

wherein,

A is absent or is selected from a 4-12 membered heterocycle containing 1 to 4 heteroatoms selected from N, O and S;

$X_1$ and $X_2$ are each independently selected from C and N, and when A is selected from a 4-12 membered heterocycle, $X_1$ and $X_2$ are part of ring A;

B is selected from adamantyl;

$R_0$ and $R_1$ are each independently selected from H, halogen, carboxyl, =O, -OH, cyano, $-NR^{a1}R^{a2}$, $C_{1-6}$ alkyl, $-C_{1-6}$ alkylene-OH, $-C_{1-6}$ alkylene-$NR^{a1}R^{a2}$, $C_{1-6}$ alkoxy, $-C(=O)OC_{1-6}$ alkyl, $-C(=O)NR^{a1}R^{a2}$, $C_{2-6}$ alkenyl and $C_{2-6}$ alkynyl, wherein the $C_{1-6}$ alkyl, $C_{1-6}$ alkylene and $C_{1-6}$ alkoxy are optionally further substituted with 1-3 substituents selected from D and halogen;

or when n is selected from 2, 3 and 4, two $R_0$, together with atoms to which they are attached, may form a 3-8 membered ring, wherein the 3-8 membered ring optionally contains 1 to 3 heteroatoms selected from N, O and S, and is optionally further substituted with 1 or more substituents selected from -OH, carboxyl, halogen, cyano, =O, $C_{1-6}$ alkyl and amino;

$R_3$ is selected from H, halogen, $C_{1-6}$ alkyl and $C_{1-6}$ alkoxy;

$R_4$ is selected from H, $C_{1-6}$ alkyl, $C_{3-12}$ cycloalkyl, $C_3$ heterocycloalkyl and $C_{4-12}$ heterocycloalkyl, wherein the $C_3$ heterocycloalkyl or $C_{4-12}$ heterocycloalkyl contains 1 to 3 heteroatoms selected from N, O and S, and the $C_{1-6}$ alkyl, $C_{3-12}$ cycloalkyl, $C_3$ heterocycloalkyl or $C_{4-12}$ heterocycloalkyl is optionally substituted with 1 or more substituents selected from -OH, D, halogen, cyano, carboxyl, -NH<sub>2</sub>, =O, -C(=O)NH<sub>2</sub>, $C_{1-6}$ alkyl, $-C_{1-6}$ alkylene-OH, $C_{1-6}$ alkoxy, $C_{2-6}$ alkenyl, $C_{2-6}$ alkynyl, $C_{3-12}$ cycloalkyl, $C_3$ heterocycloalkyl, $C_{4-12}$ heterocycloalkyl, $C_{6-12}$ aryl and $C_{5-12}$ heteroaryl;

$R_5$ is selected from -OH, D, halogen, cyano, carboxyl, =O, $C_{1-6}$ alkyl, $C_{1-6}$ alkoxy, $C_{2-6}$ alkenyl, $C_{2-6}$ alkynyl, $-NR^{a1}R^{a2}$, $-C(=O)OC_{1-6}$ alkyl, $-OC(=O)C_{1-6}$ alkyl, $-C(=O)NR^{a1}R^{a2}$, $C_{3-12}$ cycloalkyl, $C_3$ heterocycloalkyl, $C_{4-12}$ heterocycloalkyl, $C_{6-12}$ aryl and $C_{5-12}$ heteroaryl, wherein the $C_{1-6}$ alkyl, $C_{1-6}$ alkoxy, $C_{3-12}$ cycloalkyl, $C_{4-12}$ heterocycloalkyl, $C_{6-12}$ aryl and $C_{6-12}$ heteroaryl are optionally further substituted with 1 to 3 substituents selected from OH, carboxyl, halogen, $C_{1-6}$ alkyl, $C_{1-6}$ alkoxy, $-NR^{a1}R^{a2}$ and =O;

$R^{a1}$ and $R^{a2}$ are each independently selected from H, $C_{1-6}$ alkyl, $-C(=O)R^{a3}$ and $-C(=O)NR^{a4}R^{a5}$, wherein the $C_{1-6}$ alkyl is optionally further substituted with 1 or more substituents selected from OH, halogen, $C_{1-6}$ alkyl, $C_{1-6}$ alkoxy, $C_{6-12}$ aryl, $C_{5-12}$ heteroaryl, $C_{3-12}$ cycloalkyl, $C_3$ heterocycloalkyl and $C_{4-12}$ heterocycloalkyl; or $R^{a1}$ and $R^{a2}$, together with a N atom form a 3-12 membered heterocycle, which contains 1 to 4 heteroatoms selected from N, O and S;

$R^{a3}$ is selected from $C_{1-6}$ alkyl, $C_{1-6}$ alkoxy and $C_{6-12}$ aryl;

$R^{a4}$ and $R^{a5}$ are each independently selected from H and $C_{1-6}$ alkyl; or $R^{a4}$ and $R^{a5}$, together with a N atom, form a 3-12 membered heterocycle, which contains 1 to 4 heteroatoms selected from N, O and S;

n, p and q are each independently selected from 0, 1, 2, 3 or 4;

===== is a single bond or a double bond.

3. The compound or the stereoisomer, solvate, pharmaceutically acceptable salt or cocrystal thereof according to claim 2, wherein the compound is selected from a compound shown as general formula (III), (IV), (V), (VI), (VII), or (VIII):

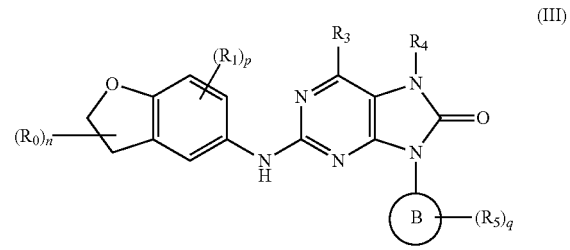

(III)

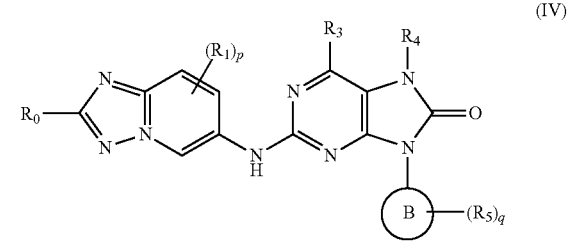

(IV)

-continued

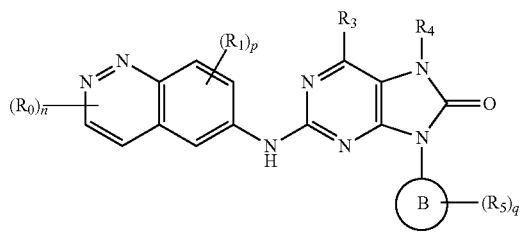
(V)

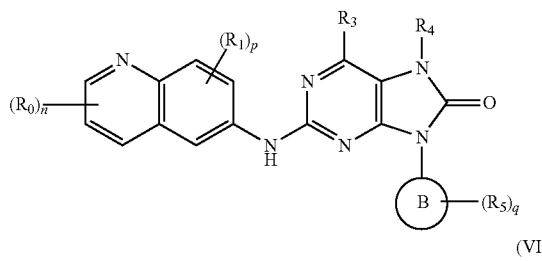
(VI)

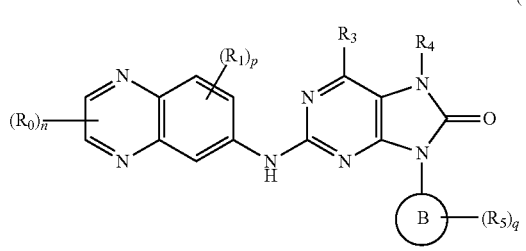
(VII)

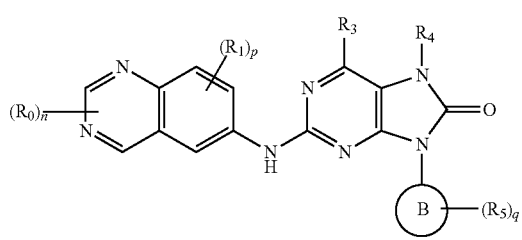
(VIII)

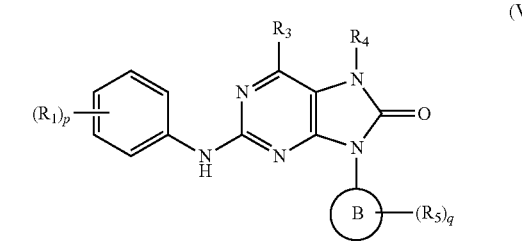
(VIX)

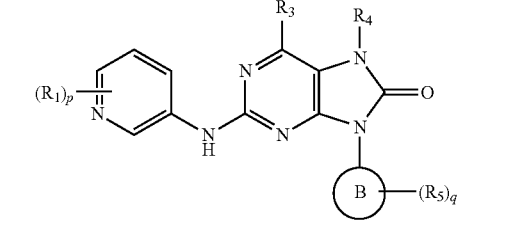
(VX)

$R_0$, $R_1$, $R_3$, $R_4$, $R_5$, B, n, p and q are defined in the same way as in general formula (II).

4. The compound or the stereoisomer, solvate, pharmaceutically acceptable salt or cocrystal thereof according to claim 1, wherein:

A is absent or is selected from a 5 membered heterocycle containing 1 to 3 heteroatoms selected from N and O;

$X_1$ and $X_2$ are each independently selected from C and N, and when A is selected from a 5 membered heterocycle, $X_1$ and $X_2$ are part of ring A;

B is selected from adamantyl;

$R_0$ is selected from H;

$R_1$ is selected from H, halogen, $C_{1-4}$ alkyl, cyano and —C(=O)NR$^{a1}$R$^{a2}$, wherein the $C_{1-4}$ alkyl is optionally further substituted with 1-3 substituents selected from D and halogen;

$R_3$ is selected from H;

$R_4$ is selected from H and $C_{1-4}$ alkyl;

$R_5$ is selected from —OH, D, cyano, —NR$^{a1}$R$^{a2}$, $C_{1-4}$ alkyl, $C_{1-4}$ alkoxy, —C(=O)OC$_{1-4}$ alkyl, carboxyl, halogen, =O and —C(=O)NR$^{a1}$R$^{a2}$, wherein the $C_{1-4}$ alkyl and $C_{1-4}$ alkoxy are optionally further substituted with 1 to 3 substituents selected from OH and halogen;

R$^{a1}$ and R$^{a2}$ are each independently selected from H and $C_{1-4}$ alkyl; or R$^{a1}$ and R$^{a2}$, together with a N atom, form a 6 membered heterocycle, which contains 1 to 2 heteroatoms selected from N and O;

n is selected from 0 and 1;

p is selected from 1, 2 and 3;

q is selected from 1 and 2;

===== is a single bond or a double bond.

5. The compound or the stereoisomer, solvate, pharmaceutically acceptable salt or cocrystal thereof according to claim 1, wherein the compound is selected from one of the following structures:

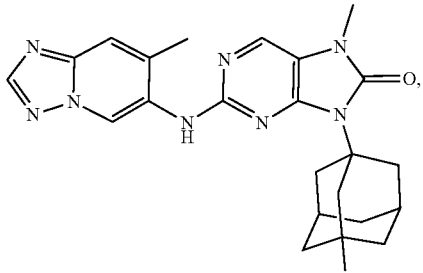

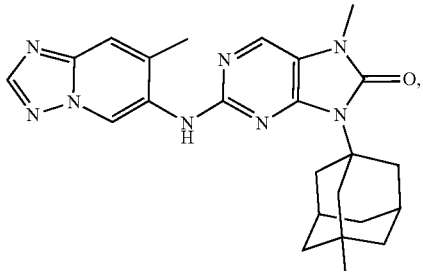

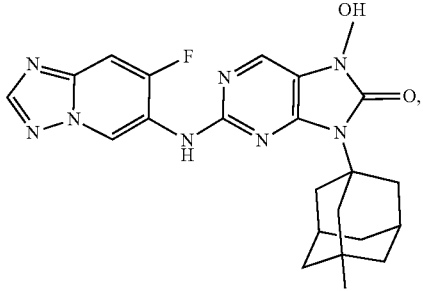

121
-continued
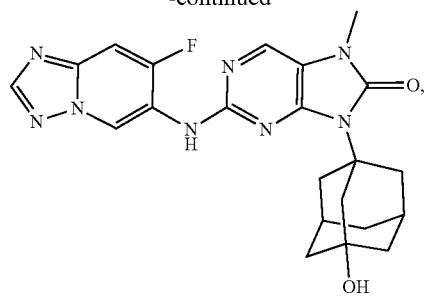
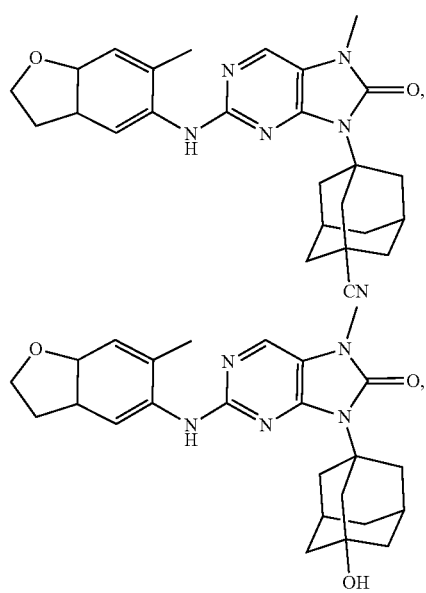
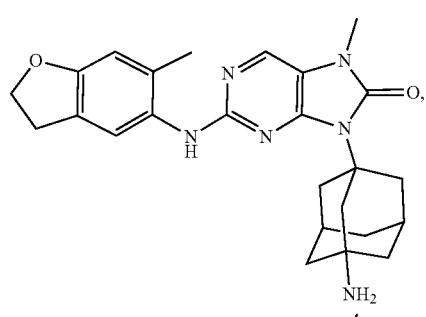
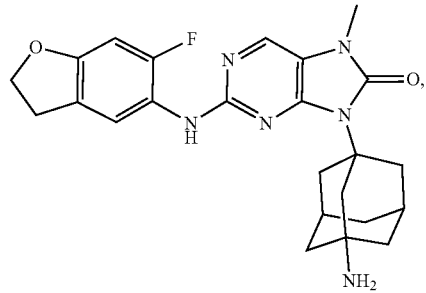
122
-continued
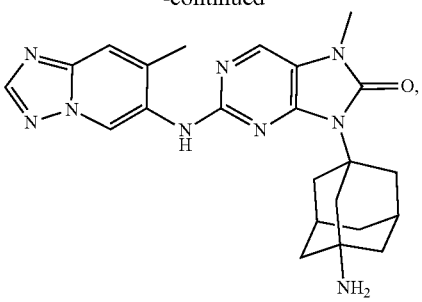
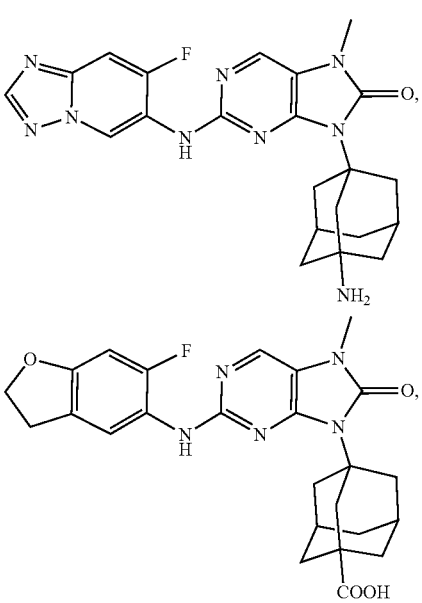

123
-continued
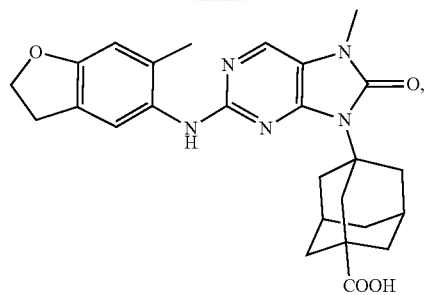
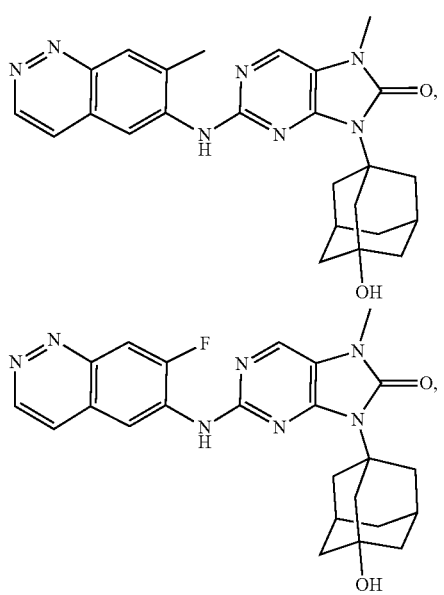
124
-continued
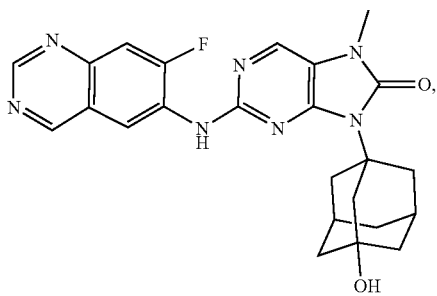
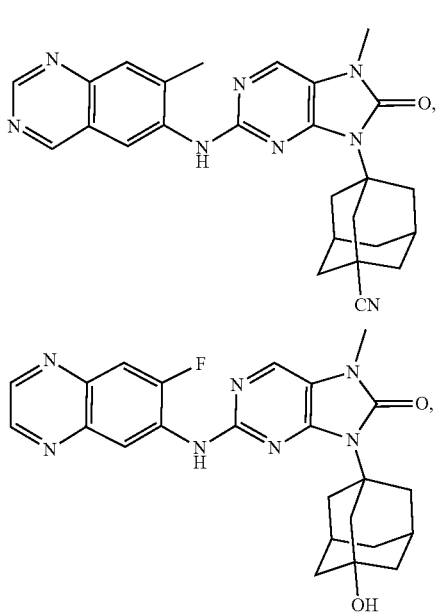
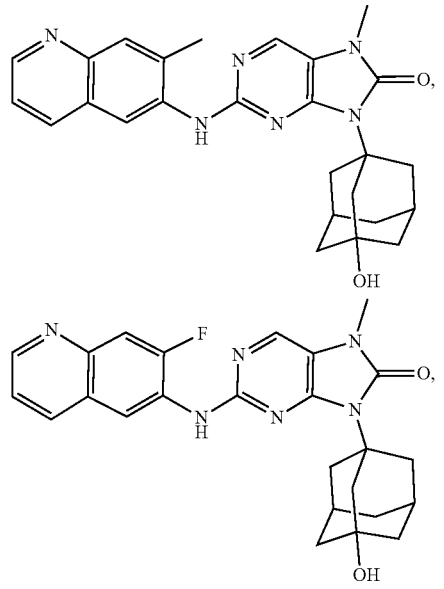

125
-continued
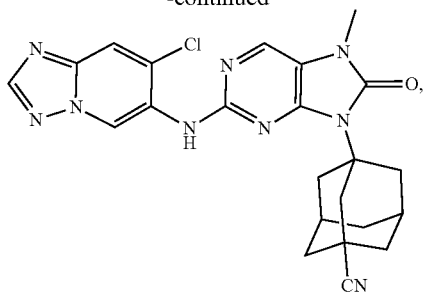
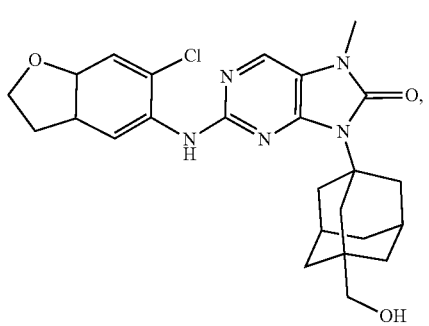
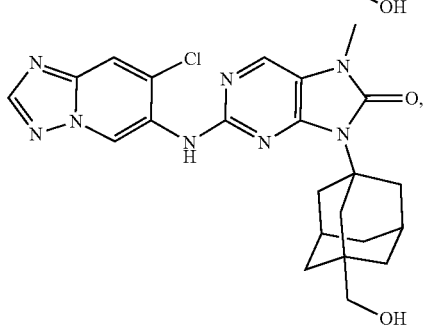
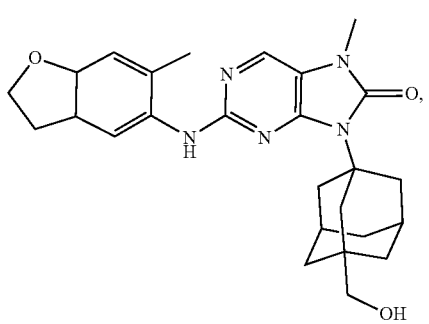
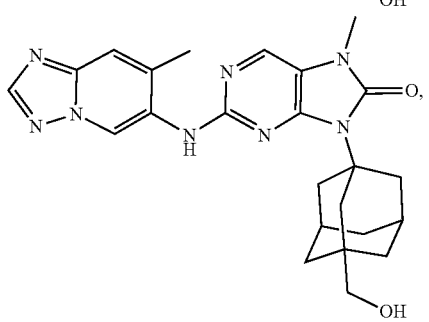
126
-continued
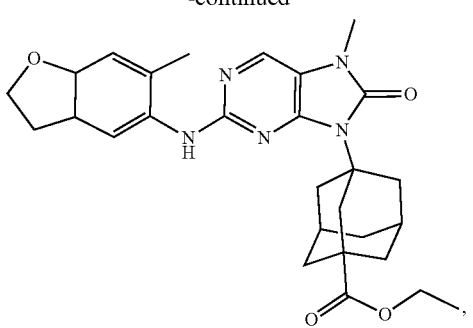
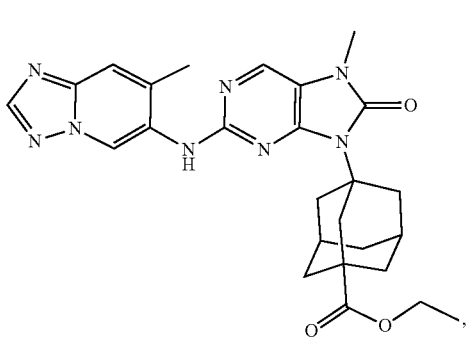
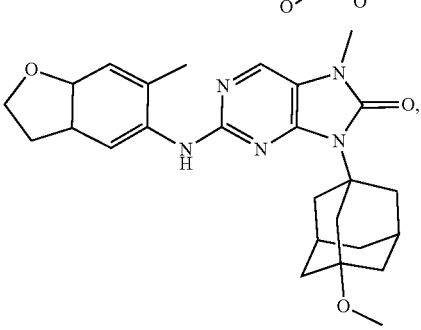
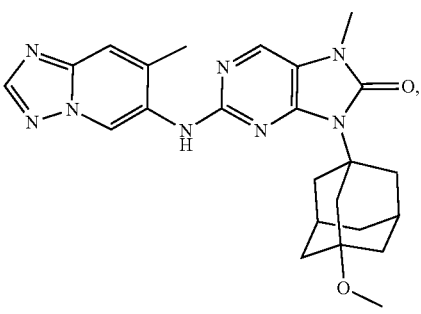
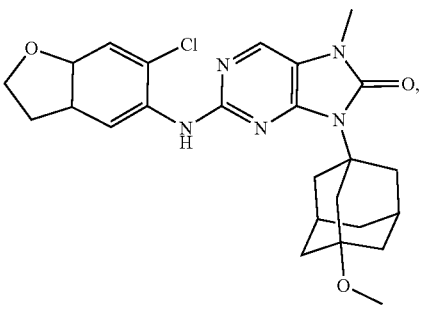

127
-continued
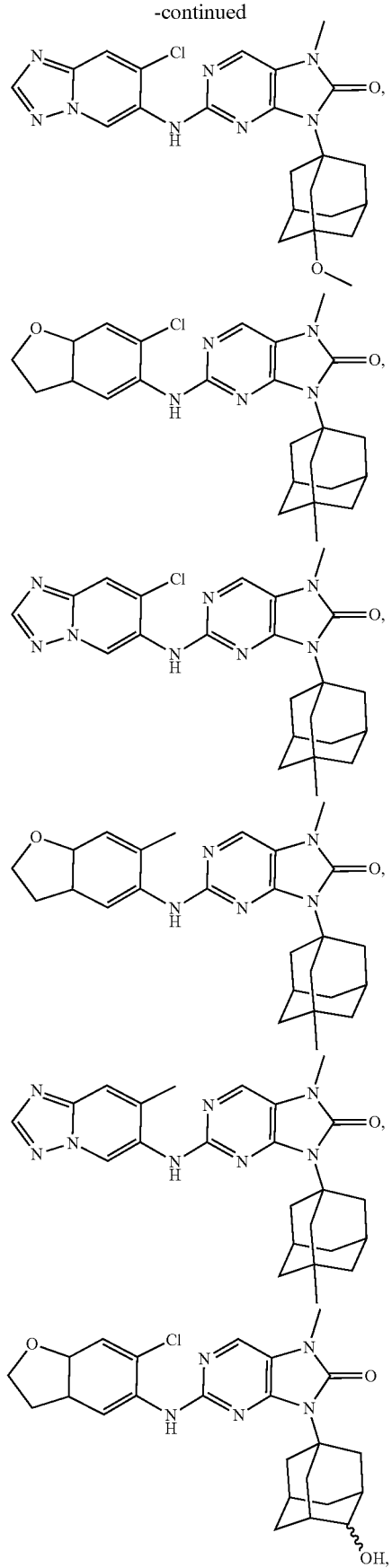
128
-continued
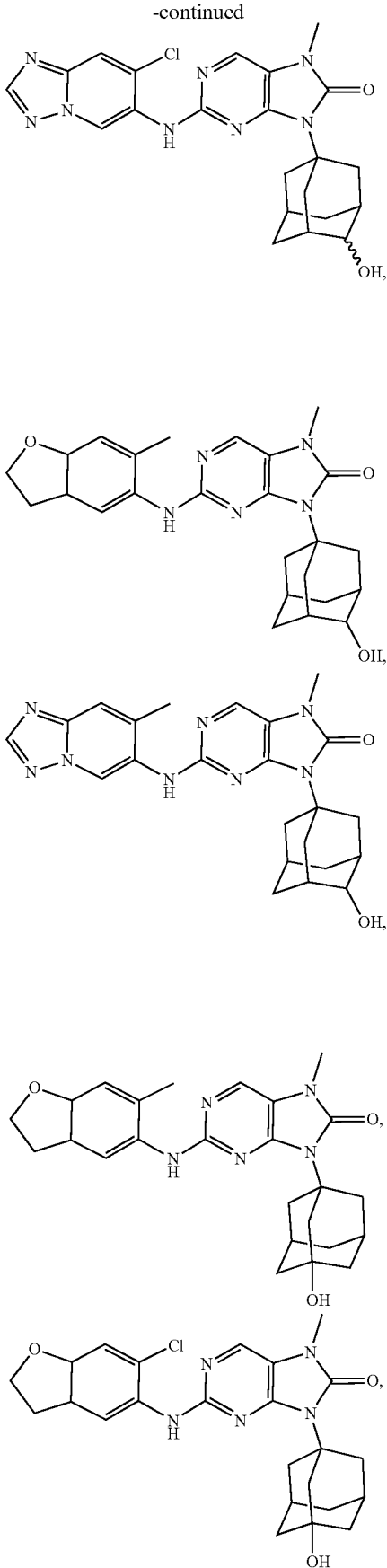

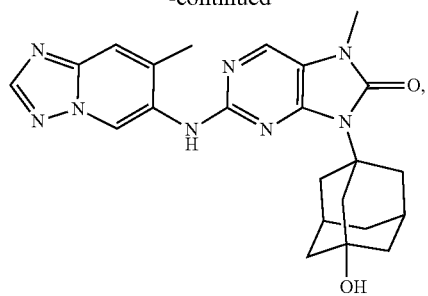
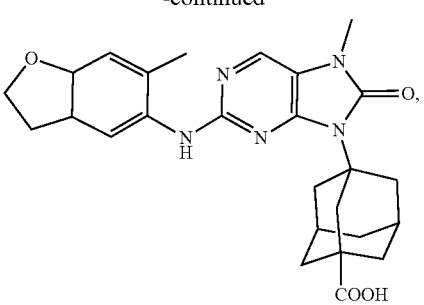

131
-continued
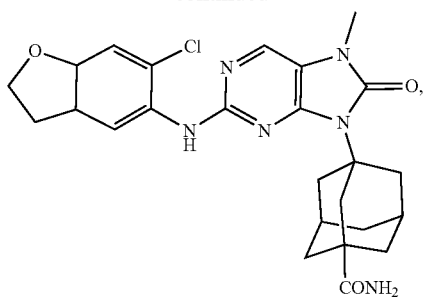
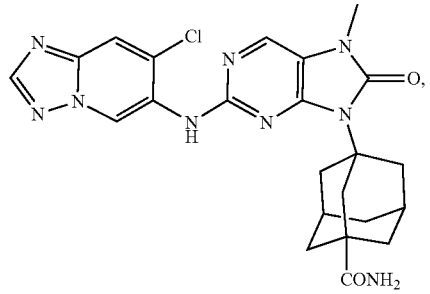
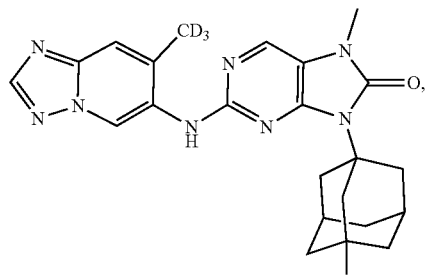
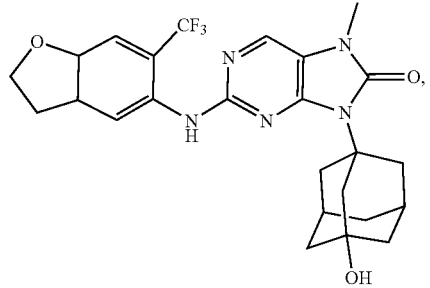
132
-continued
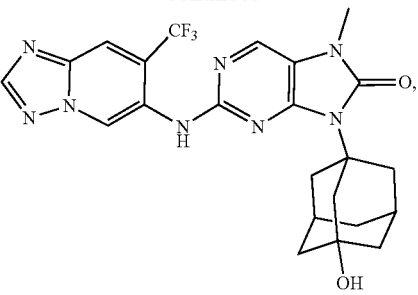
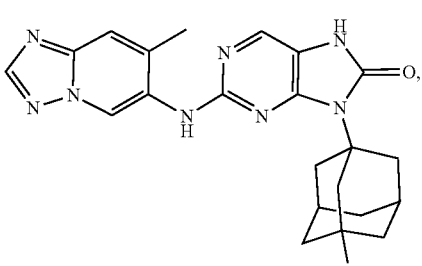
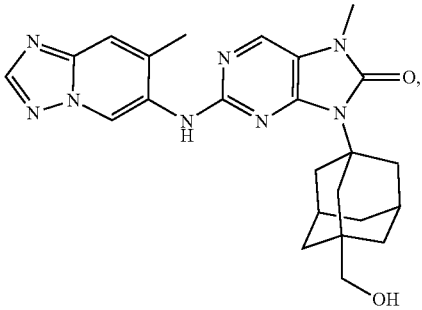
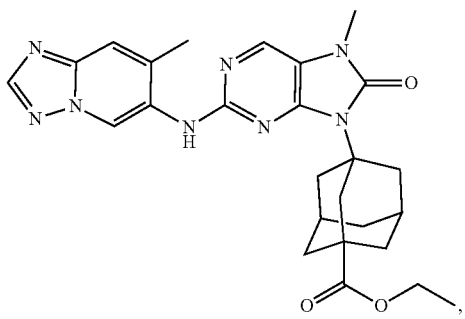
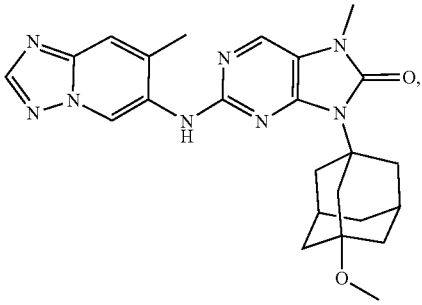

133
-continued
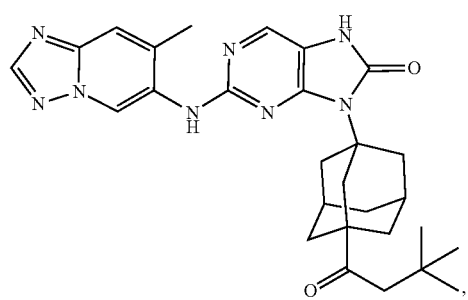
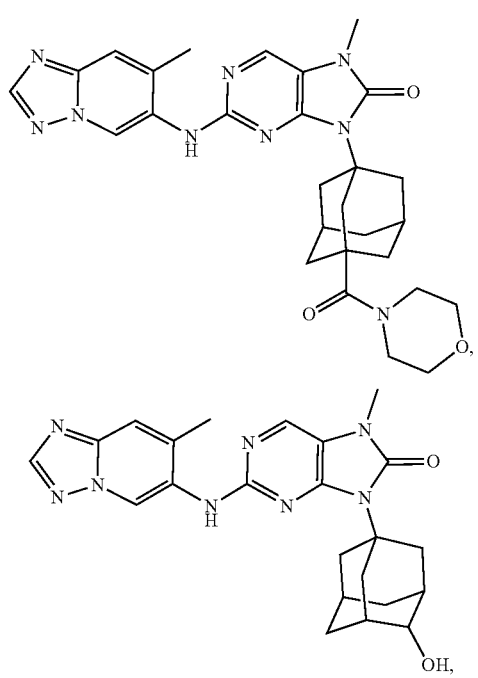
134
-continued
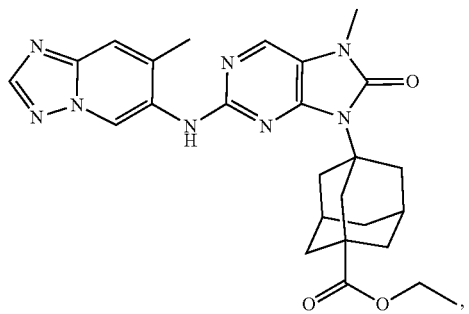
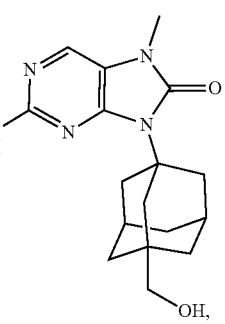
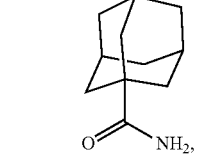
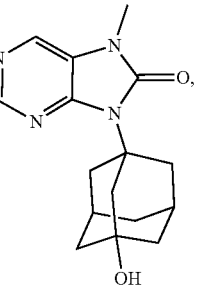
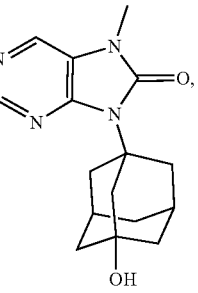

135
-continued
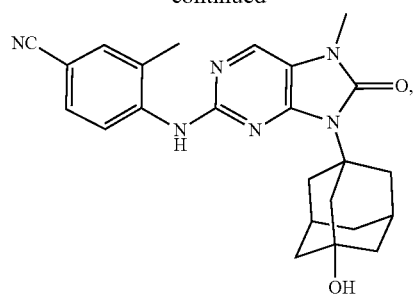
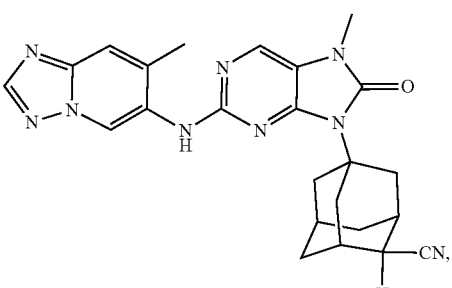
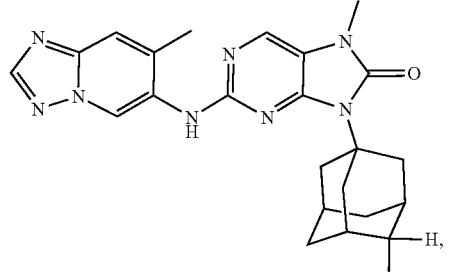
136
-continued
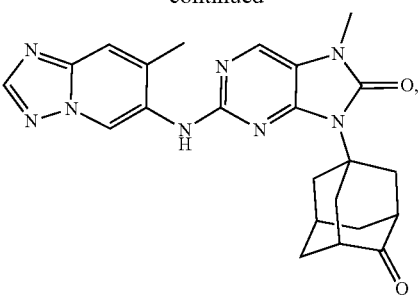
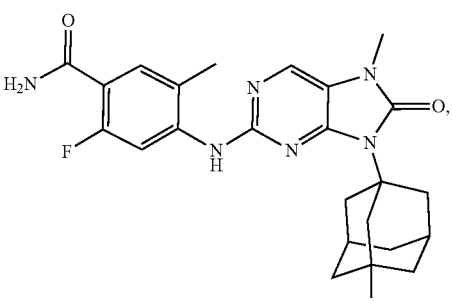
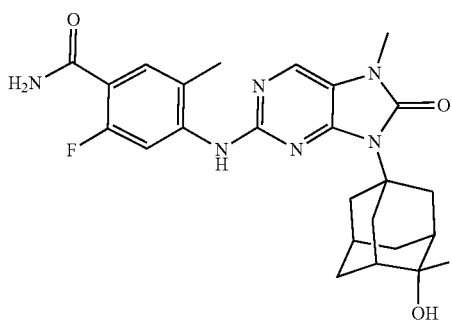

137
-continued
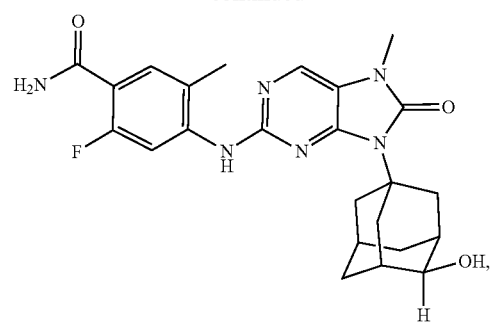
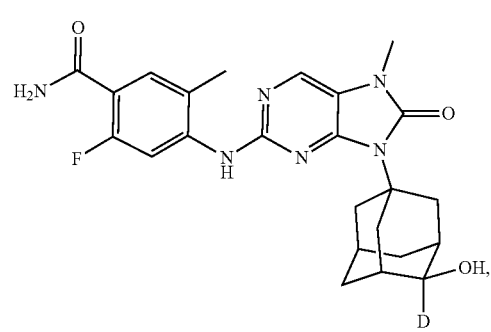
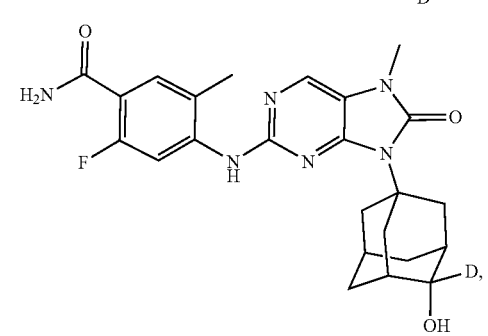
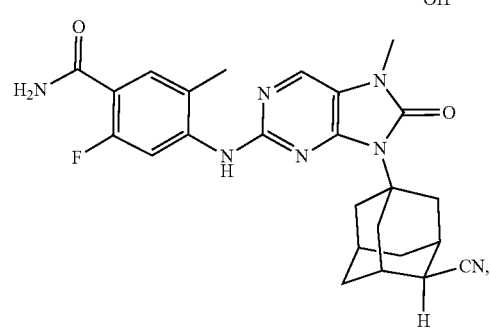
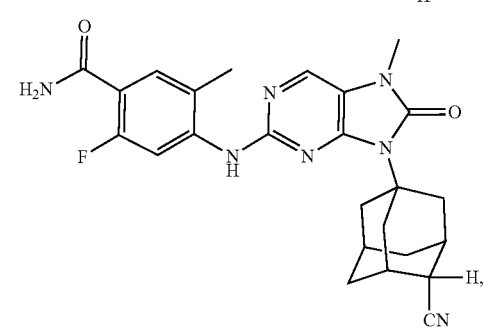
138
-continued
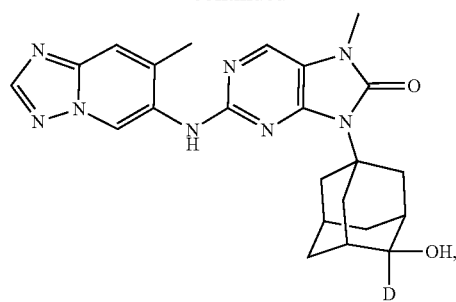
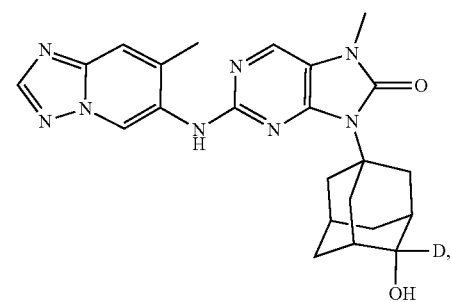
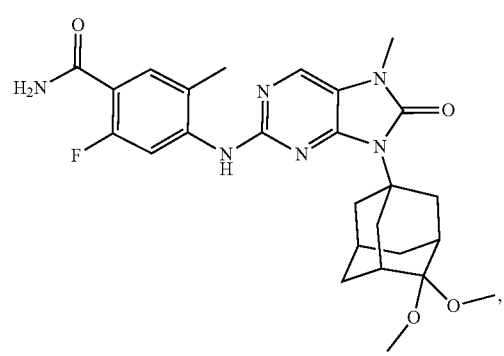
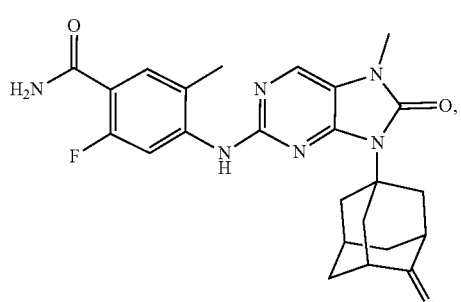
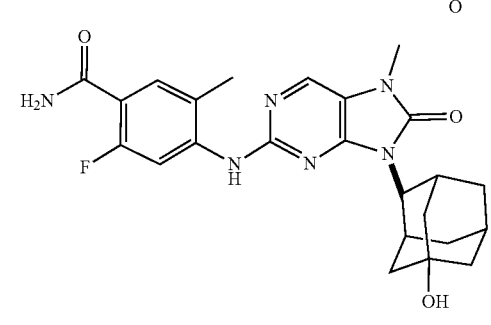

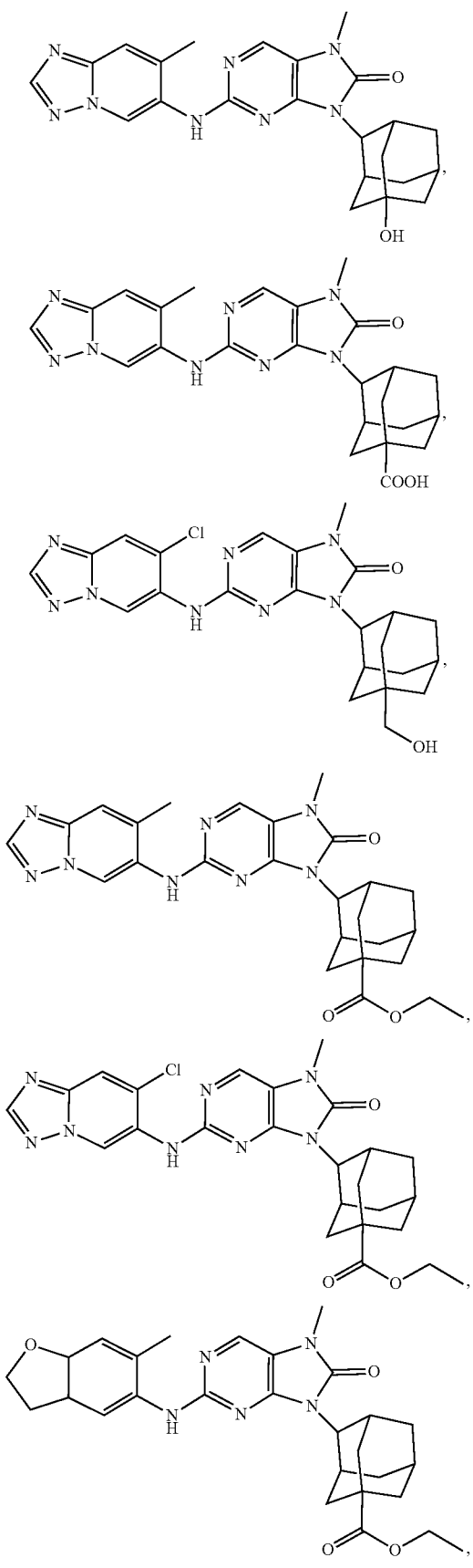
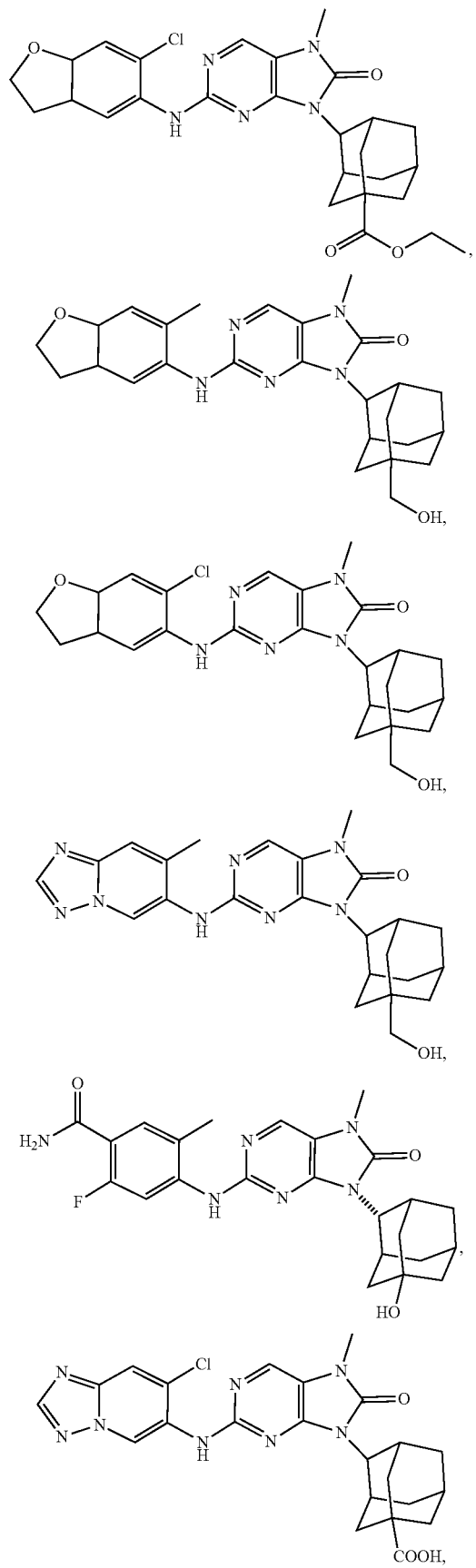

-continued
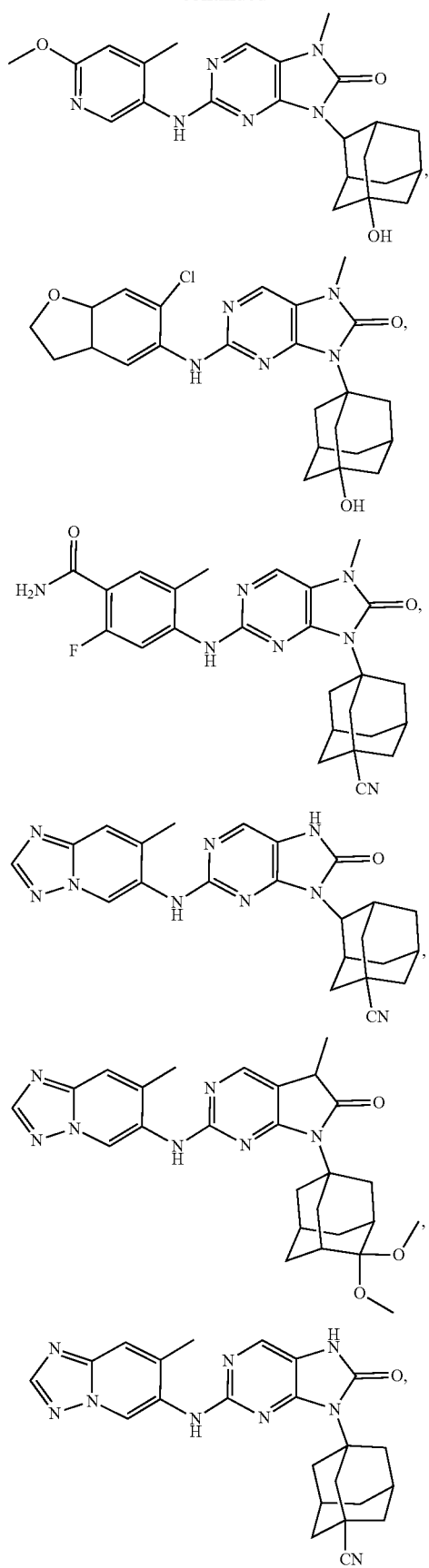
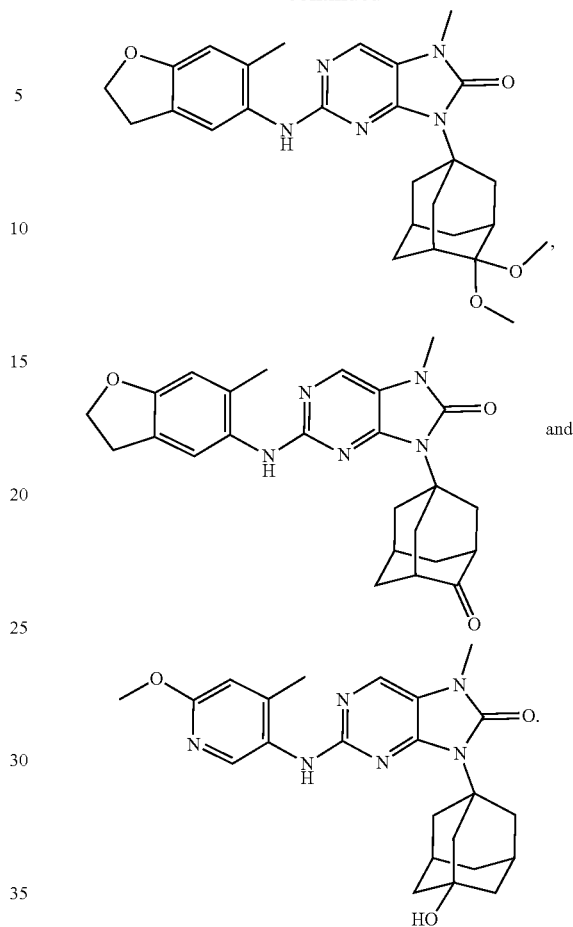
and
6. An intermediate compound for preparing a compound of general formula (I), (II), (III), (IV), (V), (VI), (VII), (VIII), (VIX) or (VX), wherein the intermediate compound is selected from a compound shown as formula (I-A) or (I-B):
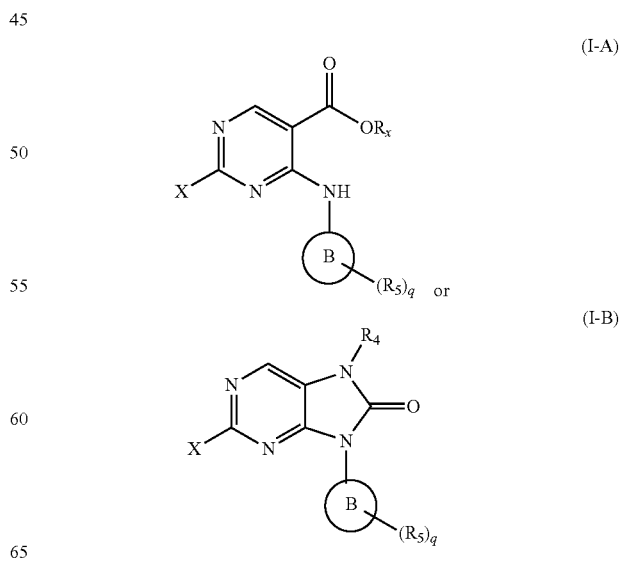

wherein,
X is selected from halogen;
B is selected from adamantyl;
$R_x$ is selected from H and $C_{1-6}$ alkyl;
$R_4$, $R_5$ and q are defined in the same way as in claim 1.
7. The intermediate compound according to claim 6, wherein the intermediate compound is selected from one of the following structures:
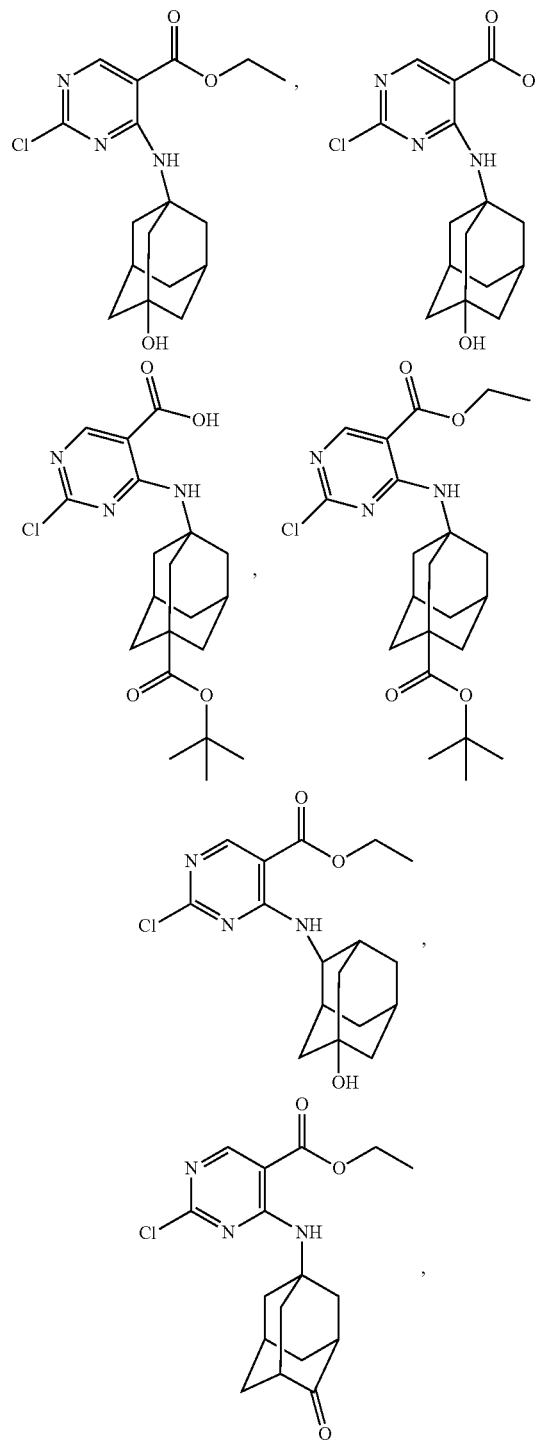
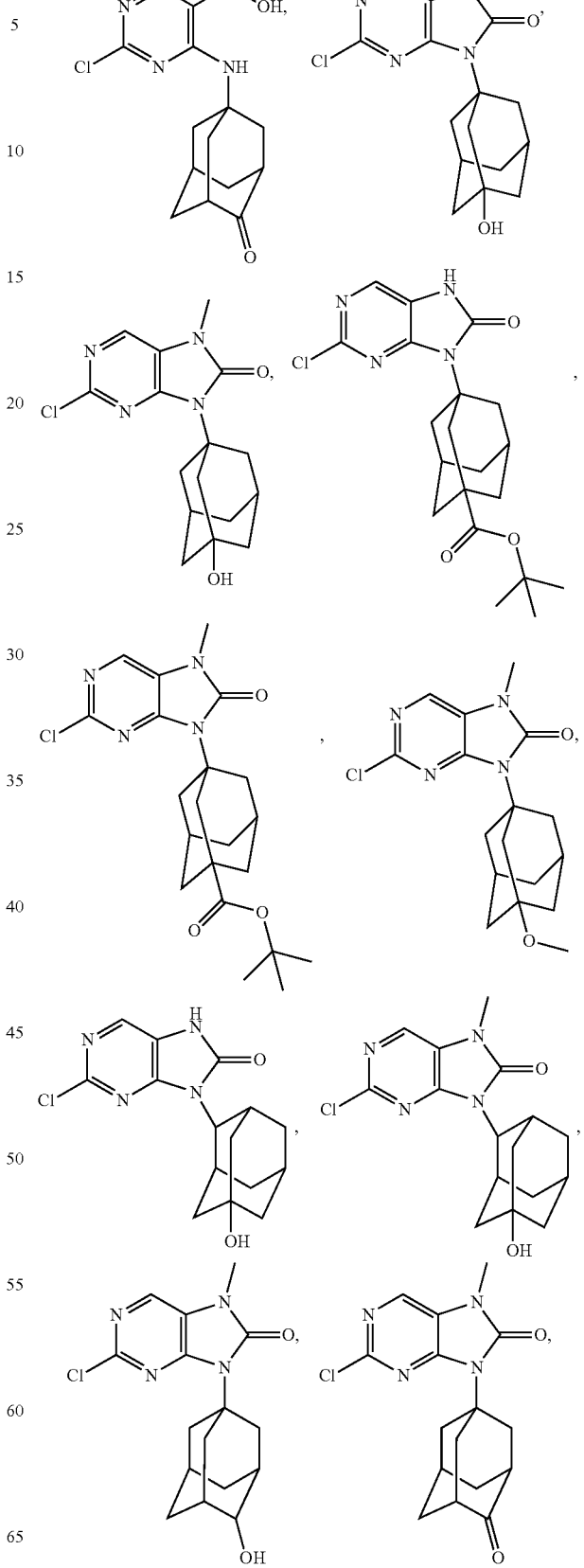

-continued

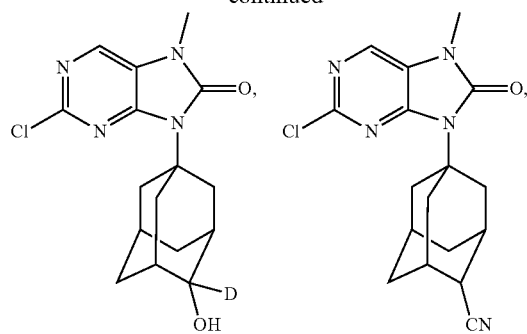

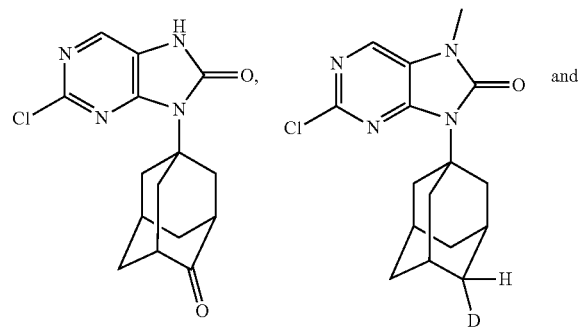

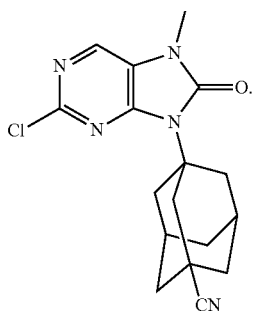

8. A pharmaceutical composition, comprising:

(1) the compound or the stereoisomer, solvate, pharmaceutically acceptable salt, or cocrystal thereof according to claim 1;

(2) optionally one or more other active ingredients; and (3) a pharmaceutically acceptable carrier and/or excipient.

9. A method for inhibiting DNA-PK or treating a disease associated with DNA-PK, comprising contacting a compound or the stereoisomer, solvate, pharmaceutically acceptable salt, or cocrystal thereof or a pharmaceutical composition with a subject in need thereof or administering to said subject a compound or the stereoisomer, solvate, pharmaceutically acceptable salt, or cocrystal thereof or a pharmaceutical composition;

the compound is shown as general formula (I) or all stereoisomers, solvates, pharmaceutically acceptable salts or cocrystals thereof:

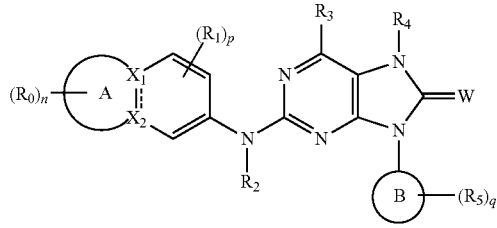

wherein,

A is absent or is selected from a 4-12 membered heterocycle containing 1 to 4 heteroatoms selected from N, O and S;

$X_1$ and $X_2$ are each independently selected from C, O, N and S, and when A is selected from a 4-12 membered heterocycle, $X_1$ and $X_2$ are part of ring A;

B is selected from adamantyl;

$R_0$ and $R_1$ are each independently selected from H, halogen, carboxyl, =O, —OH, cyano, —$NR^{a1}R^{a2}$, $C_{1-6}$ alkyl, —$C_{1-6}$ alkylene-OH, —$C_{1-6}$ alkylene-$NR^{a1}R^{a2}$, $C_{1-6}$ alkoxy, —C(=O)O$C_{1-6}$ alkyl, —C(=O)$NR^{a1}R^{a2}$, $C_{2-6}$ alkenyl and $C_{2-6}$ alkynyl, wherein the $C_{1-6}$ alkyl, $C_{1-6}$ alkylene and $C_{1-6}$ alkoxy are optionally further substituted with 1-3 substituents selected from D and halogen;

or when n is selected from 2, 3 and 4, two $R_0$, together with atoms to which they are attached, form a 3-8 membered ring, wherein the 3-8 membered ring optionally contains 1 to 3 heteroatoms selected from N, O and S, and is optionally further substituted with 1 or more substituents selected from —OH, carboxyl, halogen, cyano, =O, $C_{1-6}$ alkyl and amino;

$R_2$ is selected from H and $C_{1-6}$ alkyl;

$R_3$ is selected from H, halogen, $C_{1-6}$ alkyl and $C_{1-6}$ alkoxy;

$R_4$ is selected from H, $C_{1-6}$ alkyl, $C_{3-12}$ cycloalkyl, $C_3$ heterocycloalkyl and $C_{4-12}$ heterocycloalkyl, wherein the $C_3$ heterocycloalkyl or $C_{4-12}$ heterocycloalkyl contains 1 to 3 heteroatoms selected from N, O and S, and the $C_{1-6}$ alkyl, $C_{3-12}$ cycloalkyl, $C_3$ heterocycloalkyl or $C_{4-12}$ heterocycloalkyl is optionally substituted with 1 or more substituents selected from —OH, D, halogen, cyano, carboxyl, —$NH_2$, =O, —C(=O)$NH_2$, $C_{1-6}$ alkyl, —$C_{1-6}$ alkylene-OH, $C_{1-6}$ alkoxy, $C_{2-6}$ alkenyl, $C_{2-6}$ alkynyl, $C_{3-12}$ cycloalkyl, $C_3$ heterocycloalkyl, $C_{4-12}$ heterocycloalkyl, $C_{6-12}$ aryl and $C_5$ 12 heteroaryl;

or, $R_3$ and $R_4$, together with atoms to which they are attached, form a 4-12 membered heterocycle, wherein the heterocycle contains 1 to 3 heteroatoms selected from N, O and S, and the 4-12 membered heterocycle is optionally substituted with 1 or more substituents selected from —OH, carboxyl, halogen, cyano, =O, $C_{1-6}$ alkyl, $C_{1-6}$ heteroalkyl, $C_{2-6}$ alkenyl, $C_{2-6}$ alkynyl, —$NR^{a1}R^{a2}$, —C(=O)O$C_{1-6}$ alkyl, —C(=O)$NR^{a1}R^{a2}$, $C_{3-12}$ cycloalkyl, $C_3$ heterocycloalkyl, $C_{4-12}$ heterocycloalkyl, $C_{6-12}$ aryl and $C_{6-12}$ heteroaryl, wherein the $C_{1-6}$ alkyl, $C_{1-6}$ heteroalkyl, $C_{2-6}$ alkenyl or $C_{2-6}$ alkynyl is optionally further substituted with 1 or more substituents selected from —OH, carboxyl, cyano, halogen, —O—$R^{a1}$, —$NR^{a1}R^{a2}$, $C_{3-12}$ cycloalkyl, $C_3$ heterocycloalkyl, $C_{4-12}$ heterocycloalkyl, $C_{6-12}$ aryl and $C_{5-12}$ heteroaryl;

$R_5$ is selected from —OH, halogen, D, cyano, carboxyl, =O, $C_{1-6}$ alkyl, $C_{1-6}$ alkoxy, $C_{2-6}$ alkenyl, $C_{2-6}$ alkynyl, —$NR^{a1}R^{a2}$, —C(=O)O$C_{1-6}$ alkyl, —OC(=O)$C_{1-6}$ alkyl, —C(=O)NR$^{a1}$R$^{a2}$, C$_{3-12}$ cycloalkyl, C$_3$ heterocycloalkyl, C$_{4-12}$ heterocycloalkyl, C$_{6-12}$ aryl and C$_{5-12}$ heteroaryl, wherein the C$_{1-6}$ alkyl, C$_{1-6}$ alkoxy, C$_{3-12}$ cycloalkyl, C$_{4-12}$ heterocycloalkyl, C$_{6-12}$ aryl and C$_{6-12}$ heteroaryl are optionally further substituted with 1 to 3 substituents selected from OH, carboxyl, halogen, C$_{1-6}$ alkyl, C$_{1-6}$ alkoxy, —NR$^{a1}$R$^{a2}$ and =O;

R$^{a1}$ and R$^{a2}$ are each independently selected from H, C$_{1-6}$ alkyl, —C(=O)R$^{a3}$ and —C(=O)NR$^{a4}$R$^{a5}$, wherein the C$_{1-6}$ alkyl is optionally further substituted with 1 or more substituents selected from OH, halogen, C$_{1-6}$ alkyl, C$_{1-6}$ alkoxy, C$_{6-12}$ aryl, C$_{5-12}$ heteroaryl, C$_{3-12}$ cycloalkyl, C$_{3-12}$ heterocycloalkyl and C$_{4-12}$ heterocycloalkyl; or R$^{a1}$ and R$^{a2}$, together with a N atom form a 3-12 membered heterocycle, which contains 1 to 4 heteroatoms selected from N, O and S;

R$^{a3}$ is selected from C$_{1-6}$ alkyl, C$_{1-6}$ alkoxy and C$_{6-12}$ aryl;

R$^{a4}$ and R$^{a5}$ are each independently selected from H and C$_{1-6}$ alkyl; or R$^{a4}$ and R$^{a5}$, together with a N atom, form a 3-12 membered heterocycle, which contains 1 to 4 heteroatoms selected from N, O and S;

W is selected from O and S;

n, p and q are each independently selected from 0, 1, 2, 3 or 4;

===== is a single bond or a double bond the pharmaceutical composition comprises: (1) the compound shown as general formula (I) or the stereoisomer, solvate, pharmaceutically acceptable salt, or cocrystal; (2) optionally one or more other active ingredients; and (3) a pharmaceutically acceptable carrier and/or excipient.

10. A method for treating cancer, comprising administrating a compound or the stereoisomer, solvate, pharmaceutically acceptable salt, or cocrystal thereof or a pharmaceutical composition to a subject in need thereof;

the compound is shown as general formula (I) or all stereoisomers, solvates, pharmaceutically acceptable salts or cocrystals thereof:

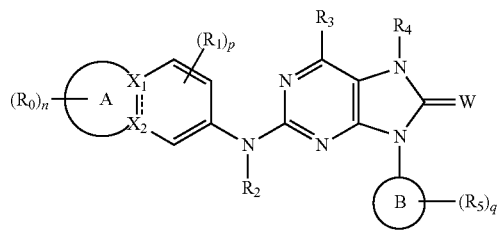

(I)

wherein,

A is absent or is selected from a 4-12 membered heterocycle containing 1 to 4 heteroatoms selected from N, O and S;

X$_1$ and X$_2$ are each independently selected from C, O, N and S, and when A is selected from a 4-12 membered heterocycle, X$_1$ and X$_2$ are part of ring A;

B is selected from adamantyl;

R$_0$ and R$_1$ are each independently selected from H, halogen, carboxyl, =O, —OH, cyano, —NR$^{a1}$R$^{a2}$, C$_{1-6}$ alkyl, —C$_{1-6}$ alkylene-OH, —C$_{1-6}$ alkylene-NR$^{a1}$R$^{a2}$, C$_{1-6}$ alkoxy, —C(=O)OC$_{1-6}$ alkyl, —C(=O)NR$^{a1}$R$^{a2}$, C$_{2-6}$ alkenyl and C$_{2-6}$ alkynyl, wherein the C$_{1-6}$ alkyl, C$_{1-6}$ alkylene and C$_{1-6}$ alkoxy are optionally further substituted with 1-3 substituents selected from D and halogen;

or when n is selected from 2, 3 and 4, two R$_0$, together with atoms to which they are attached, form a 3-8 membered ring, wherein the 3-8 membered ring optionally contains 1 to 3 heteroatoms selected from N, O and S, and is optionally further substituted with 1 or more substituents selected from —OH, carboxyl, halogen, cyano, =O, C$_{1-6}$ alkyl and amino;

R$_2$ is selected from H and C$_{1-6}$ alkyl;

R$_3$ is selected from H, halogen, C$_{1-6}$ alkyl and C$_{1-6}$ alkoxy;

R$_4$ is selected from H, C$_{1-6}$ alkyl, C$_{3-12}$ cycloalkyl, C$_3$ heterocycloalkyl and C$_{4-12}$ heterocycloalkyl, wherein the C$_3$ heterocycloalkyl or C$_{4-12}$ heterocycloalkyl contains 1 to 3 heteroatoms selected from N, O and S, and the C$_{1-6}$ alkyl, C$_{3-12}$ cycloalkyl, C$_3$ heterocycloalkyl or C$_{4-12}$ heterocycloalkyl is optionally substituted with 1 or more substituents selected from —OH, D, halogen, cyano, carboxyl, —NH$_2$, =O, —C(=O)NH$_2$, C$_{1-6}$ alkyl, —C$_{1-6}$ alkylene-OH, C$_{1-6}$ alkoxy, C$_{2-6}$ alkenyl, C$_{2-6}$ alkynyl, C$_{3-12}$ cycloalkyl, C$_3$ heterocycloalkyl, C$_{4-12}$ heterocycloalkyl, C$_{6-12}$ aryl and C$_{5-12}$ heteroaryl;

or, R$_3$ and R$_4$, together with atoms to which they are attached, form a 4-12 membered heterocycle, wherein the heterocycle contains 1 to 3 heteroatoms selected from N, O and S, and the 4-12 membered heterocycle is optionally substituted with 1 or more substituents selected from —OH, carboxyl, halogen, cyano, =O, C$_{1-6}$ alkyl, C$_{1-6}$ heteroalkyl, C$_{2-6}$ alkenyl, C$_{2-6}$ alkynyl, —NR$^{a1}$R$^{a2}$, —C(=O)OC$_{1-6}$ alkyl, —C(=O)NR$^{a1}$R$^{a2}$, C$_{3-12}$ cycloalkyl, C$_3$ heterocycloalkyl, C$_{4-12}$ heterocycloalkyl, C$_{6-12}$ aryl and C$_{5-12}$ heteroaryl, wherein the C$_{1-6}$ alkyl, C$_{1-6}$ heteroalkyl, C$_{2-6}$ alkenyl or C$_{2-6}$ alkynyl is optionally further substituted with 1 or more substituents selected from —OH, carboxyl, cyano, halogen, —O—R$^{a1}$, —NR$^{a1}$R$^{a2}$, C$_{3-12}$ cycloalkyl, C$_3$ heterocycloalkyl, C$_{4-12}$ heterocycloalkyl, C$_{6-12}$ aryl and C$_{5-12}$ heteroaryl;

R$_5$ is selected from —OH, halogen, D, cyano, carboxyl, =O, C$_{1-6}$ alkyl, C$_{1-6}$ alkoxy, C$_{2-6}$ alkenyl, C$_{2-6}$ alkynyl, —NR$^{a1}$R$^{a2}$, —C(=O)OC$_{1-6}$ alkyl, —OC(=O)C$_{1-6}$ alkyl, —C(=O)NR$^{a1}$R$^{a2}$, C$_{3-12}$ cycloalkyl, C$_3$ heterocycloalkyl, C$_{4-12}$ heterocycloalkyl, C$_{6-12}$ aryl and C$_{5-12}$ heteroaryl, wherein the C$_{1-6}$ alkyl, C$_{1-6}$ alkoxy, C$_{3-12}$ cycloalkyl, C$_{4-12}$ heterocycloalkyl, C$_{6-12}$ aryl and C$_{5-12}$ heteroaryl are optionally further substituted with 1 to 3 substituents selected from OH, carboxyl, halogen, C$_{1-6}$ alkyl, C$_{1-6}$ alkoxy, —NR$^{a1}$R$^{a2}$ and =O;

R$^{a1}$ and R$^{a2}$ are each independently selected from H, C$_{1-6}$ alkyl, —C(=O)R$^{a3}$ and —C(=O)NR$^{a4}$R$^{a5}$, wherein the C$_{1-6}$ alkyl is optionally further substituted with 1 or more substituents selected from OH, halogen, C$_{1-6}$ alkyl, C$_{1-6}$ alkoxy, C$_{6-12}$ aryl, C$_{5-12}$ heteroaryl, C$_{3-12}$ cycloalkyl, C$_3$ heterocycloalkyl and C$_{4-12}$ heterocycloalkyl; or R$^{a1}$ and R$^{a2}$, together with a N atom form a 3-12 membered heterocycle, which contains 1 to 4 heteroatoms selected from N, O and S;

R$^{a3}$ is selected from C$_{1-6}$ alkyl, C$_{1-6}$ alkoxy and C$_{6-12}$ aryl;

R$^{a4}$ and R$^{a5}$ are each independently selected from H and C$_{1-6}$ alkyl; or R$^{a4}$ and R$^{a5}$, together with a N atom, form a 3-12 membered heterocycle, which contains 1 to 4 heteroatoms selected from N, O and S;

W is selected from O and S;

n, p and q are each independently selected from 0, 1, 2, 3 or 4;

===== is a single bond or a double bond the pharmaceutical composition comprises: (1) the compound shown as general formula (I) or the stereoisomer, solvate, pharmaceutically acceptable salt, or cocrystal; (2) optionally one or more other active ingredients; and (3) a pharmaceutically acceptable carrier and/or excipient.

* * * * *